(12) United States Patent
Saito et al.

(10) Patent No.: US 8,681,686 B2
(45) Date of Patent: Mar. 25, 2014

(54) TERMINAL DEVICE AND INTERFERENCE REMOVAL METHOD

(75) Inventors: Yoshiko Saito, Kanagawa (JP); Kenichi Miyoshi, Kanagawa (JP); Daichi Imamura, Kanagawa (JP); Yasuaki Yuda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 63 days.

(21) Appl. No.: 13/574,980

(22) PCT Filed: Jan. 28, 2011

(86) PCT No.: PCT/JP2011/000482
§ 371 (c)(1),
(2), (4) Date: Jul. 24, 2012

(87) PCT Pub. No.: WO2011/093095
PCT Pub. Date: Aug. 4, 2011

(65) Prior Publication Data
US 2012/0294229 A1 Nov. 22, 2012

(30) Foreign Application Priority Data

Jan. 29, 2010 (JP) ................................. 2010-019058
Apr. 26, 2010 (JP) ................................. 2010-100870

(51) Int. Cl.
*H04B 7/14* (2006.01)
(52) U.S. Cl.
USPC ........... 370/315; 370/238; 455/11.1; 375/211
(58) Field of Classification Search
USPC .......................................... 375/211; 455/11.1
See application file for complete search history.

(56) References Cited

U.S. PATENT DOCUMENTS

| 8,224,242 | B2* | 7/2012 | Chang .............................. 455/39 |
| 2003/0125067 | A1 | 7/2003 | Takeda |
| 2007/0281613 | A1 | 12/2007 | Lee |
| 2008/0013606 | A1* | 1/2008 | Boariu et al. .................. 375/211 |

(Continued)

FOREIGN PATENT DOCUMENTS

| CN | 1430452 | 7/2003 |
| JP | 2003-258719 | 9/2003 |

(Continued)

OTHER PUBLICATIONS

International Search Report dated Mar. 8, 2011.

(Continued)

*Primary Examiner* — Duc C Ho
(74) *Attorney, Agent, or Firm* — Dickinson Wright PLLC

(57) ABSTRACT

When a terminal (200) is capable of connecting to two relay devices that are adjacent to the terminal, from among a plurality of relay devices, a receiving unit (208) receives signals in a first period and a second period for communication among the plurality of relay stations, which are transmitted from the higher order device to the lower order device toward other terminal devices. An interference removal unit (209) obtains a signal transmitted toward the terminal (200) from the higher order relay device by employing the signals toward the other terminal devices that are received in the first period and the second period and removing a signal toward other terminal devices that is transmitted in a third period for communication between the plurality of relay devices and the terminal device from the lower order device from a signal that is received in the third period.

8 Claims, 25 Drawing Sheets

(56) References Cited

U.S. PATENT DOCUMENTS

| | | | |
|---|---|---|---|
| 2008/0259840 A1* | 10/2008 | Yin et al. | 370/315 |
| 2009/0203309 A1 | 8/2009 | Okuda | |
| 2010/0111018 A1* | 5/2010 | Chang | 370/329 |
| 2011/0019634 A1 | 1/2011 | Fujii | |
| 2012/0033603 A1* | 2/2012 | Seo et al. | 370/312 |

FOREIGN PATENT DOCUMENTS

| | | |
|---|---|---|
| JP | 2005-252677 | 9/2005 |
| JP | 2009-188839 | 8/2009 |
| JP | 2009-218638 | 9/2009 |
| JP | 2009-533943 | 9/2009 |

OTHER PUBLICATIONS

N. Fukaya, et al., "A Distributed Relaying Algorithm for Multi-hop Wireless Network Coding based on Amplify-and-Forward," IEICE Technical Report, RCS2007-154, Jan. 17, 2008, 8 pages total.

* cited by examiner

TERMINAL DEVICE AND INTERFERENCE REMOVAL METHOD

TECHNICAL FIELD

The present invention relates to a terminal apparatus and an interference removal method in multihop communication.

BACKGROUND ART

In recent years, for the purpose of expanding the coverage areas of base stations, relay transmission techniques have been studied in which a relay apparatus (RN: Relay Node) is installed between a base station and terminals, and communication is performed between the base station and the mobile stations via the relay apparatus. Multihop communication is regarded as a promising means for providing wideband transmission to areas outside macrocell service areas particularly in cellular environments. In the multihop communication, a plurality of relay apparatuses are connected in series, and communication is performed between a base station and terminals.

Furthermore, in consideration of expansion of use of radio waves not only between, e.g., mobile terminals, but also between various types of apparatuses in the future, a shortage of usable frequencies inevitably occurs. Thus, further enhancement in use efficiency of frequencies or expansion of the usable frequencies to a high-frequency band becomes essential. Multihop communication is a promising communication means also as a means for meeting such demands for, e.g., the enhancement in use efficiency of frequencies and the expansion to a high frequency band.

More specifically, when a communication distance between a base station and a terminal is the same, a communication distance between the apparatuses in two-hop communication (multihop communication) is a half ($\frac{1}{2}$) of a communication distance between the apparatuses in single-hop communication. Here, in consideration of a case where received signal power is inversely proportional to the square of the distance, when the same received signal power is provided in two-hop communication and single-hop communication, the transmission power in two-hop communication can be only $\frac{1}{4}$ ($=(\frac{1}{2})^2$) of the transmission power in the single-hop communication. Furthermore, a frequency reuse distance can be reduced to a half of that in single-hop communication in two-hop communication, and thus, a simultaneous communication density for the same frequency is approximately four times ($=2^2$) that in single-hop communication. However, the transmission timing needs to be divided into two in two-hop communication. Thus, the throughput in this case becomes a half of that in single-hop communication in end-to-end communication (between a base station and a terminal). However, in two-hop communication, an area spectral efficiency, which is provided by the product of a throughput and a simultaneous communication density, is twice ($=(\frac{1}{2})\times 4$) that in single-hop communication. In other words, employment of multihop communication (here, two-hop communication) enables enhancement in frequency use efficiency as well as enhancement in throughput.

Furthermore, signals have high linearity and the propagation loss (pathloss) is large in a high-frequency band (high carrier frequency). Thus, when the same transmission power as that in a low-frequency band (low carrier frequency) is used, the received signal power decreases. However, in multihop communication, the propagation loss (pathloss) per hop can be decreased by a further decrease in distance between transmitting and receiving apparatuses. In other words, employment of multihop communication enables flexible support for expansion of usable frequencies to a high frequency band according to the number of hops.

As an example of multihop communication, a conventional technique is under study, in which a plurality of relay apparatuses perform communication between a base station and terminals using the same fixed frequency (see PLT 1 or the like), for example.

CITATION LIST

Patent Literature

PTL 1 Japanese Translation of a PCT Application Laid-Open No. 2009-533943

SUMMARY OF INVENTION

Technical Problem

A specific explanation of the aforementioned conventional technique will be provided with reference to FIG. 1, taking multihop communication in downlink from a base station (macrocell base station, which is not illustrated) to terminals (MS1 to MS3 in FIG. 1) as an example.

In the following explanation, one of two adjacent relay apparatuses that is positioned upstream of a signal transfer direction between the base station (macrocell base station) and the terminals is referred to as an upstream RN, and the other one positioned downstream of the signal transfer direction is referred to as a downstream RN. Here, the two adjacent relay apparatuses are of relay apparatuses used in multihop communication (RN1 to RN4 in FIG. 1). When a plurality of relay apparatuses are connected in series and placed sequentially from the base station, for example, a relay apparatus closer to the base station (macrocell base station) among two adjacent relay apparatuses is an upstream RN and a relay apparatus farther from the base station is a downstream RN. In RN1 to RN4 illustrated in FIG. 1, for example, signals transmitted from the base station (macrocell base station) to the terminals are transferred in order of RN1, RN2, RN3 and RN4. In other words, in FIG. 1, RN1 is the closest to the base station, RN2 is the second closest to the base station, RN3 is the third closest to the base station and RN4 is the farthest from the base station. Accordingly, RN1 is an upstream RN and RN2 is a downstream RN between RN1 and RN2. Likewise, RN2 is an upstream RN and RN3 is a downstream RN between RN2 and RN3. The same applies to RN3 and RN4.

Furthermore, in the following explanation, as illustrated in FIG. 1, a downlink subframe is formed on a per subframe basis where each subframe includes three periods, i.e., period 1, period 2 and period 3. More specifically, the downlink subframe illustrated in FIG. 1 includes period 1 for communication between a plurality of RNs and terminals, and period 2 and period 3 for communication between the plurality of RNs.

Furthermore, in FIG. 1, RN1 to RN4 perform communication using fixed frequency f1 only.

Furthermore, in FIG. 1, MS1 exists at a position where a coverage area of RN1 and a coverage area of RN2 overlap each other, that is, where MS1 is connectable to both RN1 and RN2. Likewise, MS2 exists at a position where the coverage area of RN2 and a coverage area of RN3 overlap each other, and MS3 exists at a position where the coverage area of RN3 and a coverage area of RN4 overlap each other.

First, in FIG. 1, each of terminals MS1 to MS3 connects to an RN corresponding to a higher received signal strength indicator (RSSI) among RNs to which the terminal is connectable. In FIG. 1, MS1 connects to RN2, MS2 connects to RN3, and MS3 connects to RN4.

Then, in period 1 in the downlink subframe, all of the relay apparatuses (RN1 to RN4) simultaneously transmit a relay signal of frequency f1 to terminals connected to the respective relay apparatuses (solid arrows in period 1 illustrated in FIG. 1).

Next, one of two adjacent relay apparatuses among the plurality of relay apparatuses (RN1 to RN4) transmits a relay signal to a downstream RN in period 2, and the other one of the adjacent relay apparatuses transmits a relay signal to a downstream RN in period 3. For example, the odd-numbered relay apparatuses (RN1 and RN3) transmit a relay signal of frequency f1 to the even-numbered relay apparatuses (RN2 and RN4), which are downstream RNs adjacent to the respective relay apparatuses, in period 2 illustrated in FIG. 1. In other words, the even-numbered relay apparatuses (RN2 and RN4) receive a relay signal from the odd-numbered relay apparatuses (RN1 and RN3), which are upstream RNs adjacent to the respective relay apparatuses, in period 2 illustrated in FIG. 1. Likewise, the even-numbered relay apparatuses transmit a relay signal of frequency f1 to the odd-numbered relay apparatuses, which are downstream RNs adjacent to the respective relay apparatuses, in period 3 illustrated in FIG. 1. In other words, the odd-numbered relay apparatuses receive a relay signal from the even-numbered relay apparatuses, which are upstream RNs adjacent to the respective relay apparatuses, in period 3 illustrated in FIG. 1.

As described above, in the conventional technique, a plurality of relay apparatuses that perform multihop communication (RN1 to RN4 illustrated in FIG. 1) use the same frequency (frequency f1 in FIG. 1). For this reason, there arises a problem that when a relay signal is transmitted from some of the plurality of relay apparatuses to the corresponding terminals (that is, period 1 illustrated in FIG. 1), a terminal located where coverage areas of adjacent relay apparatuses overlap each other is interfered by a signal from a relay apparatus other than a relay apparatus to which the terminal is connected. For example, a signal from RN2 to which MS1 is connected (that is, a signal for MS1 (desired signal)) as shown in FIG. 1 is interfered by a signal from RN1 adjacent to RN2 (that is, a signal for an MS other than MS1 (interference signal)). The same applies to MS2 and MS3 illustrated in FIG. 1.

As described above, when multihop communication is performed among a plurality of relay apparatuses using the same frequency, the terminal cannot avoid interference to a signal from a relay apparatus to which the terminal is connected, by a signal from another relay apparatus.

An object of the present invention is to provide a terminal apparatus and an interference removal method enabling reduction in interference to a signal from a relay apparatus to which a terminal is connected, by a signal from another relay apparatus, even in a case where multihop communication is performed among a plurality of relay apparatuses using the same frequency.

Solution to Problem

A terminal apparatus according to one aspect of the present invention is a terminal apparatus in a radio communication system in which a plurality of relay apparatuses relay communication between a base station apparatus and terminal apparatuses using the same frequency, on a per-subframe basis where each subframe includes a first period and a second period for communication between the plurality of relay apparatuses and a third period for communication between the plurality of relay apparatuses and the terminal apparatuses, while two adjacent relay apparatuses among the plurality of relay apparatuses perform transmission processing in mutually-different periods, respectively, in the first period and the second period, and the plurality of relay apparatuses simultaneously perform transmission to terminal apparatuses connected to the relay apparatuses, in the third period, the apparatus including: a selection section that selects connection to an upstream relay apparatus positioned upstream in a signal transfer direction between the base station apparatus and the terminal apparatus from among the two relay apparatuses, when the terminal apparatus is connectable to the two relay apparatuses; a receiving section that receives a signal for another terminal apparatus, the signal being transmitted from the upstream relay apparatus to a downstream relay apparatus positioned downstream in the transfer direction among the two relay apparatuses, in the first period or the second period; and a removing section that removes a signal for the other terminal apparatus transmitted from the downstream relay apparatus in the third period from a signal received in the third period, using the signal for the other terminal apparatus received in the first period or the second period, thereby obtaining a signal for the terminal apparatus transmitted from the upstream relay apparatus.

An interference removal method according to another aspect of the present invention is an interference removal method in a radio communication system in which a plurality of relay apparatuses relay communication between a base station apparatus and terminal apparatuses using the same frequency on a per subframe basis where each subframe includes a first period and a second period for communication between the plurality of relay apparatuses and a third period for communication between the plurality of relay apparatuses and the terminal apparatuses, while two adjacent relay apparatuses among the plurality of relay apparatuses perform transmission processing in mutually-different periods, respectively, in the first period and the second period, and the plurality of relay apparatuses simultaneously perform transmission to terminal apparatuses connected to the relay apparatuses, in the third period, the method including: a selection step of selecting connection for the terminal apparatus to an upstream relay apparatus positioned upstream in a signal transfer direction between the base station apparatus and the terminal apparatus from among the two relay apparatuses, when the terminal apparatus is connectable to the two relay apparatuses; a reception step of receiving a signal for another terminal apparatus, the signal being transmitted from the upstream relay apparatus to a downstream relay apparatus positioned downstream in the transfer direction among the two relay apparatuses, in the first period or the second period; and a removal step of removing a signal for the other terminal apparatus transmitted from the downstream relay apparatus in the third period from a signal received in the third period, using the signal for the other terminal apparatus received in the first period or the second period, thereby obtaining a signal for the terminal apparatus transmitted from the upstream relay apparatus.

Advantageous Effects of Invention

The present invention enables reduction in interference to a signal from a relay apparatus to which a terminal is connected, by a signal from another relay apparatus, even in a case where multihop communication is performed among a plurality of relay apparatuses using the same frequency.

DESCRIPTION OF EMBODIMENTS

Hereafter, embodiments of the present invention will be described in detail with reference to the drawings.

Embodiment 1

The explanation will be provided below taking multihop communication in downlink as an example.

Furthermore, the below explanation will be provided for a radio communication system in which a plurality of relay apparatuses relay communication between a base station and terminals in downlink using the same frequency and in subframe (downlink subframes; hereinafter referred to as "DL subframe(s)") units each including a first period (hereinafter referred to as "period A") and a second period (hereinafter referred to as "period B") for communication among the plurality of relay apparatuses (RNs), and a third period (hereinafter referred to as "period C") for communication among the plurality of relay apparatuses and terminals.

Furthermore, in period A and period B in a DL subframe, two adjacent relay apparatuses among the plurality of relay apparatuses perform transmission processing in periods different from each other (that is, any one of periods A and B), respectively. Furthermore, in period C in the DL subframe, the plurality of relay apparatuses simultaneously perform transmission to the terminals connected to the respective relay apparatuses.

Figure 1:
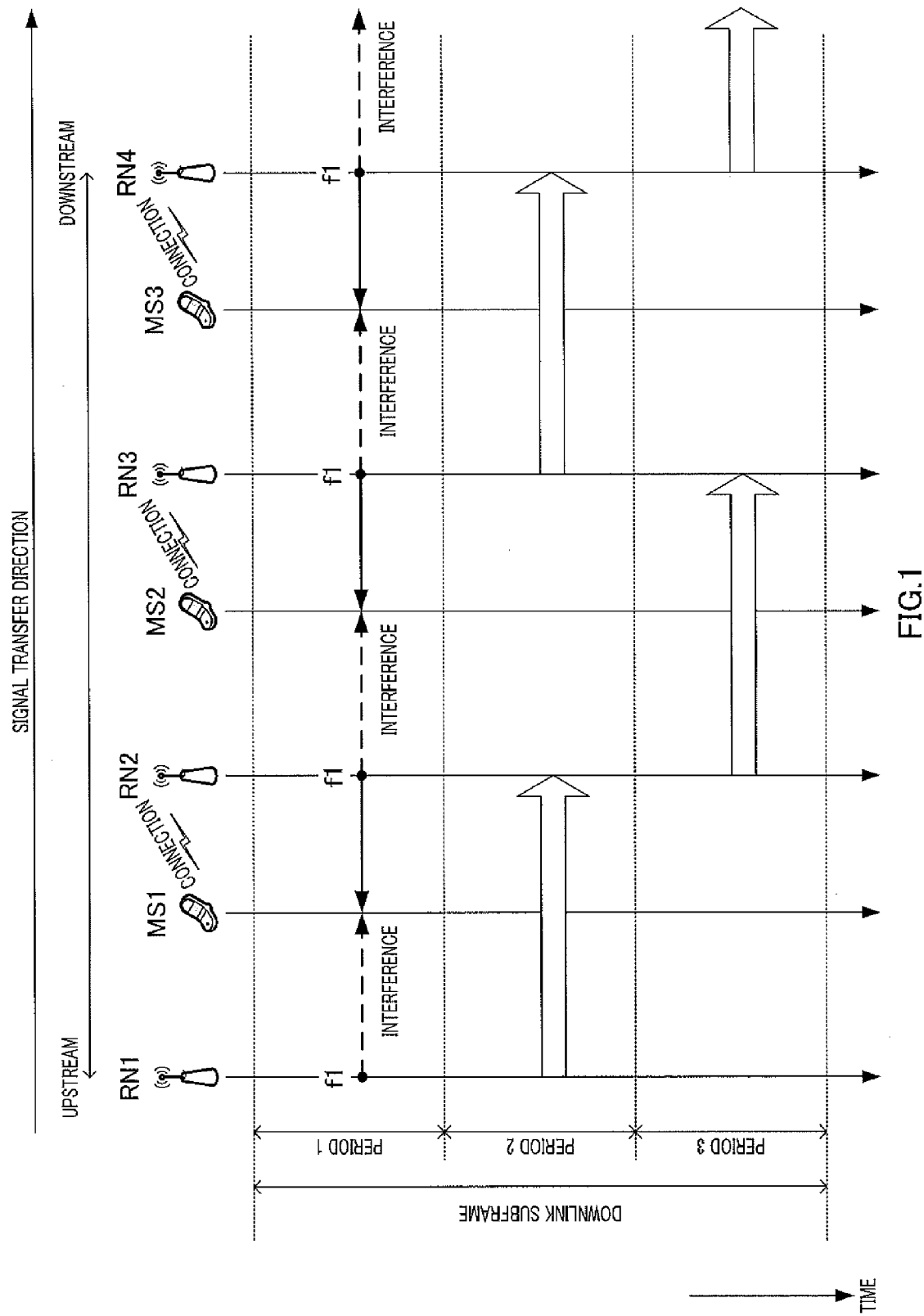
FIG. 1 is a diagram illustrating a problem to be solved by the present invention.

Furthermore, in the below explanation, as in FIG. 1, among two adjacent relay apparatuses, the relay apparatus positioned upstream in a signal transfer direction (downlink signal) between a base station (macrocell base station) and terminals is referred to as an upstream RN, and the relay apparatus positioned downstream is referred to as a downstream RN. For example, when a plurality of relay apparatuses are connected in series and placed sequentially from the base station, the relay apparatus closer to the base station (macrocell base station) among two adjacent relay apparatuses is an upstream RN and the relay apparatus farther from the base station is a downstream RN.

Furthermore, in the below explanation, RN number 1 is given to a relay apparatus that directly communicates with a base station (macrocell base station), for example, a relay apparatus closest to the base station (most upstream RN), while RN numbers 2, 3, 4, . . . are sequentially given to the relay apparatuses downstream of the relay apparatus. In other words, the RN numbers of the plurality of relay apparatuses that relay communication between the base station and the terminals include odd numbers and even numbers alternately in order from the most upstream RN. The RN number of the most upstream RN may be given an even number (for example, the RN number is 0), while the relay apparatuses downstream of the relay apparatus with an RN number of 0 are given RN numbers 1, 2, 3, . . . . Hereinafter, a relay apparatus whose RN number is odd is referred to as an odd-numbered RN, and a relay apparatus whose RN number is even is referred to as an even-numbered RN.

Furthermore, in the below explanation, odd-numbered RNs respectively transmit a relay signal to downstream RNs (that is, even-numbered RNs) in period A, and the even-numbered RNs respectively transmit a relay signal to downstream RNs (that is, the odd-numbered RNs) in period B. In other words, the even-numbered RNs receive a relay signal from the respective upstream RNs (that is, the odd-numbered RNs) in period A, and the odd-numbered RNs receive a relay signal from the respective upstream RNs (that is, the even-numbered RNs) in period B.

Figure 2:
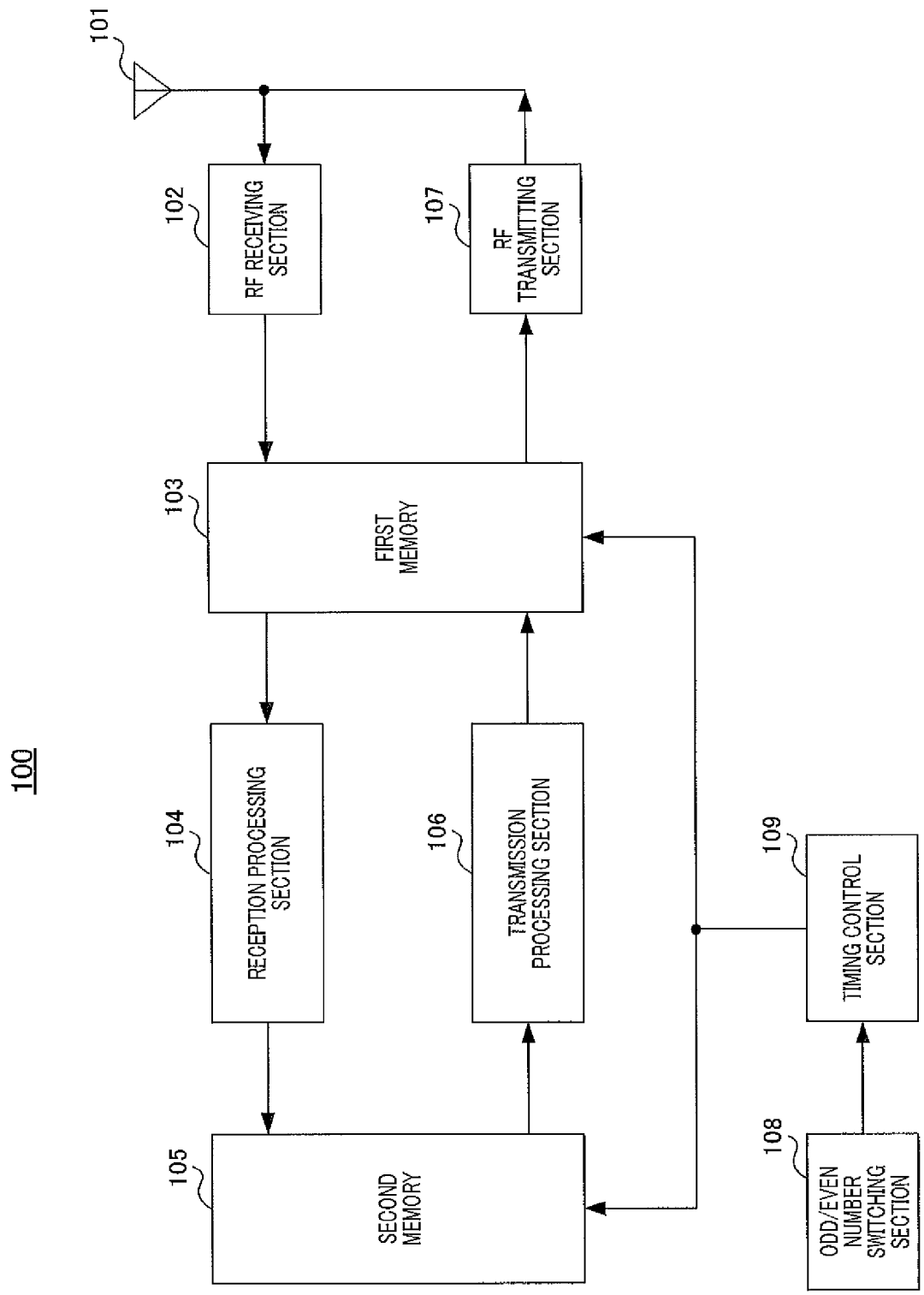
FIG. 2 is a block diagram illustrating a configuration of a relay apparatus according to embodiment 1 of the present invention.

A configuration of relay apparatus 100 according to the present embodiment is illustrated in FIG. 2.

In relay apparatus 100 illustrated in FIG. 2, RF receiving section 102 receives a signal transmitted from an upstream apparatus (the base station in the case of the most upstream RN, and an upstream RN in the case of a relay apparatus other than the most upstream RN) via antenna 101. Then, RF receiving section 102 performs reception processing such as down-conversion and A/D conversion on the received signal. Then, RF receiving section 102 outputs the signal after the reception processing to first memory 103. It should be noted that a relay signal transmitted from the base station or an upstream RN includes, e.g., a relay signal (data signal and control information) for a terminal connected to relay apparatus 100 (terminal under the control of relay apparatus 100) or a relay signal (data signal and control information) for a terminal connected to a relay apparatus downstream of relay apparatus 100 (downstream RN), and a known signal (also referred to as a reference signal or a pilot signal).

First memory 103 stores (writes in) a signal input from RF receiving section 102 (a signal from the upstream apparatus), and a signal input from transmission processing section 106, which is described later, (a relay signal for a terminal connected to relay apparatus 100 or a relay signal for a downstream RN), according to instructions from timing control section 109. Also, first memory 103 outputs (reads out) each of the stored signals to reception processing section 104 or RF transmitting section 107 according to an instruction from timing control section 109.

Reception processing section 104 first performs demodulation and decoding of the control information included in the relay signal input from first memory 103. Here, a mapping position and an MCS (modulation and coding scheme) of the control information are set in advance and known. Also, the control information contains the mapping position and the MCS of the data signal (data directed to the terminal connected to relay apparatus 100 or data directed to a terminal connected to a downstream RN). Then, reception processing section 104 performs demodulation and decoding of the data signal contained in the relay signal input from first memory 103, based on the mapping position and the MCS contained in the control information. Then, reception processing section 104 outputs the signal after the decoding to second memory 105.

Second memory 105 stores (writes in) the signal input from reception processing section 104 (the signal after the decoding), according to an instruction from timing control section 109. Also, second memory 105 outputs (reads out) each of the stored signals to transmission processing section 106, according to an instruction from timing control section 109.

Transmission processing section 106 performs encoding and modulation of the signal input from second memory 105 (the relay signal for the terminal connected to relay apparatus 100 or the relay signal for the terminal connected to a downstream RN). Then, transmission processing section 106 outputs the signal after the modulation to first memory 103.

RF transmitting section 107 performs transmission processing such as D/A conversion, amplification and up-conversion on the signal input from first memory 103. Then, RF transmitting section 107 transmits the signal after the transmission processing from antenna 101.

Odd/even number switching section 108 switches a setting indicating whether relay apparatus 100 is an odd-numbered RN or an even-numbered RN, according to the RN number of relay apparatus 100. Odd/even number switching section 108 may switch the setting indicating whether relay apparatus 100 is an odd-numbered RN or an even-numbered RN, according to the number of RNs used in multihop communication, which is notified by the base station, for example. Alternatively, odd/even number switching section 108 may switch the setting indicating whether relay apparatus 100 is an odd-numbered RN or an even-numbered RN, according to notification from the base station before the start of communication. Then, odd/even number switching section 108 outputs the setting information indicating whether relay apparatus 100 is an odd-numbered RN or an even-numbered RN (for example, "odd number" or "even number") to timing control section 109.

Timing control section 109 instructs an input/output timing of a relay signal to/from first memory 103 and second memory 105 based on the setting information input from odd/even number switching section 108.

If the setting information input from odd/even number switching section 108 indicates "odd number" (if relay apparatus 100 is an odd-numbered RN), timing control section 109 instructs (gives a read instruction to) first memory 103 to output the relay signal for the downstream RN to RF transmitting section 107 in period A, for example.

Furthermore, in period B, timing control section 109 instructs (gives a write instruction to) first memory 103 to store the relay signal input from RF receiving section 102 (the relay signal for the terminal connected to relay apparatus 100 or the relay signal for the terminal connected to the downstream RN). Furthermore, in period B, when the relay signal is stored in first memory 103, timing control section 109 instructs (gives a read instruction to) first memory 103 to output the stored relay signal to reception processing section 104, and instructs (gives a write instruction to) second memory 105 to store the signal input from reception processing section 104 (decoded signal). Furthermore, in period B, when the decoded signal is stored in second memory 105, timing control section 109 instructs (gives a read instruction to) second memory 105 to output the relay signal (the relay signal for the terminal connected to relay apparatus 100 or the relay signal for the terminal connected to the downstream RN) to transmission processing section 106, and instructs (gives a write instruction to) first memory 103 to store the relay signal input from transmission processing section 106 (the relay signal for the terminal connected to relay apparatus 100 or the relay signal for the terminal connected to the downstream RN).

Meanwhile, if the setting information input from odd/even number switching section 108 indicates "even number" (if relay apparatus 100 is an even-numbered RN), timing control section 109 performs processing similar to that performed in period A when the setting information indicates "odd number," in period B, and performs processing similar to that performed in period B when the setting information indicates "odd number," in period A. In other words, the processing in period A and the processing in period B in timing control section 109 are interchanged between an odd-numbered RN and an even-numbered RN.

Furthermore, regardless of the setting information input from odd/even number switching section 108, timing control section 109 instructs (gives a read instruction to) first memory 103 to output the relay signal for the terminal connected to relay apparatus 100 to RF transmitting section 107 in period C.

Figure 3:
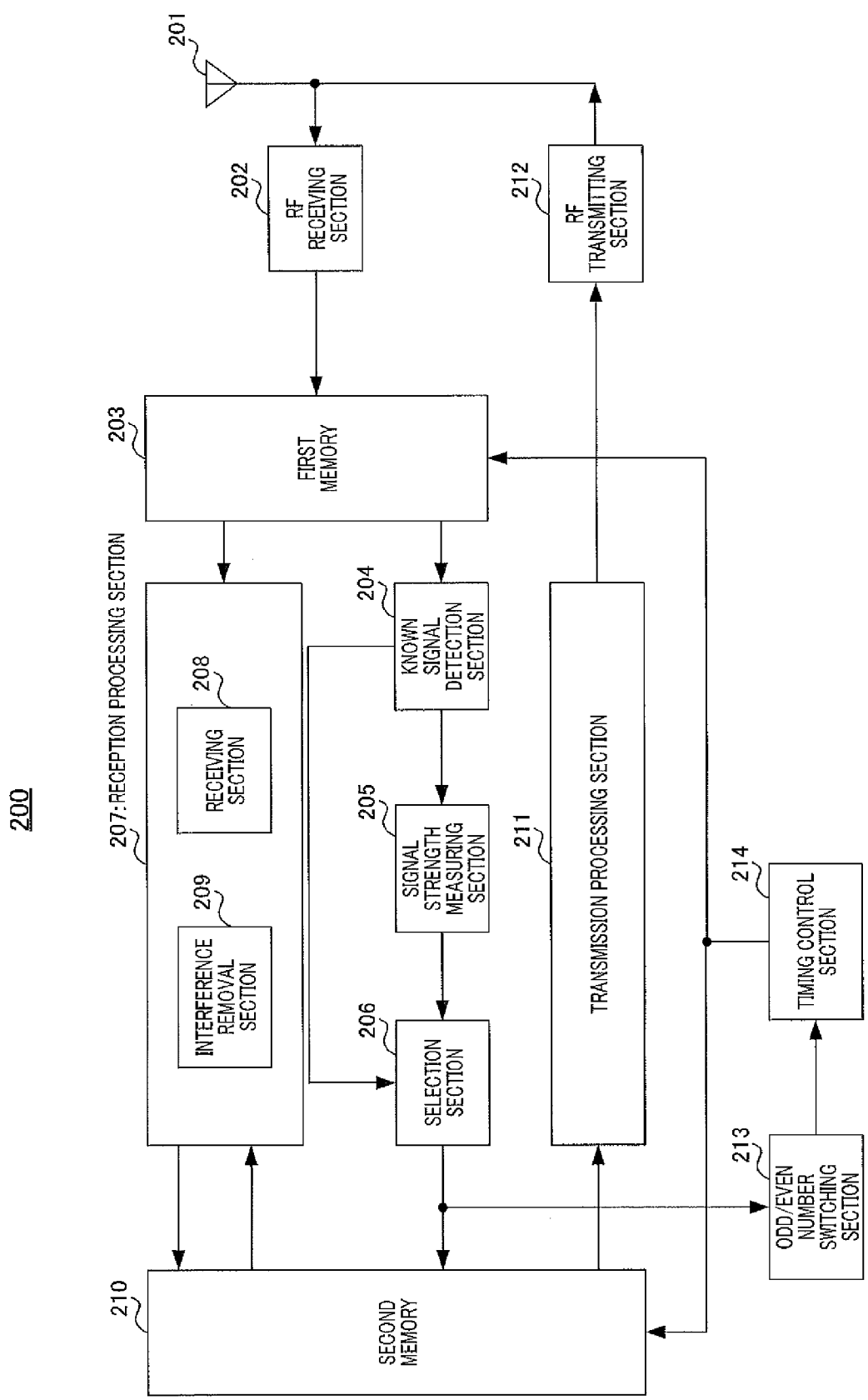
FIG. 3 is a block diagram illustrating a configuration of a terminal according to embodiment 1 of the present invention.

Next, a configuration of terminal 200 according to the present embodiment is illustrated in FIG. 3.

In terminal 200 illustrated in FIG. 3, RF receiving section 202 receives a signal transmitted from relay apparatus 100 (FIG. 2), via antenna 201. Then, RF receiving section 202 performs reception processing such as down-conversion and A/D conversion on the received signal. Then, RF receiving section 202 outputs the signal after the reception processing to first memory 203. It should be noted that a relay signal transmitted from relay apparatus 100 to which terminal 200 is connected contains a relay signal (data signal and control information) for terminal 200 and a known signal.

First memory 203 stores (writes in) the relay signal input from RF receiving section 202, according to an instruction from timing control section 214. Also, first memory 203 outputs (reads out) the stored signal to known signal detection section 204 and reception processing section 207 according to an instruction from timing control section 214.

Known signal detection section 204 performs a correlation calculation between the known signal contained in the relay signal input from first memory 203 and each of all possible known signal patterns. Here, the number of known signal patterns is the number of RNs that may be included in the multihop communication; however, in reality, a maximum of several tens of patterns is sufficient (that is, a maximum of several tens of hops is allowed). Known signal detection section 204 detects the known signal transmitted from relay apparatus 100, based on the result of the correlation calculation, and outputs the detected known signal to signal strength measuring section 205. Also, known signal detection section 204 detects a known signal pattern in which a peak appears (that is, a relay apparatus from which the known signal is received), and outputs an RN number corresponding to the detected pattern to selection section 206.

Signal strength measuring section 205 measures a received signal strength indicator (RSSI) of the known signal input from known signal detection section 204. Then, signal strength measuring section 205 outputs the measured received signal strength indicator to selection section 206.

Selection section 206 determines a relay apparatus (RN) to which terminal 200 is to be connected, using the RN number input from known signal detection section 204 and the received signal strength indicator (RSSI) of the known signal input from signal strength measuring section 205. Here, if terminal 200 is connectable to two adjacent relay apparatuses (RNs), selection section 206 selects connection to a relay apparatus positioned upstream in a signal transfer direction (here, downlink signal) between the base station and terminal 200 (a relay apparatus closer to the base station), that is, an upstream RN from among the two relay apparatuses. In other words, if terminal 200 is connectable to two adjacent relay apparatuses (RNs), selection section 206 selects the upstream RN from among the two relay apparatuses as a serving cell. Then, selection section 206 outputs the RN number of the connection-destination RN (the serving cell) for terminal 200, which is the result of the selection, to second memory 210 and odd/even number switching section 213. Details of the connection-destination RN selection processing in selection section 206 will be described later.

Reception processing section 207 includes receiving section 208 and interference removal section 209.

Receiving section 208 of reception processing section 207 performs demodulation and decoding of the relay signal input from first memory 203. More specifically, if terminal 200 is connectable to two adjacent relay apparatuses (RNs), receiving section 208 performs the following processing. In period A or period B (a period for communication between relay apparatuses), receiving section 208 receives a relay signal transmitted from the upstream RN to the downstream RN of the two relay apparatuses to which terminal 200 is connectable (a relay signal for another terminal) and performs demodulation and decoding of the signal. In other words, receiving section 208 receives the relay signal for another terminal, that is, a signal that may provide interference to terminal 200 in period C (interference signal) in period A or period B. Then, receiving section 208 outputs the relay signal for another terminal (interference signal), which was received in period A or period B, to second memory 210. Also, receiving section 208 calculates a channel estimation value between the relay apparatus (upstream RN) to which terminal 200 is connected and terminal 200, using the relay signal for another terminal, and outputs the channel estimation value to second memory 210. Likewise, receiving section 208 calculates a channel estimation value between the downstream RN and terminal 200 using a relay signal from the downstream RN, and outputs the channel estimation value to second memory 210 as a channel estimation value of the interference signal.

Interference removal section 209 removes the relay signal for another terminal, which is transmitted from the downstream RN in period C, from the relay signal received in period C, using the relay signal for another terminal (interference signal) and the channel estimation value of the interference signal stored in second memory 210, which were received in period A or period B. Then, receiving section 208 performs demodulation and decoding of the relay signal which is received in period C (a period for communication between relay apparatuses and terminals) of a DL subframe and from which the interference signal has been removed in interference removal section 209. Receiving section 208 thereby obtains a relay signal for terminal 200 (desired signal) transmitted from the upstream RN (serving cell for terminal 200). Then, receiving section 208 outputs the decoded signal to second memory 210. Details of the interference removal processing in interference removal section 209 will be described later.

Second memory 210 stores the result of selection input from selection section 206 (RN number of the serving cell for terminal 200). Also, second memory 210 stores the signals input from receiving section 208 of reception processing section 207 (the interference signal and the signal after removal of the interference) according to an instruction from timing control section 214. Also, second memory 210 outputs the stored signals to reception processing section 207 (interference removal section 209) and transmission processing section 211 according to an instruction from timing control section 214.

Transmission processing section 211 performs encoding and modulation of a signal containing a terminal ID of terminal 200 and the RN number of the serving cell, which is input from second memory 210. Then, transmission processing section 211 outputs the modulated signal to RF transmitting section 212 as a response signal.

RF transmitting section 212 performs transmission processing such as D/A conversion, amplification and up-conversion on the response signal input from transmission processing section 211. Then, RF transmitting section 212 transmits the response signal after the transmission processing from antenna 201. Consequently, the relay apparatus corresponding to the serving cell indicated in the response signal recognizes terminal 200 as a terminal to be connected to the relay apparatus itself (terminal under the control of this relay apparatus) and transmits a response signal to terminal 200.

Odd/even number switching section 213 performs switching of the setting indicating whether the relay apparatus to which terminal 200 is connected is an odd-numbered RN or an even-numbered RN, according to the RN number of the serving cell input from selection section 206, as in odd/even number switching section 108 (FIG. 2). Then, odd/even number switching section 213 outputs setting information indicating whether the relay apparatus to which terminal 200 is connected is an odd-numbered RN or an even-numbered RN ("odd number" or "even number") to timing control section 214. Odd/even number switching section 213 outputs an indefinite value to timing control section 214 until the RN number of the serving cell (the result of selection in selection section 206) is input from selection section 206.

As in timing control section 109 (FIG. 2), timing control section 214 gives an instruction to first memory 203 and second memory 210 on input/output timings for a relay signal, based on the setting information input from odd/even number switching section 213.

For example, if the setting information input from odd/even number switching section 213 indicates "odd number" (if the serving cell is an odd-numbered RN) timing control section 214 instructs (gives a write instruction to) first memory 203 to store a relay signal for a downstream RN, which is input from RF receiving section 202, in period A. Also, in period A, when the relay signal for a downstream RN is stored in first memory 203, timing control section 214 instructs (gives a read instruction to) first memory 203 to output the relay signal for the downstream RN to reception processing section 207, and instructs (gives a write instruction to) second memory 210 to store an interference signal (a relay signal for another terminal) input from reception processing section 207, and a channel estimation value between the serving cell and terminal 200.

Furthermore, timing control section 214 instructs (gives a write instruction to) first memory 203 to store a relay signal transmitted from the downstream RN among two relay apparatuses to which terminal 200 is connectable, which is input from RF receiving section 202, in period B. Also, in period B, when the relay signal from the downstream RN is stored in first memory 203, timing control section 214 instructs (gives a read instruction to) first memory 203 to output the stored relay signal from the downstream RN to reception processing section 207, and instructs (gives a write instruction to) second memory 210 to store a channel estimation value between the downstream RN and terminal 200, which is input from reception processing section 207.

Meanwhile, if the setting information input from odd/even number switching section 213 indicates an "even number" (if the serving cell is an even-numbered RN), timing control section 214 performs, in period B, processing similar to the processing performed in period A, and performs, in period A, processing similar to the processing performed in period B when the setting information indicates "odd number" in period A. In other words, the processing in period A and the processing in period B in timing control section 214 are interchanged between terminal 200 connected to an odd-numbered RN and terminal 200 connected to an even-numbered RN.

Furthermore, regardless of the setting information input from odd/even number switching section 213, timing control section 214 instructs (gives a write instruction to) first memory 203 to store signals from respective RNs, which are input from RF receiving section 202 in period C. In period C, when the signals from the respective RNs are stored in first memory 203, timing control section 214 instructs (gives a read instruction to) first memory 203 to output the stored signals from the respective RNs, to reception processing section 207, and instructs (gives a read instruction to) second memory 210 to output, to reception processing section 207, the interference signal, the channel estimation value between the serving cell and terminal 200 and the channel estimation value between the downstream RN and terminal 200, which are received in period A and period B. Also, timing control section 214 instructs (gives a write instruction to) second memory 210 to store a signal input from reception processing section 207 (a signal after interference removal).

Next, details of the connection-destination RN selection processing in selection section 206 (FIG. 3) in terminal 200 according to the present embodiment will be described.

Figure 4:
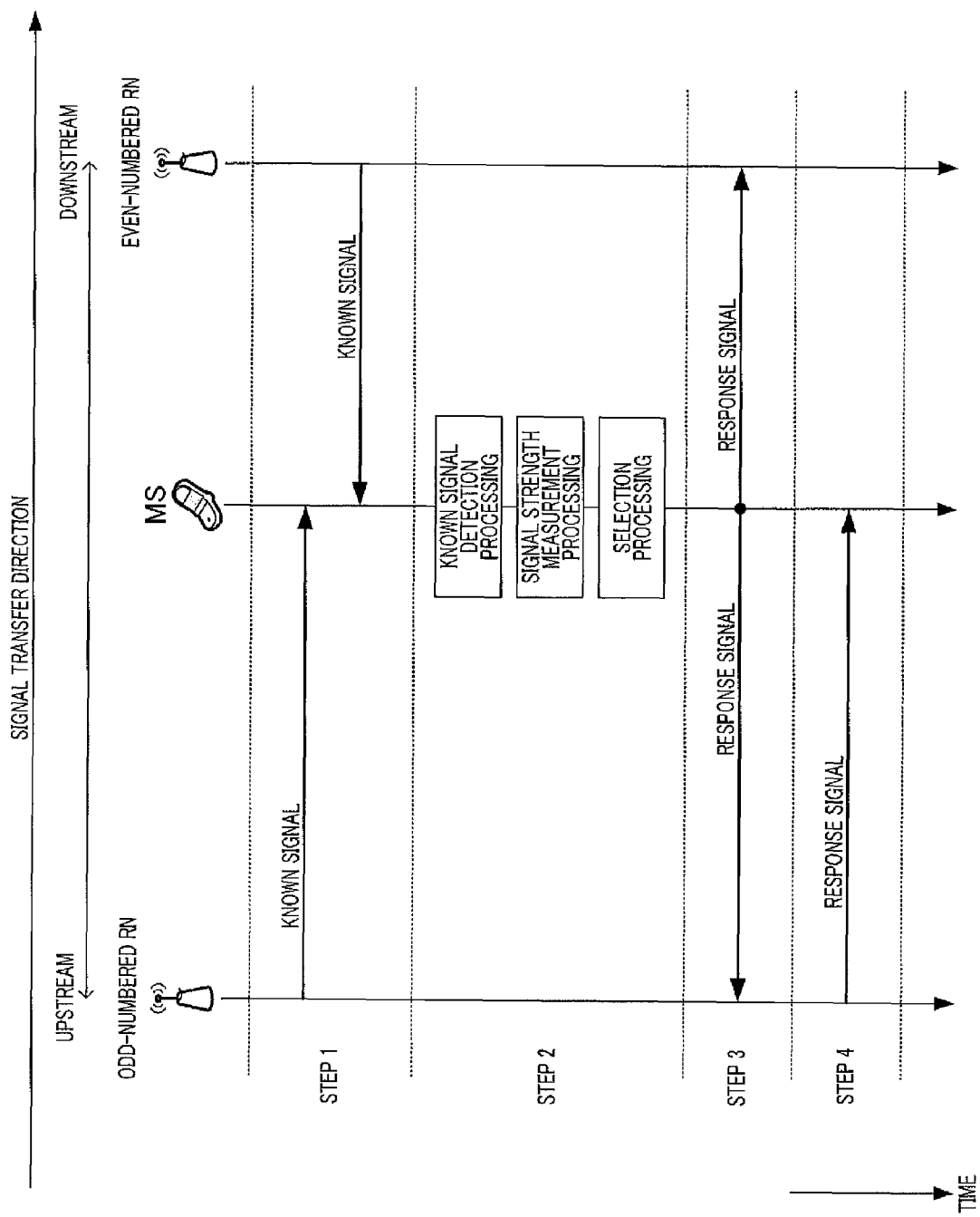
FIG. 4 is a diagram illustrating connection-destination RN selection processing in the terminal according to embodiment 1 of the present invention.

The below explanation is provided in terms of an MS (terminal 200) existing at a position where a coverage area of an odd-numbered RN (with an RN number of, for example, 2n+1) and a coverage area of an even-numbered RN (with a RN number of, for example, 2n+2) overlap each other as illustrated in FIG. 4. Furthermore, the odd-numbered RN illustrated in FIG. 4 transmits a relay signal to the even-numbered RN. In other words, in FIG. 4, between two adjacent relay apparatuses (the odd-numbered RN and the even-numbered RN), the odd-numbered RN is an upstream RN and the even-numbered RN is a downstream RN. The odd-numbered RN and the even-numbered RN illustrated in FIG. 4 each include the configuration of relay apparatus 100 illustrated in FIG. 2.

First, the odd-numbered RN and the even-numbered RN each transmit a known signal to the MS by means of a pre-set resource and pre-set transmission power (step 1 illustrated in FIG. 4). In FIG. 4, each of the odd-numbered RN and the even-numbered RN includes its own RN number in the known signal. Also, the known signals from the odd-numbered RN and the even-numbered RN are transmitted in a time-division multiplexed manner. Furthermore, the present invention is not limited to the case where the RN numbers of relay apparatuses are included in their respective known signals. The known signals maybe encoded using codes associated with the RN numbers of the relay apparatuses and then transmitted at the same timing. Here, since no connection-destination RN (serving cell) is selected in the MS (terminal 200), an indefinite value is input to timing control section 214 in the MS as setting information from odd/even number switching section 213. Therefore, timing control section 214 in the MS controls the reception timing (reception window width) to ensure reception of both known signals of the odd-numbered RN and the even-numbered RN illustrated in FIG. 4.

Then, known signal detection section 204 in the MS (terminal 200) detects the time-division multiplexed known signals (known signal detection processing in step 2 illustrated in FIG. 4). For example, in FIG. 4, known signal detection section 204 performs a correlation calculation of each of the known signals received in step 1 with each possible known signal pattern. Then, as a result of the correlation calculation, known signal detection section 204 detects a peak in a known signal pattern (for example, pattern #2n+1) of the odd-numbered RN (with an RN number of 2n+1) and a peak in a known signal pattern (for example, pattern #2n+2) of the even-numbered RN (with an RN number of 2n+2), thereby detecting the known signals respectively from the odd-numbered RN and the even-numbered RN.

Next, signal strength measuring section 205 measures a received signal intensity indicator $RSSI_{2n+1}$ of the odd-numbered RN and a received signal intensity indicator $RSSI_{2n+2}$ of the even-numbered RN using the known signal from the odd-numbered RN and the known signal from the even-numbered RN, which were detected by known signal detection section 204 (signal strength measurement processing in step 2 illustrated in FIG. 4).

Next, selection section 206 calculates a $SIR_{odd}$ for the odd-numbered RN illustrated in FIG. 4 according to, for example, equation 1 below and $SIR_{even}$ for the even-numbered RN illustrated in FIG. 4 according to, for example, equation 2 below in the MS (terminal 200) in a case where the odd-numbered RN and the even-numbered RN simultaneously transmit a signal.

$$[1]\,SIR_{odd}=10\,\log_{10}(RSSI_{2n+1}/RSSI_{2n+2}) \qquad \text{(Equation 1)}$$

$$[2]\,SIR_{even}=10\,\log_{10}(RSSI_{2n+2}/RSSI_{2n+1}) \qquad \text{(Equation 2)}$$

Then, selection section 206 compares calculated $SIR_{odd}$ and $SIR_{even}$ with pre-set threshold value $\alpha$ to determine the connection-destination RN, that is, the serving cell for the MS (terminal 200). More specifically, selection section 206 selects the serving cell according to conditions (1) to (4) below (selection processing in step 2 illustrated in FIG. 4).

Condition (1): $SIR_{odd} \geq \alpha$, $SIR_{even} \geq \alpha$ . . . . Serving cell RN number=2n+1

Condition (2): $SIR_{odd} \geq \alpha$, $SIR_{even} < \alpha$ . . . . Serving cell RN number=2n+1

Condition (3): $SIR_{odd} < \alpha$, $SIR_{even} \geq \alpha$ . . . . Serving cell RN number=2n+2

Condition (4): $SIR_{odd} < \alpha$, $SIR_{even} < \alpha$ . . . . Serving cell RN number=none (cell re-selection)

In other words, if both of the received signal strength indicators from two RNs (the odd-numbered RN and the even-numbered RN in FIG. 4) are not less than pre-set threshold value $\alpha$, selection section 206 selects connection to the upstream RN (the odd-numbered RN in FIG. 4) (condition (1)). Also, selection section 206 selects connection to the upstream RN (condition (2)) if the received signal strength indicator from the upstream RN (the odd-numbered RN in FIG. 4) is not less than threshold value $\alpha$ but the received signal strength indicator from the downstream RN (the even-numbered RN in FIG. 4) is less than threshold value $\alpha$ in the two RNs. Also, selection section 206 selects connection to the downstream RN (condition (3)) if the received signal strength indicator from the upstream RN (the odd-numbered RN in FIG. 4) is less than threshold value $\alpha$ but the received signal strength indicator from the downstream RN (the even-numbered RN in FIG. 4) is not less than threshold value $\alpha$ in the two RNs. Meanwhile, if both of the received signal strength indicators from the two RNs are less than threshold value $\alpha$, selection section 206 selects none of the RNs (none) and makes re-selection of the connection-destination RN (cell re-selection) (condition (4)).

Here, threshold value $\alpha$ may be either fixed or variable. Also, threshold value $\alpha$ may be different for each RN because of geographic reasons. Furthermore, threshold value $\alpha$ may be determined according to the extent of desired signal components in a dynamic range of an A/D converter generally used in terminal 200. Alternatively, for threshold value $\alpha$, an SIR satisfying a required error rate, which is obtained in advance by means of, e.g., a simulation, may be set. Alternatively, threshold value $\alpha$ may be determined using an SIR distribution between adjacent RNs, which is obtained in advance by actual measurements.

For example, it is assumed that both of $SIR_{odd}$ and $SIR_{even}$ calculated in signal strength measuring section 205 in the MS illustrated in FIG. 4 are not less than threshold value $\alpha$. In this case, selection section 206 in the MS selects the odd-numbered RN, which is the upstream RN, as the serving cell from among the odd-numbered RN and the even-numbered RN illustrated in FIG. 4, according to condition (1). As described above, if there are a plurality of RNs whose SIR is not less than threshold value $\alpha$, selection section 206 selects the most upstream RN as the serving cell from among the plurality of RNs whose SIR is not less than threshold value $\alpha$.

Next, the MS (terminal 200) illustrated in FIG. 4 transmits a response signal containing a terminal ID of the MS and the RN number (here, 2n+1) of the serving cell selected in selection section 206 to the odd-numbered RN and the even-numbered RN (step 3 illustrated in FIG. 4).

Next, the odd-numbered RN illustrated in FIG. 4 recognizes the MS (terminal corresponding to the terminal ID contained in the response signal) as a terminal under the control of this relay apparatus because the RN number (2n+1) of the serving cell contained in the response signal transmitted from the MS (terminal 200) coincides with the RN number (2n+1) of the relay apparatus. Then, the odd-numbered RN transmits a response signal to the MS (terminal 200) (step 4 illustrated in FIG. 4). Meanwhile, the even-numbered RN illustrated in FIG. 4 does not recognize the MS (terminal corresponding to the terminal ID contained in the response signal) as a terminal under the control of this relay apparatus because the RN number (2n+1) of the serving cell contained in the response signal transmitted from the MS (terminal 200) does not coincides with the RN number (2n+2) of the this relay apparatus.

Next, details of the interference removal processing in interference removal section 209 in terminal 200 according to the present embodiment will be described.

Figure 5:
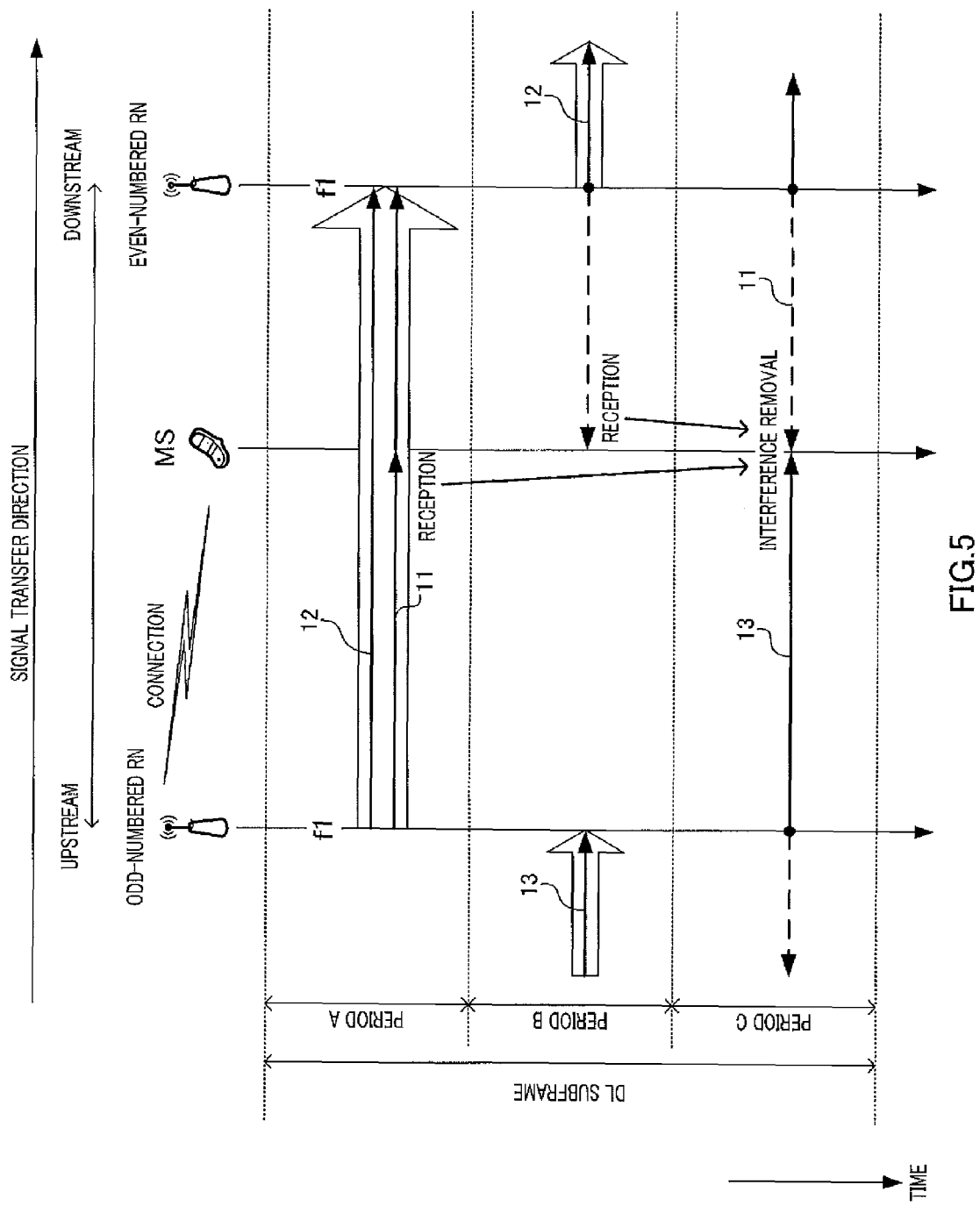
FIG. 5 is a diagram illustrating interference removal processing in the terminal according to embodiment 1 of the present invention.

The below explanation is provided in terms of an MS (terminal 200) existing at a position where a coverage area of an odd-numbered RN and a coverage area of an even-numbered RN overlap each other as illustrated in FIG. 5, as in FIG. 4. Also, as in FIG. 4, the odd-numbered RN is an upstream RN and the even-numbered RN is a downstream RN in FIG. 5. The odd-numbered RN and the even-numbered RN each illustrated in FIG. 5 include the configuration of relay apparatus 100 illustrated in FIG. 2.

Also, the MS (terminal 200) is connected to the odd-numbered RN in FIG. 5 in such a manner as described in FIG. 4. In other words, the odd-numbered RN is the serving cell for the MS (terminal 200).

As illustrated in FIG. 5, the odd-numbered RN transmits a relay signal to the even-numbered RN, which is a downstream RN, in period A of a DL subframe. The relay signal transmitted from the odd-numbered RN in period A illustrated in FIG. 5 contains signal 11 for a terminal connected to the even-numbered RN (a terminal other than the MS illustrated in FIG. 5) and signal 12 for a terminal connected to an RN positioned downstream of the even-numbered RN.

Figure 6:
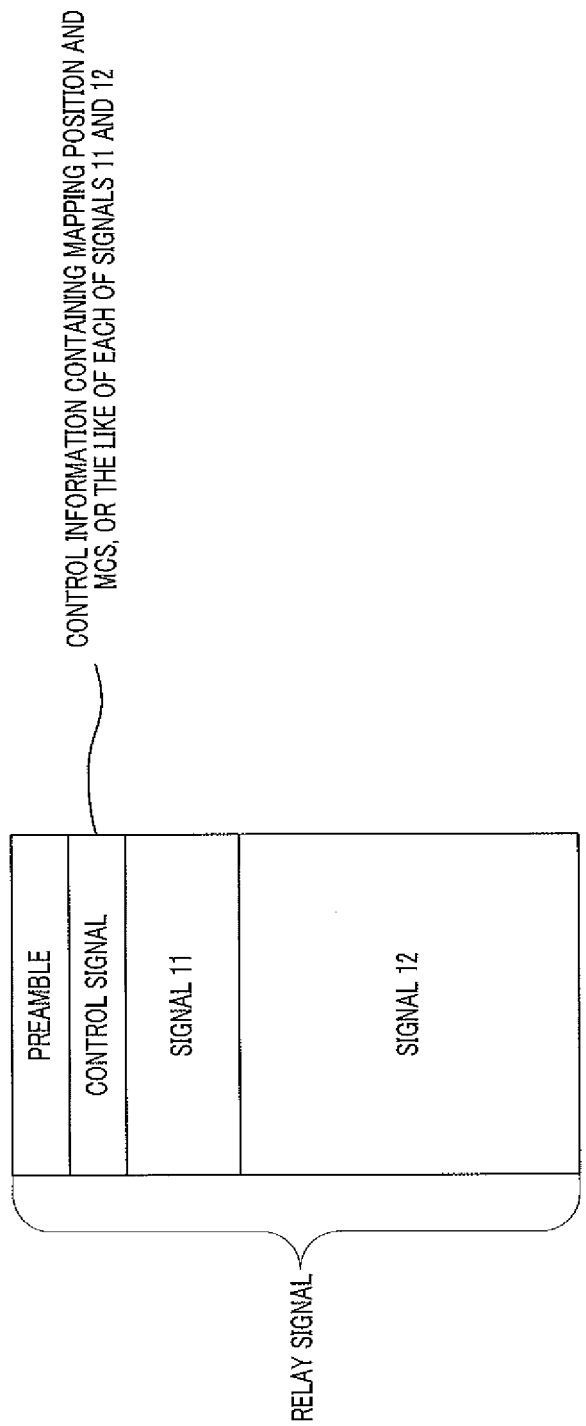
FIG. 6 is a diagram illustrating a relay signal transmitted between relay apparatuses according to embodiment 1 of the present invention.

Here, the MS (terminal 200) illustrated in FIG. 5 receives the signals transmitted to other terminals (signal 11 and signal 12) from the odd-numbered RN (upstream RN) to the even-numbered RN (downstream RN) in period A. More specifically, the signals (signal 11 and signal 12) received by RF receiving section 202 are stored in first memory 203 in the MS. Also, still more specifically, a relay signal transmitted between RNs contains a preamble signal, and control information containing, e.g., the mapping position and the MCS of each of signal 11 and signal 12 in the relay signal in addition to signal 11 and signal 12 as illustrated in FIG. 6 (here, in the case of period A). Therefore, reception processing section 207 (receiving section 208) in the MS obtains a channel estimation value between the odd-numbered RN (serving cell) and the MS from the preamble signal included in the relay signal (signal 11 and signal 12) in period A and outputs the channel estimation value to second memory 210. Next, reception processing section 207 (receiving section 208) in the MS performs demodulation and decoding of the control information contained in the relay signal (signal 11 and signal 12) in period A (information including the mapping position and MCS in the relay signal of the data signal for the signal 11). Here, an assumption is made that the preamble signal and the mapping position and MCS in the control information are known to the MS. Then, reception processing section 207 (receiving section 208) in the MS performs demodulation and decoding of the data signal contained in signal 11 based on the result of the decoding of the control information (the mapping position and the MCS), and stores the decoded data signal (signal that becomes an interference component in period C (hereinafter referred to as an "interference signal")) in second memory 210. Next, interference removal section 209 in the MS performs coding and modulation of the decoded data signal (interference signal) stored in second memory 210 and retains the modulated signal (that is, a replica of the interference signal in period C).

Next, in period B of the DL subframe illustrated in FIG. 5, the even-numbered RN illustrated in FIG. 5 transmits a relay signal to an odd-numbered RN (not illustrated), which is a downstream RN of the even-numbered RN. As illustrated in FIG. 5, the relay signal transmitted from the even-numbered RN contains signal 12 for a terminal connected to the RN positioned further downstream of the even-numbered RN, which is received from the upstream RN (odd-numbered RN) in period A.

Here, in period B, the MS (terminal 200) illustrated in FIG. 5 receives signal 12 transmitted from the even-numbered RN illustrated in FIG. 5 to the odd-numbered RN (not illustrated), which is a downstream RN. More specifically, signal 12 received by RF receiving section 202 is stored in first memory 203 in the MS. Then, reception processing section 207 (receiving section 208) in the MS calculates a channel estimation value between the even-numbered RN illustrated in FIG. 5 and the MS (that is, a channel estimation value for the interference signal) using a preamble signal contained in signal 12, and outputs the channel estimation value to second memory 210.

Furthermore, in period B, the odd-numbered RN illustrated in FIG. 5 receives signal 13 for the MS connected to the odd-numbered RN from a non-illustrated upstream apparatus (macrocell base station in the case of the most upstream RN or an even-numbered RN in the case of an RN other than the most upstream RN).

Next, in period C of the DL subframe illustrated in FIG. 5, the odd-numbered RN illustrated in FIG. 5 transmits signal 13 for the MS received in period B from the upstream apparatus (not illustrated), and the even-numbered RN illustrated in FIG. 5 transmits signal 11 for a terminal connected to the even-numbered RN (terminal other than the MS), which was received in period A from the upstream odd-numbered RN. Accordingly, in period C, the MS illustrated in FIG. 5 receives signal 13 (desired signal for the MS) from the odd-numbered RN (serving cell) and a signal containing signal 11 from the even-numbered RN (interference signal for the MS).

Then, in period C illustrated in FIG. 5, interference removal section 209 in the MS (terminal 200) removes signal 11, which is an interference signal, from the signal received in period C (signal containing signal 13 and signal 11), by using signal 11 obtained in period A (replica of the interference signal), the channel estimation value between the odd-numbered RN and the MS obtained in period A (channel estimation value for the desired signal), and the channel estimation value between the even-numbered RN and the MS obtained in period B (channel estimation value for the interference signal), thereby obtaining signal 13 directed to the MS (desired signal). Then, receiving section 208 in the MS performs demodulation and decoding of the signal after the interference removal (that is, signal 13), and stores the decoded signal in second memory 210.

As described above, in period A and period B of a DL subframe (that is, periods for communication between RNs), terminal 200 obtains a signal that becomes an interference signal in period C, which is subsequent to period A and period B (signal 11 in FIG. 5), and a channel estimation value of the signal that becomes the interference signal in period C.

Here, as illustrated in FIG. 5, in periods for communication between RNs (period A and period B), adjacent RNs perform transmission processing for a relay signal using the same frequency in mutually-different periods, respectively. For example, as illustrated in FIG. 5, the odd-numbered RN transmits a relay signal using frequency f1 in period A, while the even-numbered RN transmits a relay signal using frequency f1 in period B, which is different from period A. In other words, relay signals from two adjacent RNs are time-divided into period A and period B and thereby orthogonalized. Accordingly, each RN (relay apparatus 100) can transmit a relay signal to a downstream RN in either one of period A and period B without interference from an adjacent RN.

Consequently, terminal 200 (MS illustrated in FIG. 5) connectable to both of adjacent RNs can receive relay signals transmitted by the respective RNs to their downstream RNs without interference in period A and period B illustrated in FIG. 5, even if all of the RNs use the same frequency. For example, in FIG. 5, the MS (terminal 200) can receive only a signal transmitted from the odd-numbered RN (upstream RN) in period A and only a signal transmitted from the even-numbered RN (downstream RN) in period B.

Furthermore, when terminal 200 can be connected to a plurality of adjacent RNs, terminal 200 selects an upstream RN (RN positioned upstream in the signal transfer direction between the base station and the terminals; that is, an RN closest to the base station in downlink) among the plurality of adjacent RNs (two RNs in FIG. 5) as a serving cell.

Here, the signals received by the MS (terminals 200) in period A and period B illustrated in FIG. 5 (signals transmitted between RNs) are signals directed to terminals connected to RNs positioned downstream of the odd-numbered RN illustrated in FIG. 5 (serving cell for the MS), that is, signals directed to terminals other than the MS. In other words, the signals received by the MS (terminal 200) in period A and period B illustrated in FIG. 5 are signals that may be interference signals for the MS. Consequently, terminal 200 can recognize in advance the signals that may be interference signals for terminal 200, at times before a period for communication between the plurality of RNs and the terminals (period C illustrated in FIG. 5).

Accordingly, terminal 200 can remove the interference signals from signals transmitted from the plurality of RNs, using the interference signals recognized in advance and the channel estimation values of the interference signals. Incidentally, various interference cancellation techniques are known, and examples of such techniques include JD (joint detection) in which MLD (maximum likelihood detection) processing is performed on each of a desired signal (signal 13 in FIG. 5) and an interference signal (signal 11 in FIG. 5). It is known that in JD, interference can be removed with good precision if the channel estimation value of the desired signal and the channel estimation value of the interference signal are obtained. Meanwhile, since not only the channel estimation value of the desired signal and the channel estimation value of the interference signal but also the interference signal itself is known to terminal 200 in advance, even where the SIR is low, the interference signal can be removed with good precision, thus making it possible to obtain the desired signal.

As described above, according to the present embodiment, even when multihop communication is performed among a plurality of relay apparatuses using the same frequency, interference to a signal from a relay apparatus to which a terminal is connected, by a signal from another relay apparatus can be reduced.

The present embodiment has been described of a case where there is a RN positioned downstream of a different RN to which a terminal is connected. Here, there is no RN positioned downstream of the most downstream RN (RN farthest from a base station) among a plurality of RNs used in multihop communication. Thus, no interference owing to a signal transmitted from an RN other than the most downstream RN occurs in an MS that can be connected only to the most downstream RN. Accordingly, the MS connected to the most downstream RN only needs to receive a signal directed to the MS, which is transmitted from the most downstream RN, in period C without doing anything in period A and period B. Furthermore, since there is no RN positioned downstream of the most downstream RN among the plurality of RNs used in multihop communication, the most downstream RN does not transmit a relay signal for a downstream RN.

Furthermore, the present embodiment has been described taking a case where an odd-numbered RN is an upstream RN and an even-numbered RN is a downstream RN as an example in FIG. 4 and FIG. 5. However, the present invention is also applicable to a case where an even-numbered RN is an upstream RN and an odd-numbered RN is a downstream RN. More specifically, as in condition (1) described above, if both of the received signal strengths from two RNs (an even-numbered RN (upstream RN) and an odd-numbered RN (downstream RN)) are not less than pre-set threshold value α, a terminal may select connection to the even-numbered RN, which is an upstream RN. Then, upon connection of the terminal to the even-numbered RN, which is an upstream RN, the terminal may perform the processing performed in period A illustrated in FIG. 5 in period B and the processing performed in period B illustrated in FIG. 5 in period A.

Embodiment 2

The present embodiment is similar to embodiment 1 in that, if a certain terminal is connectable to two relay apparatuses, the terminal selects connection to an upstream RN from among the two relay apparatuses. The present embodiment will be described of a case where the upstream RN further generates control information (performs scheduling) for a terminal connected to the downstream RN, using control information for the terminal connected to this relay apparatus.

Figure 7:
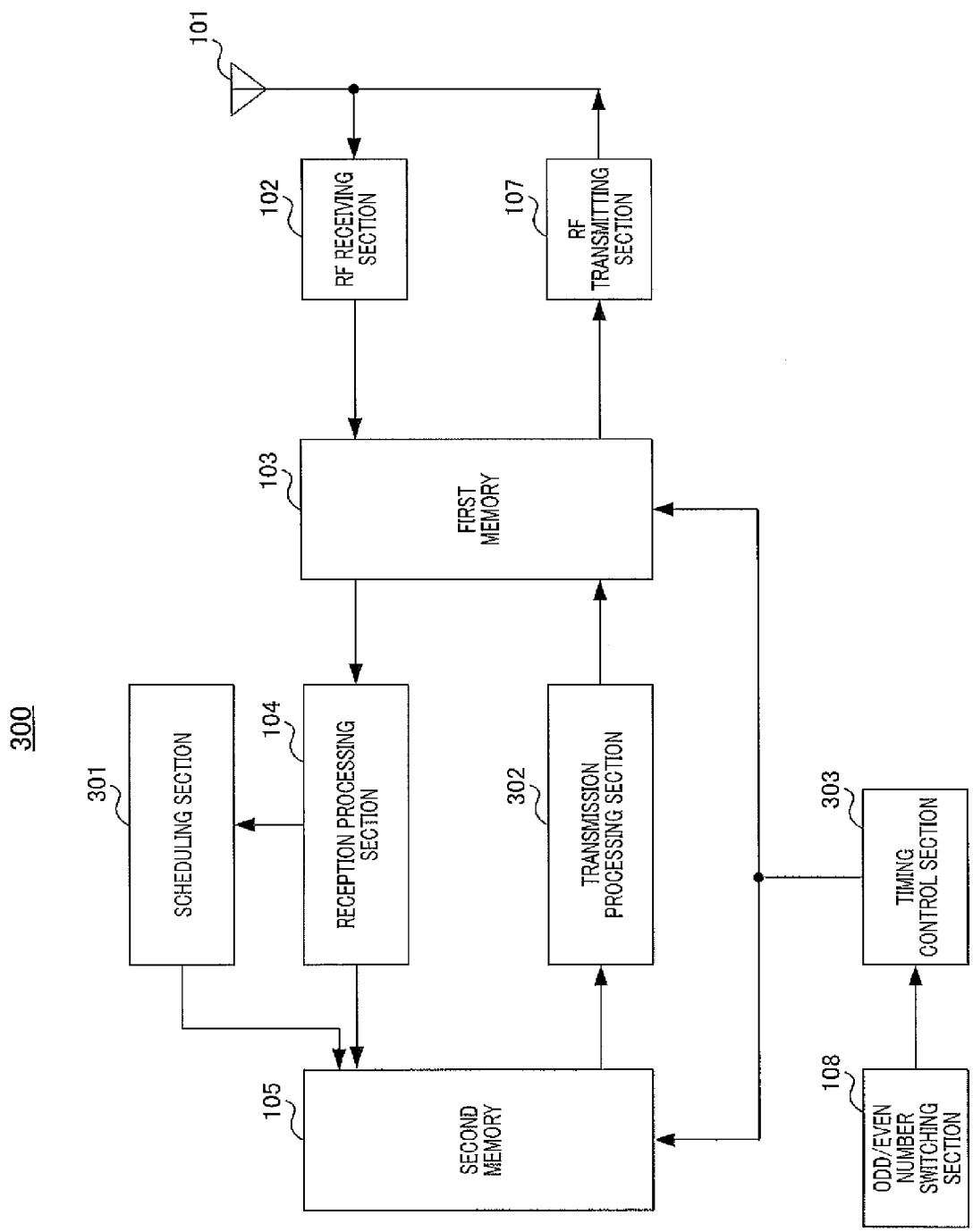
FIG. 7 is a block diagram illustrating a configuration of a relay apparatus according to embodiment 2 of the present invention.

A specific explanation of the present embodiment will be provided below. FIG. 7 is a block diagram illustrating a configuration of a relay apparatus according to the present embodiment. In relay apparatus 300 illustrated in FIG. 7, components that are the same as those of embodiment 1 (FIG. 2) are provided with reference numerals that are the same as those of embodiment 1 and explanation of the components will be omitted.

In relay apparatus 300 illustrated in FIG. 7, upon input of a relay signal for a terminal connected to relay apparatus 300 (terminal under the control of relay apparatus 300), scheduling section 301 extracts control information contained in the relay signal (that is, control information for the terminal under the control of relay apparatus 300). The control information contains, e.g., a mapping position and an MCS used when relay apparatus 300 relays data to the terminal in period C. Then, scheduling section 301 performs scheduling (determination of, e.g., a mapping position and an MCS) for a terminal connected to a relay apparatus (downstream RN) positioned downstream of relay apparatus 300 (terminal under the control of the downstream RN), using the control information for the terminal under the control of relay apparatus 300.

More specifically, scheduling section 301 determines a mapping position of a relay signal for the terminal under the control of the downstream RN, using the mapping position of the relay signal for the terminal under the control of relay apparatus 300 contained in the control information for the terminal under the control of relay apparatus 300. For example, scheduling section 301 may determine a result of adding a fixed offset to the mapping position of the relay signal for the terminal under the control of relay apparatus 300, as a mapping position of a relay signal for the terminal under the control of the downstream RN. Consequently, the terminal under the control of relay apparatus 300 identifies the mapping position of the relay signal for the terminal, enabling identification of a mapping position where an interference signal (relay signal for the terminal under the control of the downstream RN) is mapped. Alternatively, scheduling section 301 determines a mapping position where line quality is favorable among mapping positions for a relay signal for the terminal under the control of relay apparatus 300, as a mapping position for a relay signal for the terminal under the control of the downstream RN, and can avoid determining a mapping position where line quality is poor, as a mapping position for a relay signal for the terminal under the control of the downstream RN. Consequently, the terminal under the control of relay apparatus 300 can identify a mapping position where an interference signal is mapped. Furthermore, since no interference signal is mapped in a mapping position with a poor line quality, the terminal under the control of relay apparatus 300 can receive a desired signal without a considerable decrease in reception quality due to an effect of interference in a mapping position with a poor line quality.

Furthermore, scheduling section 301 determines an MCS of a relay signal for the terminal under the control of the downstream RN using the MCS of the relay signal for the terminal under the control of relay apparatus 300 contained in the control information for the terminal under the control of relay apparatus 300. For example, scheduling section 301 may determine an MCS that is the same as the MCS of the relay signal for the terminal under the control of relay apparatus 300 as the MCS for a relay signal for the terminal under the control of the downstream RN. Consequently, the terminal under the control of relay apparatus 300 identifies the MCS of the relay signal for the relevant terminal, enabling identification of an MCS for an interference signal (relay signal for the terminal under the control of the downstream RN), too. Alternatively, scheduling section 301 may determine an MCS that provides multilevel modulation with low transfer rate for a mapping position with a favorable line quality among mapping positions for relay signals for the terminal under the control of relay apparatus 300, and an MCS that provides multilevel modulation with high transfer rate for a mapping position with a poor line quality, as an MCS for a relay signal for the terminal under the control of the downstream RN. Consequently, the terminal under the control of relay apparatus 300 can increase contribution to interference removal processing for a known interference signal, enabling enhancement in precision of estimation of a desired signal.

Then, scheduling section 301 outputs the control information for the terminal under the control of relay apparatus 300 and the control information for the terminal under the control of the downstream RN to second memory 105.

Transmission processing section 302 performs encoding and modulation of the relay signal for the terminal under the control of relay apparatus 300 and the control information for the terminal under the control of relay apparatus 300 input from second memory 105, based on the control information for the terminal under the control of relay apparatus 300 input from second memory 105. Also, transmission processing section 302 performs pre-set encoding and modulation of the relay signal for the terminal under the control of the downstream RN and the control information for the terminal under the control of the downstream RN, which are input from second memory 105.

Timing control section 303 gives an instruction to first memory 103 and second memory 105 about timings for inputting/outputting the control information for the terminal under the control of relay apparatus 300 and the control information for the terminal under the control of the downstream RN, in addition to the processing performed by timing control section 109 in embodiment 1.

For example, if setting information input from odd/even number switching section 108 indicates "odd number" (if relay apparatus 300 is an odd-numbered RN), in period B, timing control section 303 instructs (gives a write instruction to) second memory 105 to store a scheduling result input from scheduling section 301 (the control information for the terminal under the control of relay apparatus 300 and the control information for the terminal under the control of the downstream RN), in addition to processing similar to that in timing control section 109. Furthermore, in period B, when the decoded signal (relay signal) is stored in second memory 105, timing control section 303 instructs (gives a read instruction to) second memory 105 to output the control information for the terminal under the control of relay apparatus 300 and the control information for the terminal under the control of the downstream RN to transmission processing section 302, in addition to processing similar to that in timing control section 109.

Meanwhile, if the setting information input from odd/even number switching section 108 indicates "even number" (if relay apparatus 300 is an even-numbered RN), timing control section 303 performs, in period A, the above-described processing performed in period B when the setting information indicates "odd number." In other words, period A and period B in timing control section 303 are interchanged between an odd-numbered RN and an even-numbered RN.

Figure 8:
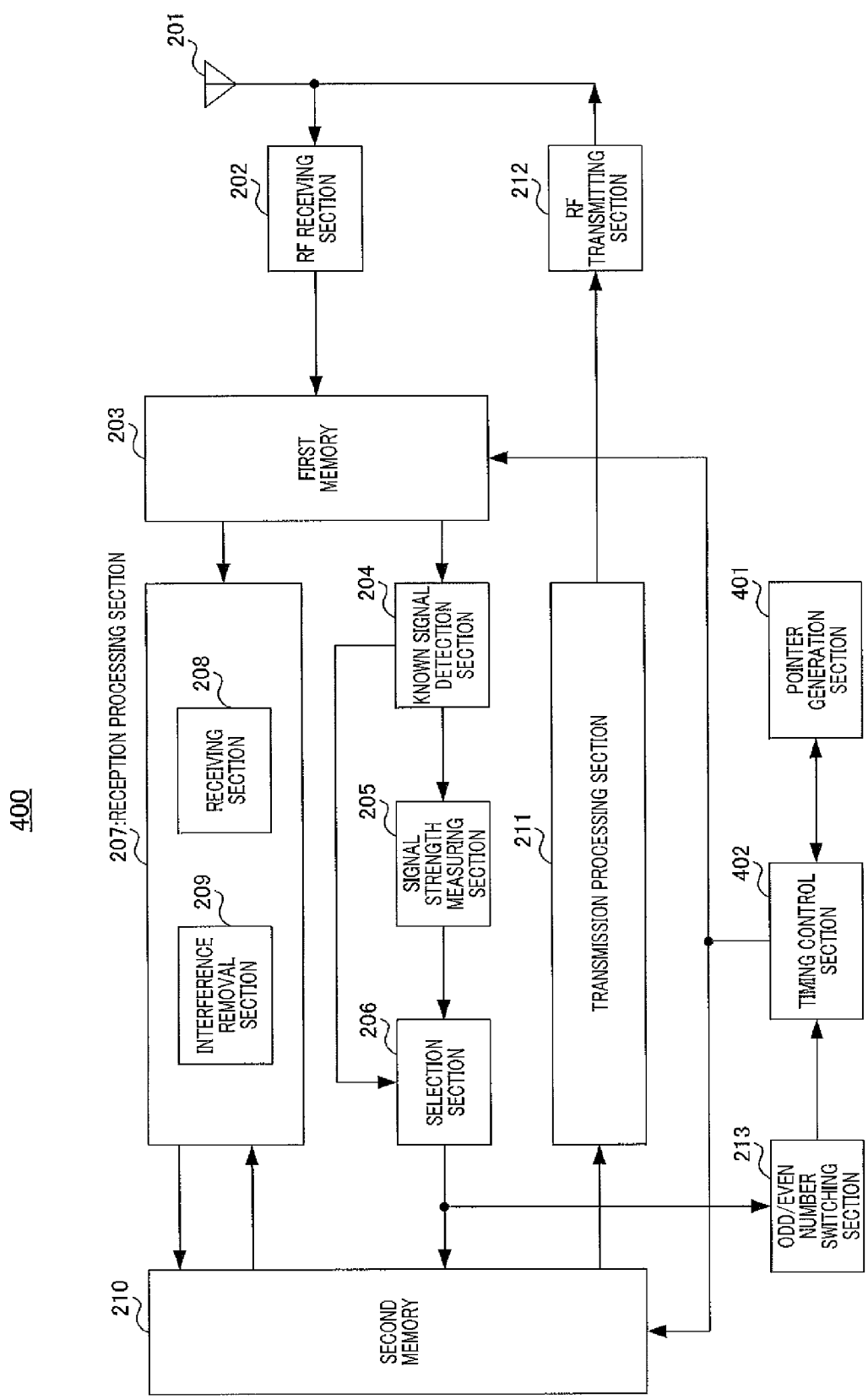
FIG. 8 is a block diagram illustrating a configuration of a terminal according to embodiment 2 of the present invention.

Next, a terminal according to the present embodiment will be described. FIG. 8 is a block diagram illustrating a configuration of the terminal according to the present embodiment. In terminal 400 illustrated in FIG. 8, components that are the same as those of embodiment 1 (FIG. 3) are provided with reference numerals that are the same as those of embodiment 1, and explanation of the components will be omitted.

In terminal 400 illustrated in FIG. 8, pointer generation section 401 generates a pointer for each storage address of control information for terminal 400 and of control information for a terminal under the control of a relay apparatus that is an RN positioned downstream of a serving cell (upstream RN) for terminal 400 using a DL subframe number input from timing control section 402.

It is assumed that the number of RNs that may be included in multihop communication, which is notified in advance, is N, the RN number of the serving cell for terminal 400 is L and a DL subframe number input from timing control section 402 is m, for example. Also, it is assumed that setting information in odd/even number switching section 213 is "odd number." In this case, in period A in DL subframe m, pointer generation section 401 outputs a pointer indicating storage address [m−L] for the control information for terminal 400 and a pointer indicating storage address [m−L] for the control information for the terminal under the control of the downstream RN to timing control section 402. Next, in period A, pointer generation section 401 outputs a pointer indicating storage address [m−N+1] for the control information for the terminal under the control of the downstream RN to timing control section 402. Also, in period C in DL subframe m, pointer generation section 401 outputs a pointer indicating storage address [m−N+1] for the control information for terminal 400 to timing control section 402.

Timing control section 402 outputs a DL subframe number at the present time (for example, DL subframe number m) to pointer generation section 401. Also, timing control section 402 gives an instruction to first memory 203 and second memory 210 about timings for inputting/outputting the control information for terminal 400 and the control information for the terminal under the control of the downstream RN using the pointers input from pointer generation section 401, in addition to the processing performed by timing control section 214 (FIG. 3) in embodiment 1.

For example, if the setting information input from odd/even number switching section 213 indicates "odd number" (if the serving cell is an odd-numbered RN), in period A in DL subframe m, timing control section 402 instructs (gives a write instruction to) second memory 210 to store the control information for terminal 400 (storage address [m−L]) and the control information for the terminal under the control of the downstream RN (storage address [m−L]), in addition to the processing performed by timing control section 214. Also, in period A, when an interference signal (relay signal for another terminal) is input from reception processing section 207 to second memory 210, timing control section 402 instructs (gives a read instruction to) second memory 210 to output the control information for the downstream RN (storage address [m−N+1]) to reception processing section 207 (interference removal section 209), in addition to the processing performed by timing control section 214. Consequently, interference removal section 209 performs encoding and modulation of the interference signal stored in second memory 210 based on the control information for the terminal under the control of the downstream RN (storage address [m−N+1]), and retains the interference signal after the modulation (replica of the interference signal in period C). Furthermore, in period C in DL subframe m, timing control section 402 instructs (gives a read instruction to) second memory 210 to output the control information for terminal 400 (storage address [m−N+1]) to reception processing section 207, in addition to the processing in timing control section 214.

Meanwhile, if the setting information input from odd/even number switching section 213 indicates "even number" (if the serving cell is an even-numbered RN), timing control section 402 performs, in period B, the processing performed in period A when the setting information indicates "odd number." In other words, the processing in period A and the processing in period B in timing control section 402 are interchanged between terminal 400 connected to an odd-numbered RN and terminal 400 connected to an even-numbered RN.

Next, details of the scheduling processing in relay apparatus 300 according to the present embodiment will be described.

Figure 9:
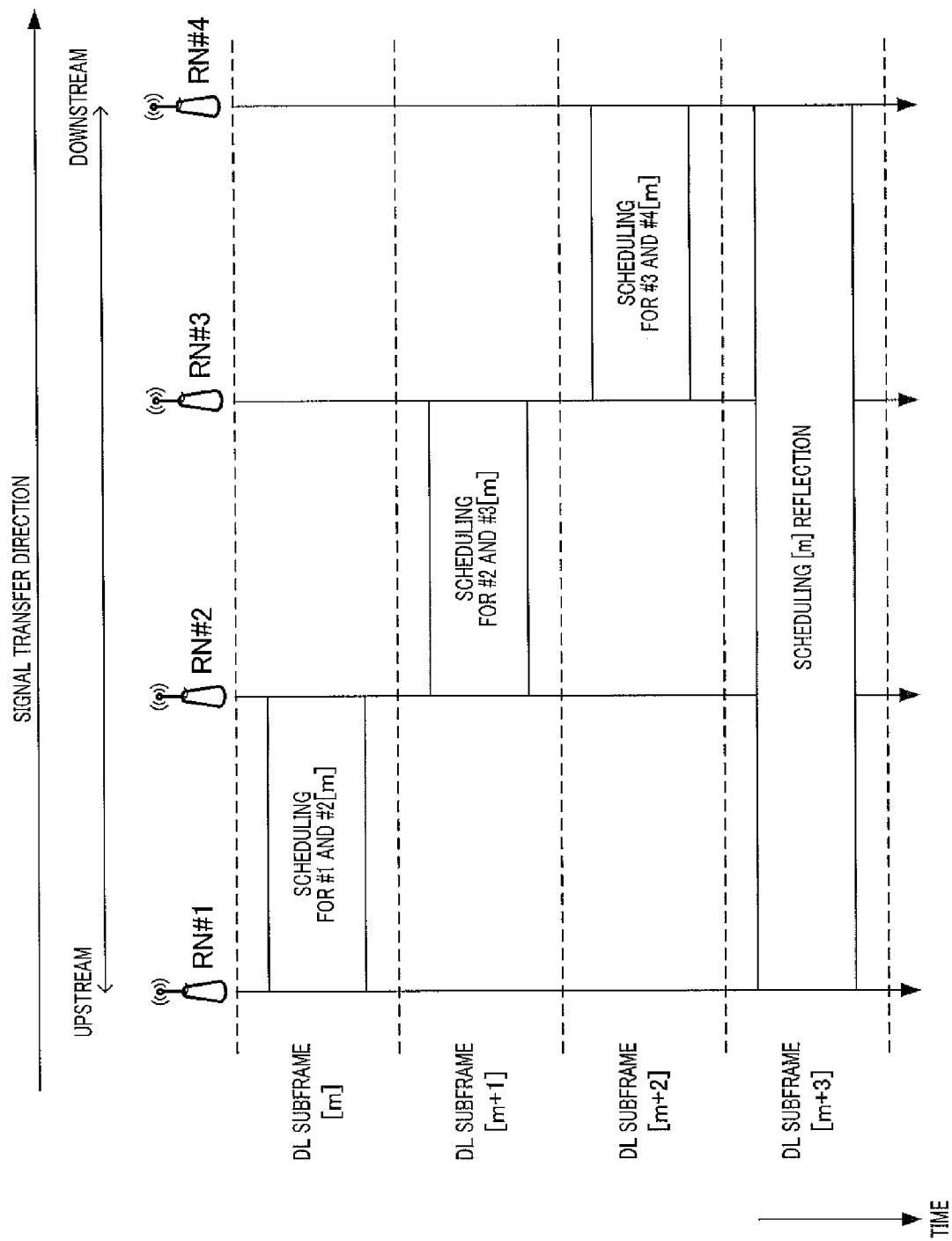
FIG. 9 is a diagram illustrating scheduling processing in relay apparatuses according to embodiment 2 of the present invention.
Figure 10:
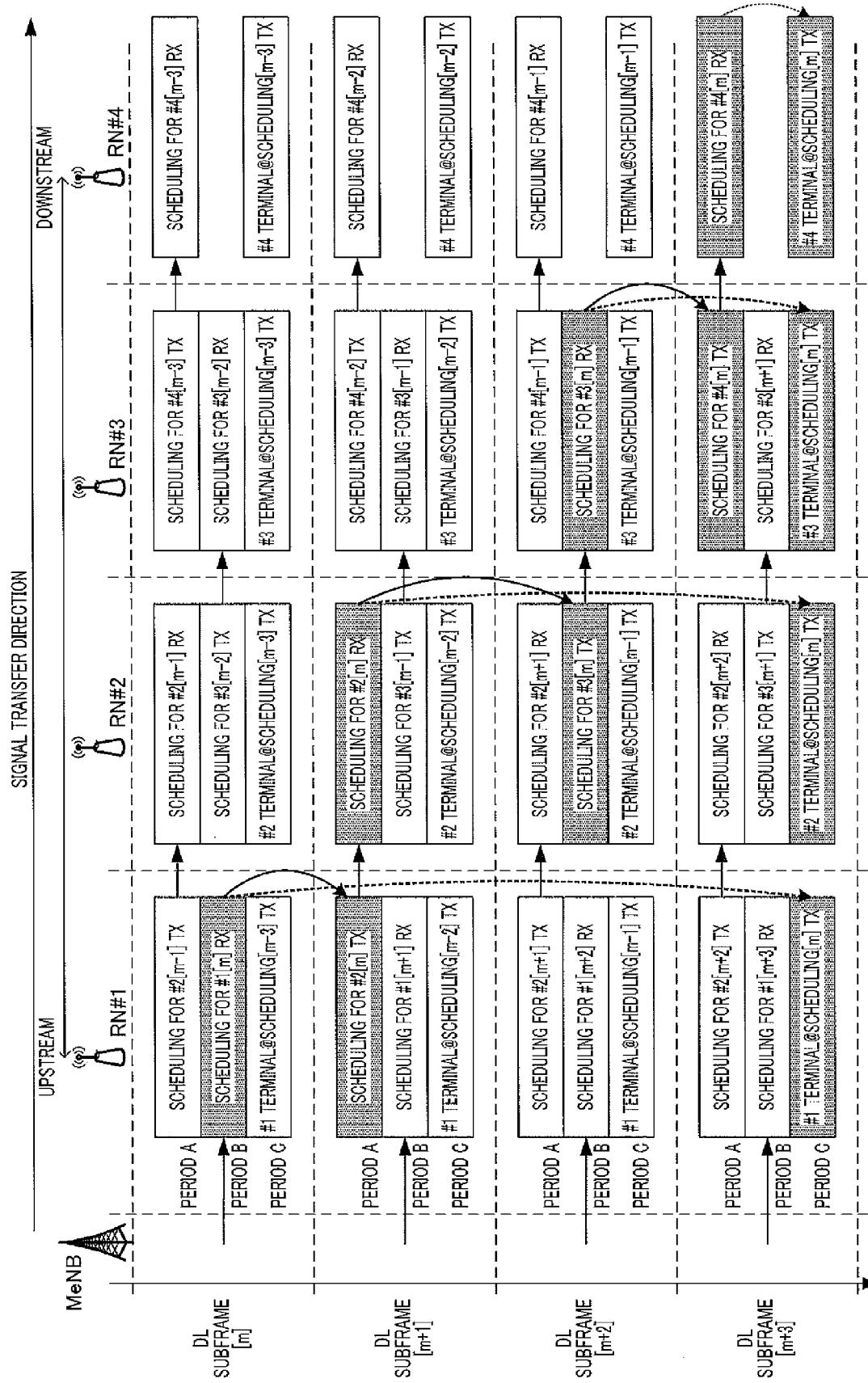
FIG. 10 is a diagram illustrating scheduling processing in the relay apparatuses according to embodiment 2 of the present invention.

The below explanation will be provided for a case where multihop communication is performed by four relay apparatuses RN#1 to RN#4 as illustrated in FIG. 9 and FIG. 10. In FIG. 9 and FIG. 10, RN#1 is the most upstream RN and RN#4 is the most downstream RN. RN#1 to RN#4 illustrated in FIG. 9 and FIG. 10 each include the configuration of relay apparatus 300 illustrated in FIG. 7.

Also, in FIG. 10, for example, a scheduling result (control information) for a terminal under the control of an RN having a RN number of α is represented by "SCHEDULING FOR #α." Also, in FIG. 9 and FIG. 10, a storage address for control information for a terminal under the control of RN#1 received by RN#1 (odd-numbered RN) from an upstream apparatus (macrocell base station MeNB in FIG. 10) in DL subframe [β] is represented by "[β]." Also, a storage address for control information for a terminal under the control of a downstream RN generated based on the control information in storage address [β] is represented by [β]. For example, control information for a terminal under the control of an RN with an RN number of 3, which is generated based on the control information received by RN#1 in DL subframe [β] (SCHEDULING FOR #1 [β]) is "SCHEDULING FOR #3 [β]." Also, a terminal under the control of an RN with an RN number of α is represented by "TERMINAL#α."

Also, in FIG. 10, transmission processing is represented by "TX" and reception processing is represented by "RX."

Also, here, in FIG. 9 and FIG. 10, an explanation will be provided focusing on processing from reception of control information for terminal#1 under the control of RN#1 (SCHEDULING FOR #1 [m]) by RN#1 (odd-numbered RN) in DL subframe [m] to processing to reflect the control information in the terminal.

In DL subframe [m] illustrated in FIG. 9 and FIG. 10, RN#1 receives control information for terminal#1 under the control of RN#1 from the apparatus positioned upstream of RN#1 (MeNB in FIG. 10). More specifically, in period B in DL subframe [m] illustrated in FIG. 10, RN #1 receives control information for terminal#1 under the control of RN#1 (SCHEDULING FOR #1 [m] illustrated in FIG. 10) from the upstream apparatus (MeNB) of RN#1. Then, scheduling section 301 in RN#1 performs scheduling processing for terminal#2 under the control of RN#2, which is a downstream RN of RN#1, using the control information for terminal#1 under the control of RN#1 (SCHEDULING FOR #1 [m] illustrated in FIG. 10). Consequently, scheduling section 301 in RN#1 obtains control information for terminal#2 under the control of RN#2 (SCHEDULING FOR #2 [m] illustrated in FIG. 10). In other words, in DL subframe [m], as illustrated in FIG. 9, RN#1 obtains scheduling results for terminal#1 under the control of RN#1 and terminal#2 under the control of RN#2.

Next, in DL subframe [m+1] illustrated in FIG. 9 and FIG. 10, RN#1 transmits the control information for terminal#2 under the control of RN#2 (SCHEDULING FOR #2 [m] illustrated in FIG. 10) in period A and RN#2 receives the control information for terminal#2 under the control of RN#2. Then, scheduling section 301 in RN#2 performs scheduling processing for terminal#3 under the control of RN#3, which is a downstream RN of RN#2, using the control information for terminal#2 under the control of RN#2 (SCHEDULING FOR #2 [m] illustrated in FIG. 10). Consequently, scheduling section 301 in RN#2 obtains control information for terminal#3 under the control of RN#3 (SCHEDULING FOR #3 [m] illustrated in FIG. 10). In other words, in DL subframe [m+1], RN#2 obtains scheduling results for terminal#2 under the control of RN#2 and terminal#3 under the control of RN#3 as illustrated in FIG. 9.

Also, in DL subframe [m+2] illustrated in FIG. 9 and FIG. 10, as in RN#1 and RN#2, RN#3 performs scheduling processing for #4 terminal under the control of RN#4, which is a downstream RN of RN#3, using the control information for terminal#3 under the control of RN#3 received in period B from RN#2 (SCHEDULING FOR #3 [m] illustrated in FIG. 10). Then, RN#3 transmits control information for terminal#4 under the control of RN#4 (SCHEDULING FOR #4 [m] illustrated in FIG. 10) to RN#4 in period A in DL subframe [m+3].

Then, in period C in DL subframe [m+3] illustrated in FIG. 9 and FIG. 10, all of the RNs, i.e., RN#1 to RN#4, simultaneously transmit relay signals for the terminals under the control of the respective RNs (TERMINALS#1 to #4 in FIG. 10) based on the scheduling results determined in DL subframes [m] to [m+2] (SCHEDULING FOR #1 TO #4 [m] illustrated in FIG. 9) to reflect the scheduling results in the terminals. More specifically, as illustrated in FIG. 10, RN#1 transmits a relay signal for terminal#1 under the control of RN#1 in period C (TERMINAL#1@SCHEDULING [m] TX illustrated in FIG. 10) using the control information for terminal#1 obtained in DL subframe [m] (SCHEDULING FOR #1 [m] illustrated in FIG. 10). Likewise, as illustrated in FIG. 10, RN#2 transmits a relay signal for terminal#2 under the control of RN#2 in period C (TERMINAL#2@SCHEDULING [m] TX illustrated in FIG. 10) using the control information for terminal#2 obtained in DL subframe [m+1] (SCHEDULING FOR #2 [m] illustrated in FIG. 10). The same applies to RN#3 and RN#4.

Next, details of the interference removal processing in terminal 400 according to the present embodiment will be described.

The below explanation will be provided for a case where multihop communication is performed by four relay apparatuses RN#1 to RN#4 (RN count N=4) as in FIG. 9 and FIG. 10. However, in FIG. 11, two RN#1 and RN#2 among RN#1 to RN#4 will be illustrated. Furthermore, as in FIG. 9 and FIG. 10, RN#1 is the most upstream RN and RN#4 is the most downstream RN. In other words, in RN#1 and RN#2 in FIG. 11, RN#1 is an upstream RN and RN#2 is a downstream RN. Also, in FIG. 11, terminal#1 is connected to RN#1 and terminal#2 is connected to RN#2. RN#1 and RN#2 illustrated in FIG. 11 each include the configuration of relay apparatus 300 illustrated in FIG. 7, and terminal#1 and terminal#2 each include the configuration of terminal 400 illustrated in FIG. 8.

Figure 11:
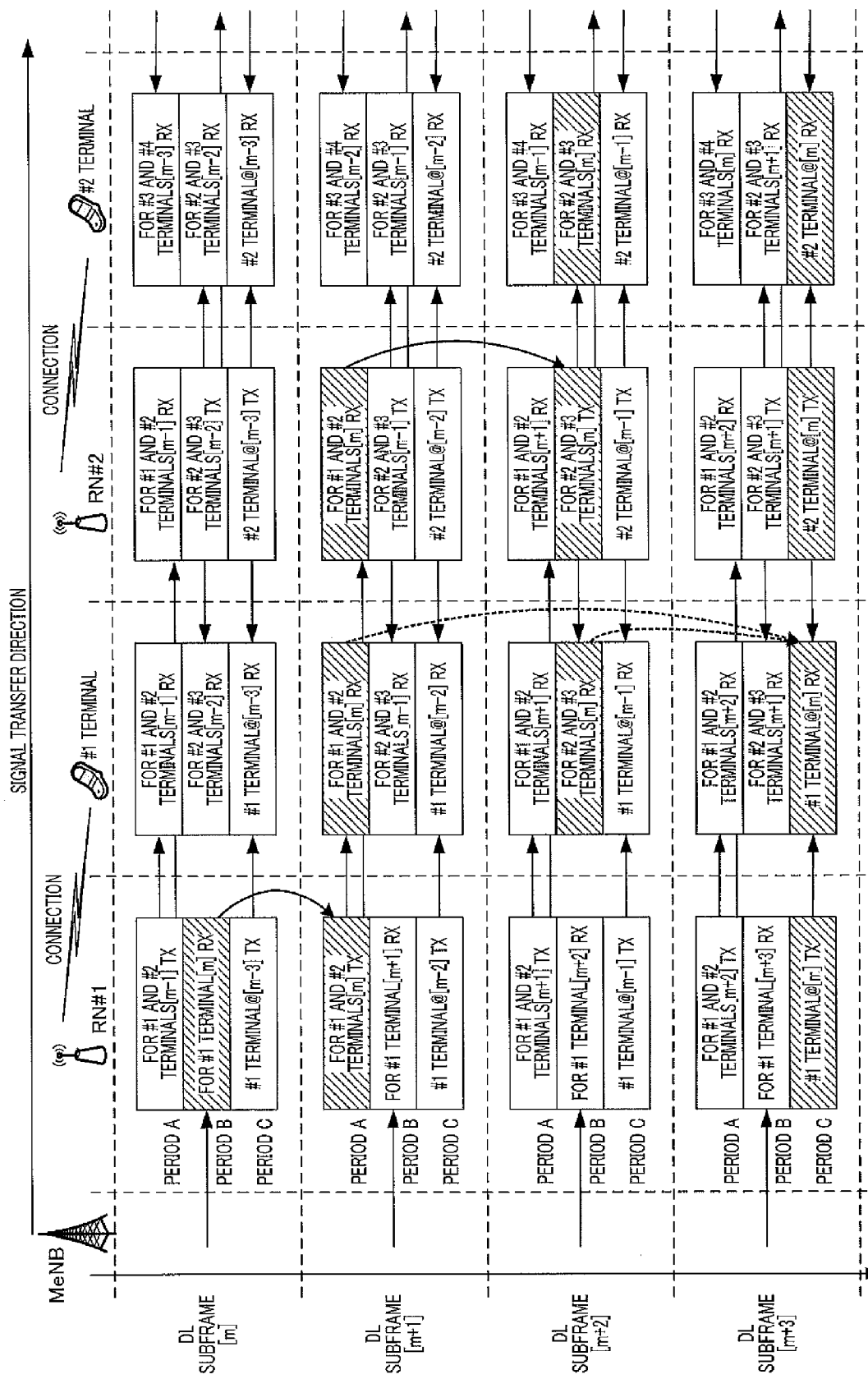
FIG. 11 is a diagram illustrating interference removal processing in the terminal according to embodiment 2 of the present invention.

Also, in FIG. 11, a relay signal for terminal#1 under the control of RN#1, which is received by RN#1 (with an RN number L of 1) in DL subframe [β] from an upstream apparatus (MeNB in FIG. 11) is represented by "FOR TERMINAL#1 [β]." Also, a storage address for control information for terminal#1 contained in the relay signal (for terminal#1 [β]) is represented by "[β]," and a storage address for control information for a terminal under the control of a downstream RN generated based on the control information in storage address [β] is represented by [β]. Also, in FIG. 11, a relay signal transmitted by an RN with an RN number of a to a terminal under the control of the RN with an RN number of a in period C in DL subframe [β] is represented by "TERMINAL#a@[β−N+1]." This means a relay signal transmitted based on control information for a terminal (storage address [β−N+1]).

Also, in FIG. 11, signal transmission processing is represented by "TX" and signal reception processing is represented by "RX."

First, an operation of terminal 400 in periods A to C in DL subframe m illustrated in FIG. 11 will be described. The below explanation will be provided taking an operation of a terminal under the control of an odd-numbered RN whose RN number L is an odd number (#1 terminal under the control of RN #1 (L=1) in FIG. 11) as an example. For processing in a terminal under the control of an even-numbered RN whose RN number L is an even number (terminal#2 under the control of RN#2 (L=2) in FIG. 11), the later-described processing in period B for the terminal under the control of the odd-numbered RN may be performed in period A and the processing in period A for the terminal under the control of the odd-numbered RN may be performed in period B.

In period A in DL subframe [m] illustrated in FIG. 11, terminal 400 (terminal under the control of an RN with an RN number of L) receives a signal from RN#1 to RN#2, thereby receiving a relay signal for terminal 400 and a relay signal (storage address [m−L]) for a terminal under the control of a downstream RN. For example, in period A in DL subframe [m] illustrated in FIG. 11, terminal#1 under the control of RN#1 (with an RN number L of 1) receives a relay signal for terminal#1 and a relay signal for terminal#2 (FOR TERMINALS#1 AND #2 [m−1] in FIG. 11). Here, control information for terminal#1 (FOR TERMINAL#1 [m−1]) contained in FOR TERMINALS#1 AND #2 [m−1] is control information received by RN#1 from MeNB in non-illustrated DL subframe [m−1]. Also, control information for terminal#2 (FOR TERMINAL#2 [m−1]) is control information generated by RN#1 in non-illustrated DL subframe [m−1] using the control information for terminal#1.

Then, as in embodiment 1, terminal#1 obtains a channel estimation value between terminal#1 and RN#1 (channel estimation value for a desired signal) from a preamble signal contained in the relay signal, and outputs the channel estimation value to second memory 210. Also, terminal#1 demodulates and decodes the control information contained in the respective relay signals (FOR TERMINALS#1 AND #2 [m−1]) to obtain the control information for terminal#1 (storage address [m−1]) and the control information for terminal#2 (storage address [m−1]), and stores the control information for terminal#1 and the control information for terminal#2 in second memory 210. Then, terminal#1 demodulates and decodes an interference signal (FOR TERMINAL#2 [m−1]) using control information contained in a relay signal between RNs in period A (control information containing a mapping position of the interference signal in the relay signal and an MCS: For example, the control information illustrated in FIG. 6) and a channel estimation value between terminal#1 and RN#1. Then, in terminal#1, the decoded interference signal, the control information for terminal#1 (storage address [m−1]) and the control information for terminal#2 (storage address [m−1]) are stored in second memory 210.

Furthermore, in period A, when an interference signal is stored in second memory 210, terminal 400 outputs the interference signal and control information for a terminal under the control of a downstream RN (storage address [m−N+1]), which are stored in second memory 210, to interference removal section 209. For example, terminal#1 illustrated in FIG. 11 outputs the interference signal (that is, the relay signal for terminal#2) and the control information for terminal#2 under the control of RN#2 (storage address [m−3]) to interference removal section 209. Then, interference removal section 209 in terminal#1 encodes and modulates the interference signal using the control information for terminal#2 (storage address [m−3]), and retains the modulated interference signal (replica of the interference signal in period C in DL subframe [m]).

In period B in DL subframe [m] illustrated in FIG. 11, terminal 400 (terminal under the control of an odd-numbered RN) performs processing similar to that performed by terminal 200 in embodiment 1 in period B. For example, terminal#1 illustrated in FIG. 11 receives a relay signal for terminal#2 and a relay signal for the #3 terminal (FOR TERMINALS#2 AND #3 [m−2] in FIG. 11) transmitted from RN#2 to RN#3. Using a preamble signal contained in the relay signal, terminal#1 illustrated in FIG. 11 obtains a channel estimation value between RN#2 and terminal#1 (channel estimation value for an interference signal).

In period C in DL subframe [m] illustrated in FIG. 11, terminal 400 (terminal under the control of an odd-numbered RN) outputs a channel estimation value between the upstream RN and terminal 400 (calculated in period A) and the previously-received control information for terminal 400 (storage address [m−N+1]), which are stored in second memory 210 to interference removal section 209. For example, in period A in DL subframe [m] illustrated in FIG. 11, terminal#1 under the control of RN #1 outputs the channel estimation value between RN#1 and terminal#1 and the control information for terminal#1 (storage address [m−3]) to reception processing section 207. Then, in period C, interference removal section 209 in terminal#1 removes the relay signal for terminal#2 (TERMINAL#2@[m−3] illustrated in FIG. 11), which is an interference signal from RN#2, from the signal received in period C, using the channel estimation value between RN#1 and terminal#1, the channel estimation value between RN#2 and terminal#1, the replica of the interference signal and the control information for terminal#1 (storage address [m−3]), thereby obtaining the relay signal for terminal#1 (TERMINAL#1@[m−3] illustrated in FIG. 11), which is a desired signal from RN#1.

Next, an explanation will be provided with reference to FIG. 11, focusing on processing from RN#1 (odd-numbered RN)'s reception of the relay signal for terminal#1 under the control of RN#1 (FOR TERMINAL#1 [m]) in DL subframe [m] to RN#1 (odd-numbered RN)'s transmission of the relay signal to terminal#1.

As illustrated in FIG. 9 and FIG. 10, upon reception of the relay signal for terminal#1 (FOR TERMINAL#1 [m]) in period B in DL subframe [m] illustrated in FIG. 11, RN#1 (scheduling section 301) generates control information for terminal#2 under the control of the downstream RN (storage address [m]) using the control information for terminal#1 contained in the relay signal for terminal#1 (FOR TERMINAL#1 [m]).

Then, in period A in DL subframe [m+1], RN#1 transmits a relay signal containing the control information for terminal#1 and the control information for terminal#2 (FOR TERMINALS#1 AND #2 [m] illustrated in FIG. 11) to RN#2. At this time, terminal#1 receives the relay signal (FOR TERMINALS#1 AND #2 [m] illustrated in FIG. 11) transmitted from RN#1 to RN#2. Then, as described above, terminal#1 obtains the interference signal (relay signal for terminal#2), the channel estimation value between RN#1 and terminal#1, the control information for terminal#1 and the control information for terminal#2, using the relay signal (FOR TERMINALS#1 AND #2 [m] illustrated in FIG. 11). Also, terminal#1 encodes and modulates the interference signal using the control information for terminal#2 (storage address [m−2]) and the interference signal to generate a replica of the interference signal in period C in DL subframe [m+1].

Also, upon receipt of the relay signal (FOR TERMINALS#1 AND #2 [m] illustrated in FIG. 11) in period A in DL subframe [m+1], RN#2 generates control information for terminal#3 (not illustrated) (storage address [m]) under the control of RN#3 (not illustrated), which is a downstream RN, using the control information for terminal#2 contained in the relay signal.

Then, in period B in DL subframe [m+2], RN#2 transmits a relay signal containing the control information for terminal#2 and the control information for terminal#3 (FOR TERMINALS#2 AND #3 [m] illustrated in FIG. 11) to RN#3 (not illustrated). At this time, terminal#1 receives the relay signal transmitted from RN#2 to RN#3 (FOR TERMINALS#2 AND #3 [m] illustrated in FIG. 11). Then, as described above, terminal#1 obtains a channel estimation value between RN#2 and terminal#1 using the relay signal (FOR TERMINALS#2 AND #3 [m] illustrated in FIG. 11).

Then, in period C in DL subframe [m+3], RN#1 transmits the relay signal for terminal#1 (TERMINAL#1@[m] illustrated in FIG. 11) to terminal#1, and RN#2 transmits the relay signal for terminal#2 (TERMINAL#2@[m] illustrated in FIG. 11) to terminal#2. Accordingly, the signal received by terminal#1 contains the relay signal for terminal#1 (TERMINAL#1@[m] illustrated in FIG. 11) and the relay signal for terminal#2 (TERMINAL#2@[m] illustrated in FIG. 11).

Therefore, as illustrated in FIG. 11, terminal#1 removes the relay signal for terminal#2 (TERMINAL#2@[m] illustrated in FIG. 11, that is, interference signal) from the signal received by terminal#1 in period C, using the interference signal (replica of the interference signal in period C), the channel estimation value between RN#1 and terminal#1 and the control information for terminal#1, which were obtained in period A in DL subframe [m+3], and the channel estimation value between RN#2 and the #1 terminal obtained in period B, thereby obtaining a relay signal for terminal#1 (TERMINAL#1@[m] illustrated in FIG. 11, that is, a desired signal).

As described above, in the present embodiment, the upstream RN (relay apparatus 300) performs scheduling processing for a terminal under the control of a downstream RN based on scheduling for a terminal under the control of this relay apparatus. Then, during communication between RNs (in period A or period B), the upstream RN (relay apparatus 300) transmits a relay signal containing control information for the terminal under the control of this relay apparatus and control information for the terminal under the control of the downstream RN to the downstream RN. Consequently, in period A or period B, terminal 400 connected to the upstream RN can receive control information for terminal 400 and the control information for the terminal under the control of the downstream RN without interference.

Consequently, terminal 400 can recognize not only a mapping position and an MCS of a relay signal for terminal 400 (desired signal) but also a mapping position and an MCS of a relay signal for another terminal (interference signal) before a time when terminal 400 actually receives the relay signal that becomes an interference signal (period C). Accordingly, terminal 400 can start preparation for interference removal processing (for example, processing for generating a replica of an interference signal or processing for selecting an interference removal method) at a point of time when terminal 400 obtains a signal that becomes the interference signal in period C (period A or period B), enabling a decrease in time required for reception processing for obtaining a desired signal.

As described above, according to the present embodiment, even in a case where multihop communication is performed between a plurality of relay apparatuses using the same frequency, as in embodiment 1, interference to a signal from a relay apparatus to which a terminal is connected, by a signal from another relay apparatus can be reduced. Furthermore, according to the present embodiment, a terminal can reliably obtain control information relating to an interference signal for removing the interference signal. Thus, it is made possible to ensure reduction in interference to a signal from a relay apparatus to which the terminal is connected, by a signal from another relay apparatus.

In the present embodiment, an explanation has been given, with reference to FIG. 11, of a case where terminal 400 under the control of an odd-numbered RN obtains control information for terminal 400 in period A (period B in the case of terminal 400 under the control of an even-numbered RN) and uses the control information in period C. However, the present invention is not limited to the case shown in FIG. 11. Terminal 400 may obtain control information for terminal 400 transmitted from an upstream RN in period C and use the control information. Likewise, in the present embodiment, an explanation has been given of a case where terminal 400 under the control of an odd-numbered RN obtains a channel estimation value between the odd-numbered RN and terminal 400 in period A and uses the channel estimation value in period C. However, the preset invention is not limited to this case. Terminal 400 may obtain a channel estimation value from a relay signal for terminal 400 transmitted from an upstream RN in period C and use the channel estimation value.

Also, the present embodiment has been described of a case where there is an RN positioned downstream of an RN to which a terminal is connected. However, since there is no downstream RN for the most downstream RN (RN farthest from a base station) among a plurality of RNs used in multihop communication, there occurs no interference due to a signal transmitted from an RN other than the most downstream RN in a terminal connectable only to the downstream RN. Accordingly, the terminal connected to the most downstream RN may receive a relay signal for the terminal transmitted from the most downstream RN in period C without doing anything in period A or period B. Then, the terminal may demodulate and decode the relay signal (data signal) in period C using a channel estimation value between the most downstream RN and the terminal, which is calculated using a preamble signal contained in the relay signal, and a mapping position and an MCS contained in control information contained in the relay signal. Also, the most downstream RN among the plurality of RNs used in multihop communication has no RN positioned downstream of this RN and thus, does not transmit a relay signal for a downstream RN.

Also, the present embodiment has been described of a case where an upstream RN among two adjacent RNs performs scheduling for a terminal under the control of a downstream RN. However, among a plurality of RNs performing multihop communication, the most upstream RN (or a macrocell base station) may perform scheduling for terminals under the control of all of the RNs (that is, all of the RNs positioned downstream).

Embodiment 3

The present embodiment is similar to embodiment 2 in that a terminal performs interference removal processing using control information for the terminal itself and control information for another terminal (control information on an interference signal), but different from embodiment 2 in the method for providing notification of control information used by the terminal.

In general, in a plurality of relay apparatuses (RN) included in multihop communication as described above are provided with a guard time for switching between transmission processing and reception processing.

An explanation will be given of case where an odd-numbered RN (upstream RN) and an even-numbered RN (downstream RN) adjacent to each other perform communication in period A to period C in a certain DL subframe, for example. In this example, the odd-numbered RN transmits a relay signal to the downstream RN in period A and receives a relay signal from an upstream apparatus in period B. Meanwhile, the even-numbered RN receives a relay signal from the upstream RN in period A and transmits a relay signal to a downstream RN in period B. In other words, the transmission processing and the reception processing are switched between period A and period B in the odd-numbered RN and the even-numbered RN (that is, all of the RNs). Accordingly, each of the RNs needs to have a guard time between period A and period B.

Also, the odd-numbered RN and the even-numbered RN transmit a relay signal to terminals under the control of the respective RNs in period C. Accordingly, between period B and period C, transmission processing and reception processing are switched in the odd-numbered RN while the even-numbered RN continues transmission processing. Accordingly, the odd-numbered RN needs to have a guard time between period B and period C. Meanwhile, the even-numbered RN does not need to have a guard time between period B and period C. In other words, in a period corresponding to a guard time between period B and period C, the odd-numbered RN cannot transmit a signal because of the switching between transmission/reception processing, while the even-numbered RN can transmit a signal because the even-numbered RN continues transmission processing.

As described above, in a guard time provided for the switching between transmission/reception processing in one RN (odd-numbered RN in the above example) among a plurality of adjacent RNs (a plurality of RNs to which a certain terminal is connectable), another RN (even-numbered RN in the above example) can transmit a signal to a terminal without interference owing to a signal from the one RN.

Also, in a radio communication system according to the present embodiment, downlink and uplink are alternately switched on a per subframe basis. In other words, immediately after (or immediately before) a DL subframe, an uplink subframe (hereinafter referred to as UL subframe) exists. More specifically, an UL subframe exists after period C among period A to period C in the above-described DL subframe.

Thus, in a plurality of relay apparatuses (RNs) included in multihop communication, a guard time is provided also when downlink and uplink are switched. For example, after the above-described DL subframe (in other words, after period C), a guard time is provided. Then, during the guard time, the plurality of RNs perform no transmission/reception processing.

Accordingly, in a guard time provided between downlink and uplink, only one RN (for example, an odd-numbered RN) among a plurality of adjacent RNs (RNs to both of which a certain terminal is connectable) transmits a signal, thereby enabling transmission of the signal to the terminal without interference owing to a signal from another RN (for example, an even-numbered RN).

Therefore, in the present embodiment, one relay apparatus among two adjacent relay apparatuses to both of which a certain terminal is connectable in a plurality of relay apparatuses (RNs) included in multihop communication transmits control information for a terminal under the control of the one relay apparatus in a guard time provided for switching between transmission/reception processing in the other relay apparatus, and the other relay apparatus transmits control information for a terminal under the control of the other relay apparatus in a guard time provided between downlink and uplink.

A more specific explanation of the present embodiment will be provided below. The present embodiment will be described for a radio communication system in which downlink and uplink are switched on a per subframe basis, a guard time (first guard time) is provided between a DL subframe and a UL subframe, and a guard time (second guard time) is provided between period B and period C in DL subframe m.

Figure 12:
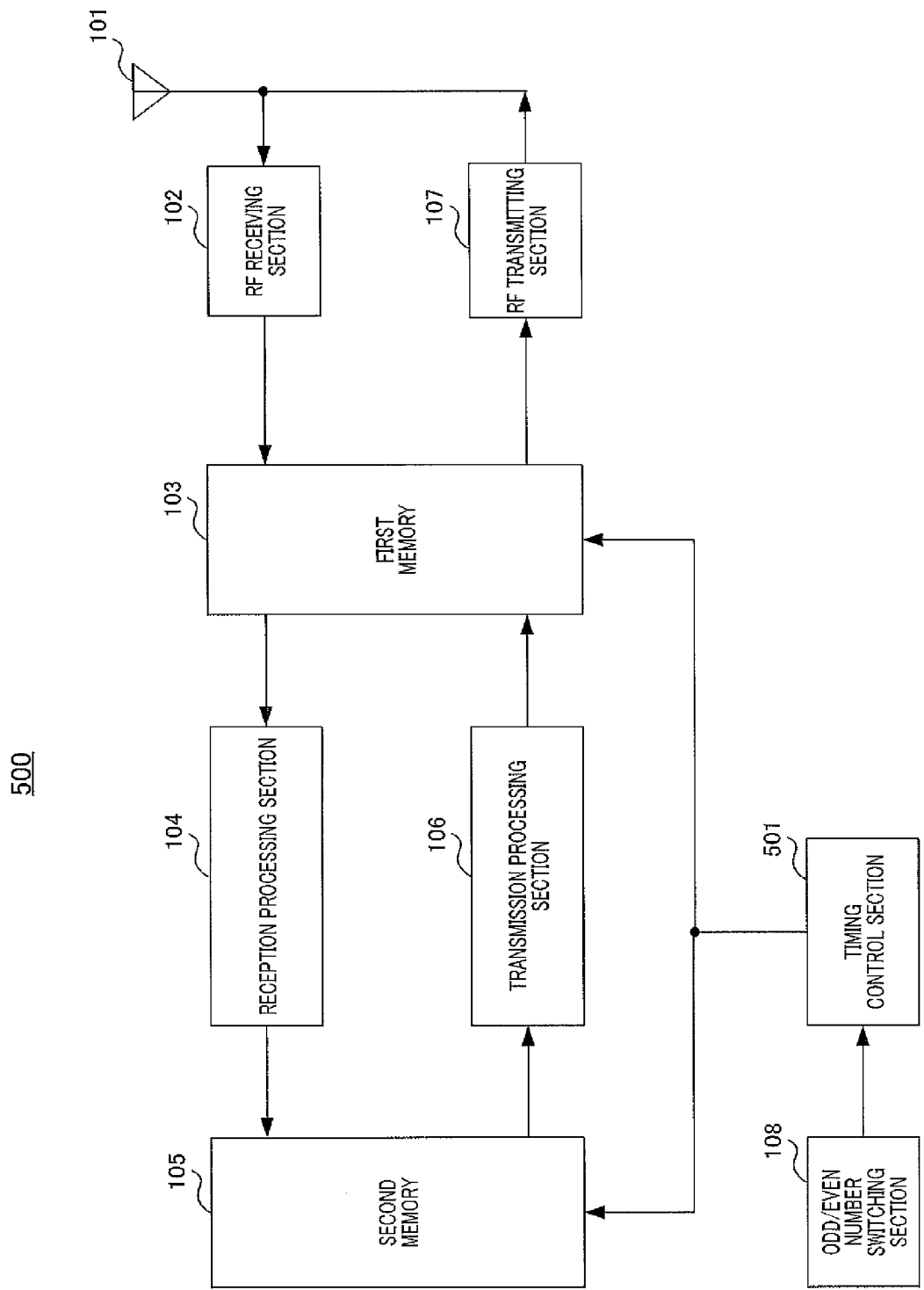
FIG. 12 is a block diagram illustrating a configuration of a relay apparatus according to embodiment 3 of the present invention.

FIG. 12 is a block diagram illustrating a configuration of a relay apparatus according to the present embodiment. In relay apparatus 500 illustrated in FIG. 12, components that are the same as those of embodiment 1 (FIG. 2) are provided with reference numerals that are the same as those of embodiment 1, and explanation of the components will be omitted.

In relay apparatus 500 illustrated in FIG. 12, timing control section 501 provides a guard time between period A and period B in each DL subframe, provides a guard time between period B and period C, and also provides a guard time between a DL subframe and a UL subframe, in addition to the processing performed by timing control section 109 in embodiment 1.

However, timing control section 501 controls input/output timings for first memory 103 and second memory 105 so as to transmit control information for a terminal under the control of relay apparatus 500 in either one of the guard time between period B and period C and the guard time between downlink and uplink.

For example, if setting information input from odd/even number switching section 108 indicates "odd number" (if relay apparatus 500 is an odd-numbered RN), timing control section 501 instructs (gives a read instruction to) second memory 105 to output the control information for the terminal under the control of relay apparatus 500 to transmission processing section 106 and instructs (gives a read instruction to) first memory 103 to output the control information for the terminal under the control of relay apparatus 500 to RF transmitting section 107 after period C, that is, a period corresponding to the guard time between downlink and uplink (hereinafter referred to as period post-C), in addition to processing similar to that in timing control section 109.

Meanwhile, if the setting information input from odd/even number switching section 108 indicates "even number", timing control section 501 instructs (gives a read instruction to) second memory 105 to output the control information for the terminal under the control of relay apparatus 500 to transmission processing section 106 and instructs (gives a read instruction to) first memory 103 to output the control information for the terminal under the control of relay apparatus 500 to RF transmitting section 107 in a period corresponding to the guard time between period B and period C (hereinafter referred to as period pre-C), in addition to processing similar to that in timing control section 109.

Figure 13:
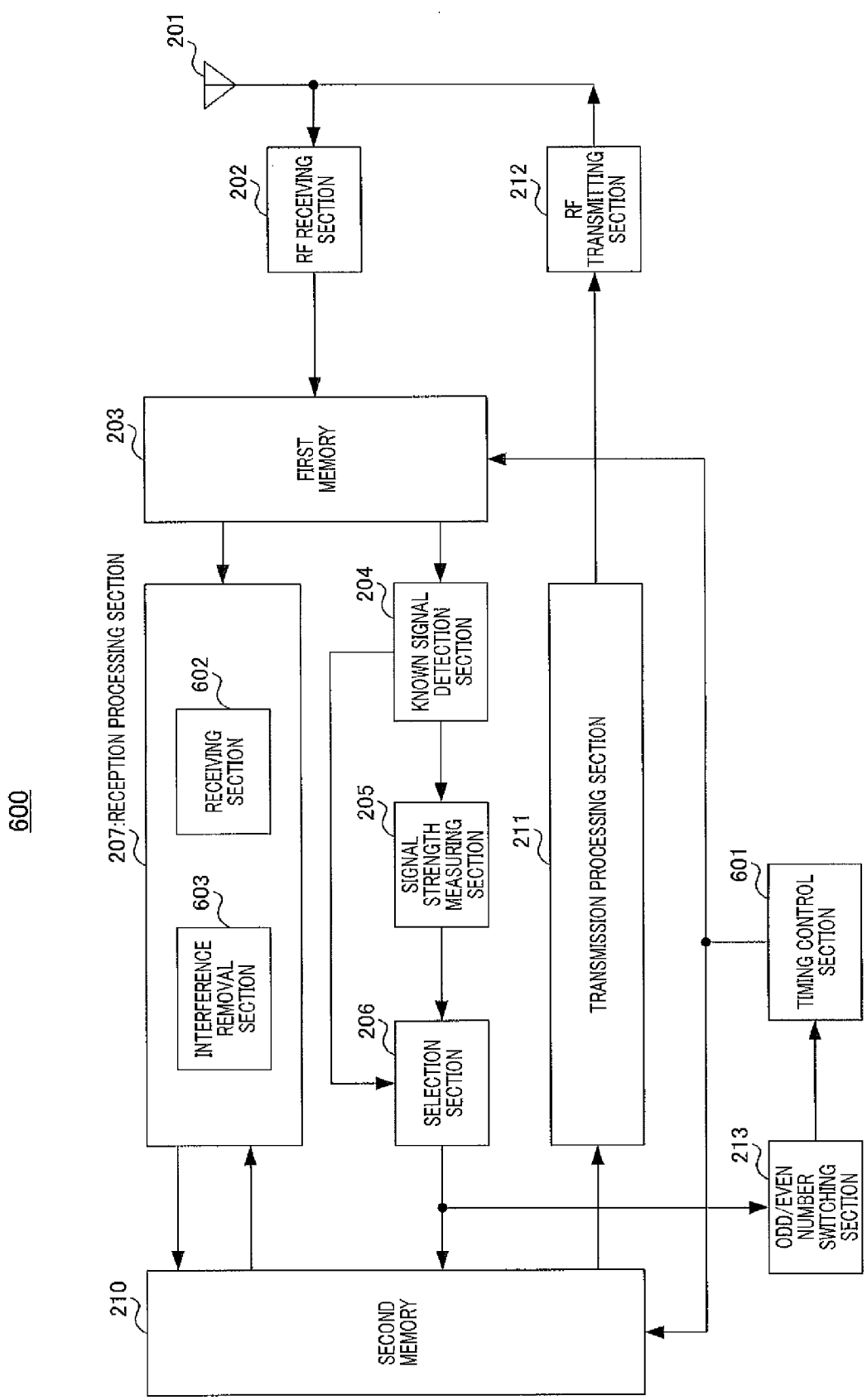
FIG. 13 is a block diagram illustrating a configuration of a terminal according to embodiment 3 of the present invention.

Next, a terminal according to the present embodiment will be described. FIG. 13 is a block diagram illustrating a configuration of a terminal according to the present embodiment. In terminal 600 illustrated in FIG. 13, components that are the same as those of embodiment 1 (FIG. 3) are provided with reference numerals that are the same as those of embodiment 1 and explanation of the components will be omitted.

In terminal 600 illustrated in FIG. 13, timing control section 601 controls input/output timings for first memory 203 and second memory 210 so as to receive control information for terminal 600 in either one of two periods, i.e., period pre-C corresponding to the guard time between period B and period C and period post-C corresponding to the guard time between downlink and uplink, and receive control information for a terminal under the control of a downstream RN in the other period, in addition to the processing in timing control section 214 (FIG. 3) in embodiment 1.

For example, a case where setting information input from odd/even number switching section 213 indicates "odd number" (if a serving cell is an odd-numbered RN) will be described. In this case, timing control section 601 instructs (gives a write instruction to) first memory 203 to store the control information for the terminal under the control of the downstream RN, which is input from RF receiving section 202 (that is, control information on an interference signal) in a period corresponding to the guard time between period B and period C (period pre-C). Also, in period pre-C, when the control information for the terminal under the control of the downstream RN is stored in first memory 203, timing control section 601 instructs (gives a read instruction to) first memory 203 to output the control information for the terminal under the control of the downstream RN to reception processing section 207, and instructs (gives a write instruction to) second memory 210 to store the control information for the terminal under the control of the downstream RN, which is input from reception processing section 207. Also, in period pre-C, when a decoded signal (signal that becomes an interference signal in period C) is stored in second memory 210, timing control section 601 instructs (gives a read instruction to) second memory 210 to output the interference signal (relay signal for the terminal under the control of the downstream RN) and the control information for the terminal under the control of the downstream RN to reception processing section 207 (interference removal section 603).

Also, in the period corresponding to the guard time between downlink and uplink (period post-C), timing control section 601 instructs (gives a write instruction to) first memory 203 to store the control information for terminal 600, which is input from RF receiving section 202. Also, in period post-C, upon the control information for terminal 600 being stored in first memory 203, timing control section 601 instructs (gives a read instruction to) first memory 203 to output the control information for terminal 600 to reception processing section 207 (receiving section 602) and instructs (gives a write instruction to) second memory 210 to store the control information for terminal 600 input from reception processing section 207 (receiving section 602).

Meanwhile, if the setting information input from odd/even number switching section 213 indicates "even number" (if the serving cell is an even-numbered RN), timing control section 601 performs the processing performed in period pre-C where the setting information indicates "odd number" in period post-C, and performs the processing performed in period post-C where the setting information indicates "odd number" in period pre-C. In other words, the processing in period pre-C and the processing in period post-C in timing control section 601 are interchanged between an odd-numbered RN and an even-numbered RN.

In period pre-C or period post-C, upon the control information for the terminal for the downstream RN (another terminal) being input from first memory 203, receiving section 602 of reception processing section 207 demodulates and decodes the control information for the terminal under the control of the downstream RN in addition to the processing in receiving section 208 in embodiment 1. Consequently, receiving section 602 obtains, e.g., a mapping position and an MCS of an interference signal (relay signal for the terminal under the control of the downstream RN). Then, receiving section 602 outputs the control information for the terminal under the control of the downstream RN after the decoding to second memory 210. Furthermore, in period pre-C or period post-C, upon the control information for terminal 600 being input from first memory 203, receiving section 602 demodulates and decodes the control information for terminal 600. Consequently, receiving section 602 obtains, e.g., a mapping position and an MCS of a relay signal for terminal 600 (desired signal). Then, receiving section 602 outputs the control information for terminal 600 after the decoding to second memory 210.

As in interference removal section 209 according to embodiment 1, in period pre-C or period post-C, upon the interference signal (relay signal for the terminal under the control of the downstream RN) and the control information for the terminal under the control of the downstream RN being input from second memory 210, interference removal section 603 of reception processing section 207 encodes and modulates the interference signal using the control information for the terminal under the control of the downstream RN. Then, interference removal section 603 retains the interference signal after the modulation (replica of the interference signal in period C). Then, as in embodiment 1, interference removal section 603 removes the interference signal from the signal received in period C, using the interference signal after the modulation, a channel estimation value between an upstream RN and terminal 600, a channel estimation value between the downstream RN and terminal 600 and the control information for terminal 600 (the mapping position and the MCS of the desired signal), thereby obtaining a relay signal for terminal 600 (desired signal).

Next, details of processing in relay apparatus 500 and terminal 600 according to the present embodiment will be described.

The below explanation will be provided in terms of a case where multihop communication is performed by three or more RNs. However, in FIG. 14, only two RNs 1 and 2 among the three or more RNs are illustrated. Also, RN1 is an upstream RN and RN 2 is a downstream RN between RN1 and RN2 illustrated in FIG. 14. Furthermore, in FIG. 14, MS1 is connected to RN1, and MS2 is connected to RN2. RN1 and RN2 illustrated in FIG. 14 each include the configuration of relay apparatus 500 illustrated in FIG. 12, and MS1 and MS2 each include the configuration of terminal 600 illustrated in FIG. 13.

Figure 14:
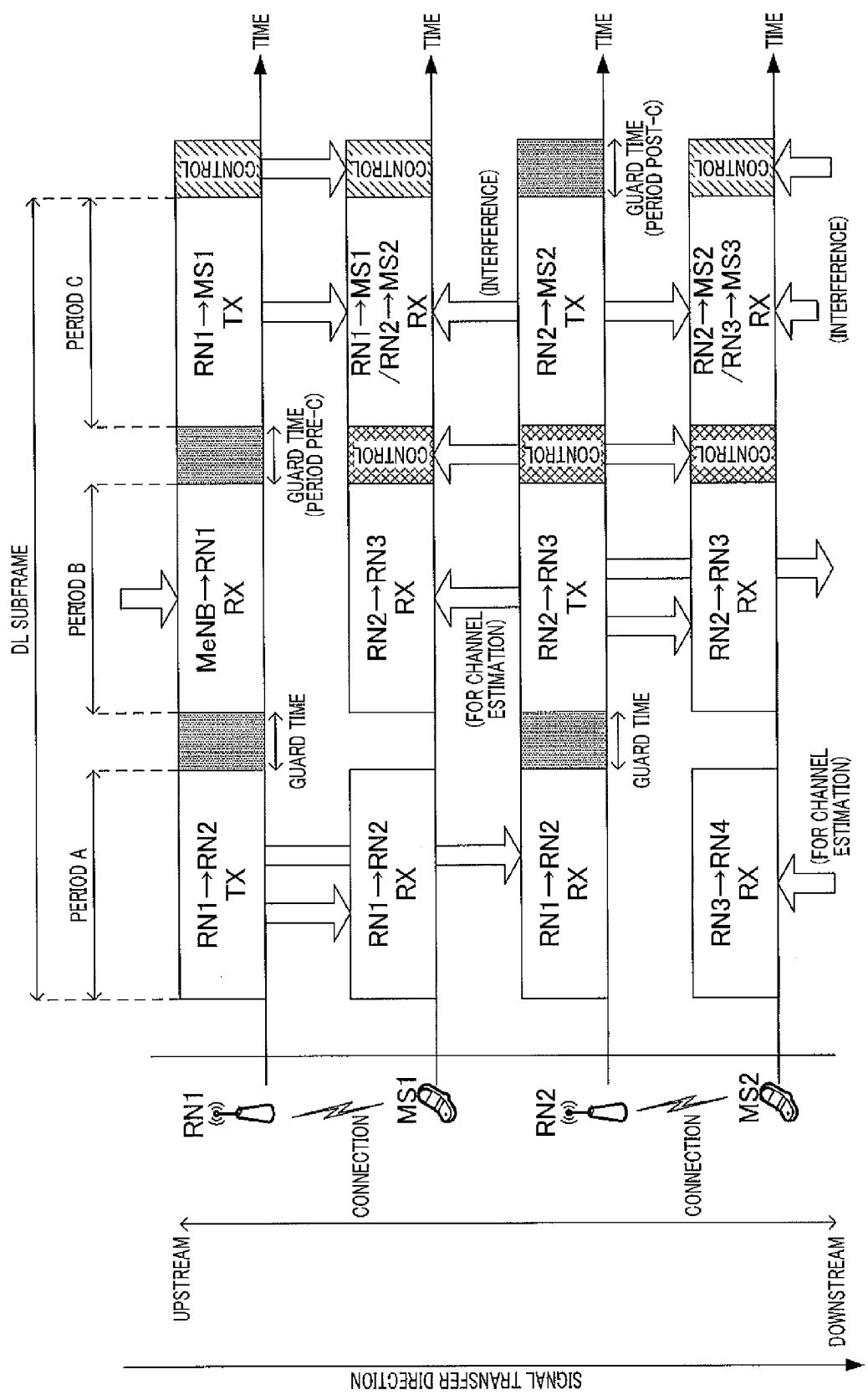
FIG. 14 is a diagram illustrating processing in relay apparatuses and terminals according to embodiment 3 of the present invention.

Also, in FIG. 14, transmission processing is represented by "TX," and reception processing is represented by "RX."

Here, an explanation will be provided focusing on interference removal processing in MS1 connected to RN1 (MS1 under the control of RN1).

In period A in the DL subframe illustrated in FIG. 14, RN1 transmits a relay signal for a terminal (MS2) under the control of RN2, which is a downstream RN of RN1, to RN2, and RN2 receives the relay signal for the terminal (MS2) under the control of RN2. At this time, MS1 (terminal under the control of RN1) positioned between RN1 and RN2 receives the relay signal for the terminal (MS2) under the control of RN2 transmitted from RN1 to RN2. Consequently, as in embodiment 1, MS1 obtains the relay signal for MS2 (signal that becomes an interference signal in period C) and a channel estimation value between RN1 and MS1.

Next, RN1 and RN2 (timing control section 501) provide a guard time between period A and period B illustrated in FIG. 14.

Next, in period B in the DL subframe illustrated in FIG. 14, RN1 receives a relay signal for MS1 under the control of RN1 from an upstream apparatus (MeNB in FIG. 14). Meanwhile, RN2 transmits a relay signal for MS3 (not illustrated) under the control of RN3, which is a downstream RN of RN2, to RN3. At this time, MS1 receives the relay signal for MS3 under the control of RN3 transmitted from RN2 to RN3. Consequently, MS1 obtains a channel estimation value between RN2 and MS1 (channel estimation value for the interference signal in period C) as in embodiment 1.

Next, RN1 (timing control section 501) provides a guard time (period pre-C) between period B and period C illustrated in FIG. 14. Meanwhile, in period pre-C corresponding to the guard time provided by RN1, RN2 transmits control information for MS2 under the control of RN2 to MS2. At this time, MS1 receives the control information for MS 2 (control information on the interference signal in period C) transmitted from RN2 to MS2.

Here, in period pre-C illustrated in FIG. 14, RN1 does nothing because of the switching between transmission/reception processing between period B (reception processing) and period C (transmission processing) (provides a guard time). Meanwhile, in period pre-C illustrated in FIG. 14, RN2 can transmit a signal even in period pre-C because both period B and period C relate to transmission processing. Accordingly, in period pre-C illustrated in FIG. 14, MS1 can receive a signal (control information of the interference signal) from RN2 without interference owing to a signal from RN 1. Then, in period pre-C, MS1 (interference removal section 603) encodes and modulates the interference signal (relay signal for MS 2) obtained in period A, using the control information of the interference signal obtained in period pre-C, thereby obtaining the demodulated interference signal (replica of the interference signal in period C).

Next, in period C in DL subframe illustrated in FIG. 14, RN1 transmits the relay signal for MS1 under the control of RN1 to MS1, and RN2 transmits the relay signal for MS2 under the control of RN2 to MS2. Accordingly, as illustrated in FIG. 14, MS1 receives a signal containing the relay signal for MS1 from RN1 (desired signal) and the relay signal for MS2 from RN2 (interference signal).

Next, after period C illustrated in FIG. 14, that is period post-C corresponding to the guard time between the DL subframe and a UL subframe (not illustrated), RN1 transmits the control information for the MS1 under the control of RN1 to MS1. Then, MS1 receives the control information for MS1 transmitted from RN1 to MS1 (control information on the desired signal). Meanwhile, RN2 (timing control section 501) provides a guard time (period post-C) between the DL subframe illustrated in FIG. 14 and the UL subframe (not illustrated).

Here, in period post-C illustrated in FIG. 14, RN2 does nothing (provides a guard time) because of switching between downlink and uplink. Meanwhile, in period post-C illustrated in FIG. 14, RN1 transmits the control information for the terminal under the control of RN1. Accordingly, as in period pre-C, in period post-C illustrated in FIG. 14, MS1 can receive the signal from RN1 (control information on the desired signal) without interference owning to the signal from RN2.

Then, as in embodiment 1, MS1 (interference removal section 603) illustrated in FIG. 14 removes the interference signal (relay signal for MS2) transmitted by RN2 in period C from the signal received in period C, using the interference signal (interference signal modulated in period pre-C) obtained in period A, the channel estimation value between RN1 and MS1 (channel estimation value of the desired signal) obtained in period A, the channel estimation value between RN2 and MS1 (channel estimation value for the interference signal) obtained in period B and control information on the desired signal (control information for MS1) obtained in period post-C, thereby obtaining the desired signal (relay signal for MS1).

Here, the explanation has been provided for terminal 600 (MS1) under the control of an odd-numbered RN (RN1). Meanwhile, in the case of terminal 600 (MS2) under the control of an even-numbered RN (RN2), the processing in period A and the processing in period pre-C in the terminal under the control of the odd-numbered RN may be performed in period B and period post-C, the processing in period B and the processing in period post-C in the terminal under the control of the odd-numbered RN may be performed in period A and period pre-C.

For example, in period A, MS2 under the control of RN2 illustrated in FIG. 14 (even-numbered RN) receives a relay signal for a terminal under the control of RN4 transmitted from RN3 (not illustrated), and obtains a channel estimation value between RN3 and MS2 (channel estimation value for an interference signal). Also, in period B, MS2 receives a relay signal for MS3 under the control of RN 3, which is transmitted from RN2, and obtains an interference signal for MS2 and a channel estimation value between RN2 and MS2 (channel estimation value for a desired signal). Also, in period pre-C, MS2 obtains control information for MS2 (control information on the desired signal) transmitted from RN2. Also, in period post-C, MS2 obtains control information for MS3 (control information on the interference signal) transmitted from RN3 (not illustrated). Consequently, as in a terminal under the control of an odd-numbered RN (MS1 in FIG. 14), a terminal under the control of an even-numbered RN (MS2 in FIG. 14) removes an interference signal from a signal received in period C, thereby obtaining a desired signal.

As described above, in the present embodiment, relay apparatus 500 (every RN) transmits control information for a terminal under the control of relay apparatus 500 in either one of a guard time between period B and period C (guard time provided for switching between transmission/reception processing (period pre-C)) and a guard time between downlink and uplink (guard time provided for switching between downlink and uplink (period post-C)). Then, in the guard time between period B and period C or the guard time between downlink and uplink, terminal 600 receives control information for terminal 600 (control information on a desired signal) transmitted from an upstream RN and control information for another terminal (control information on an interference signal) transmitted from a downstream RN.

More specifically, in the guard time between period B and period C, terminal 600 can receive control information from a relay apparatus not needing switching between transmission/reception processing (even-numbered RN in FIG. 14), without interference owing to a signal from a relay apparatus needing switching between transmission/reception processing (odd-numbered RN in FIG. 14).

Likewise, in the guard time between downlink and uplink, terminal 600 can receive control information from one relay apparatus among two adjacent relay apparatuses to which terminal 600 is connectable (that is, a relay apparatus needing to provide a guard time between period B and period C; the odd-numbered RN in FIG. 14), without interference owing to a signal from the other relay apparatus (the even-numbered RN in FIG. 14).

As described above, according to the present embodiment, even if multihop communication is performed between a plurality of relay apparatuses using the same frequency, as in embodiment 1, interference to a signal from a relay apparatus to which a terminal is connected, by a signal from another relay apparatus can be reduced. Furthermore, according to the present embodiment, a terminal can reliably obtain control information on an interference signal, using a guard time for switching between transmission/reception processing in a relay apparatus or a guard time for switching between downlink and uplink for communication of control information. Thus, in the present embodiment, as in embodiment 2, interference to a signal from a relay apparatus to which a terminal is connected, by a signal from another relay apparatus can reliably be reduced.

The present embodiment has been described for a case where, for example, in period pre-C and period post-C illustrated in FIG. 14, control information (e.g., a mapping position and an MCS) for a desired signal and control information on an interference signal are transmitted. However, for example, in period pre-C and period post-C illustrated in FIG. 14, not only control information such as a mapping position and an MCS but also other data may be transmitted. Examples of information transmitted in period pre-C and period post-C can include information providing notification of change in configuration of a multihop communication network (number of RNs after the change or an RN number of an newly-added RN), information indicating a data type of the relay signal, notification of handover, a known signal for performing channel estimation and information indicating an interference level.

Embodiment 4

While embodiments 1 to 3 have been described for multihop communication in downlink, the present embodiment will be described for multihop communication in uplink.

Figure 15:
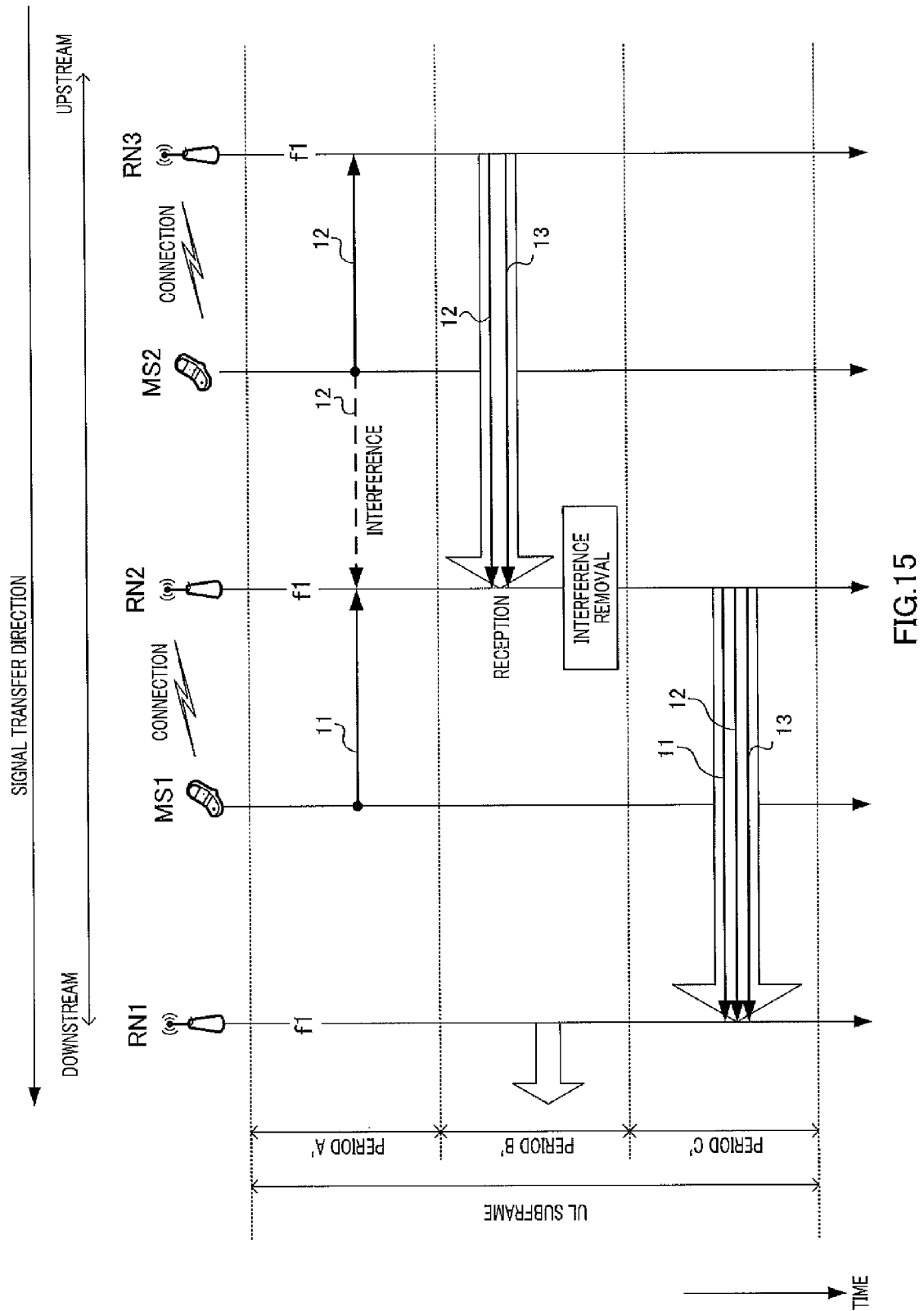
FIG. 15 is a diagram illustrating interference removal processing in a relay apparatus according to embodiment 4 of the present invention.

As illustrated in FIG. 15, the below explanation will be provided for a radio communication system in which communication in uplink is performed by a base station and terminals via a plurality of relay apparatuses in a unit of a subframe (UL subframe) including period A' for communication between the plurality of relay apparatuses and the terminals and period B' and period C' for communication between the plurality of relay apparatuses, and with the same frequency.

Also, in period B' and period C' in the UL subframe illustrated in FIG. 15, as in period A and period B in a DL subframe, two adjacent relay apparatuses in the plurality of relay apparatuses perform transmission processing at mutually-different periods (that is, either period B' or period C'), respectively. Also, in period A' in the UL subframe illustrated in FIG. 15, the terminals simultaneously perform transmission to the respective relay apparatuses, which are serving cells.

Also, in the below explanation, among two adjacent relay apparatuses, the relay apparatus positioned upstream in a signal (uplink signal) transfer direction between a terminal and a base station (macrocell base station) is referred to as an upstream RN and the relay apparatus positioned downstream is referred to as a downstream RN. For example, in a case where a plurality of relay apparatuses are connected in series and sequentially placed from a base station, among two adjacent relay apparatuses, the relay apparatus farther from the base station (macrocell base station) is an upstream RN and the relay apparatus closer to the base station is a downstream RN. In other words, between downlink and uplink, the upstream RN and the downstream RN are interchanged. For example, as illustrated in FIG. 15, among two adjacent relay apparatuses RN1 and RN2, RN2 positioned upstream in an uplink signal transfer direction (base station is an upstream RN, and RN1 positioned downstream in the signal transfer direction is a downstream RN).

Also, in the below explanation, as in embodiment 1, an RN number of a relay apparatus that directly communicates with a base station, for example, a relay apparatus closest to the base station (most downstream RN) is 1 (odd number) and RN numbers of relay apparatuses upstream of the relay apparatus with an RN number of 1 are 2, 3, 4, in order. In other words, in the RN numbers of a plurality of relay apparatuses that relay communication between the base station and terminals, odd numbers and even numbers are alternately provided in order from the most downstream RN. The RN number of the most downstream RN may be set to an even number (for example, the RN number is 0); and RN numbers of the relay apparatuses upstream of the relay apparatus with the RN number of 0 may be set to 1, 2, 3, in order.

Also, in the below explanation, odd-numbered RNs (RN1 and RN3 in FIG. 15) transmit a relay signal to respective downstream RNs (or a macrocell base station) in period B', and even-numbered RNs (RN2 in FIG. 15) transmit a relay signal to respective downstream RNs in period C'. In other words, the even-numbered RNs receive a relay signal from the respective upstream RNs in period B', and the odd-numbered RNs receive a relay signal from the respective upstream RNs in period C'.

In the radio communication system, as in embodiment 1, if a terminal (for example, a selection section) according to the present embodiment is connectable to both of adjacent RNs, the terminal selects (that is, selects as a serving cell) an upstream RN from among the plurality of adjacent RNs (two RNs in FIG. 15) (RN positioned upstream in a signal transfer direction between a base station and the terminal, i.e., an RN farther from the base station). For example, as illustrated in FIG. 15, MS1 is connectable to both of RN1 and RN2. Also, RN1 is a downstream RN and RN2 is an upstream RN between RN1 and RN2. Therefore, MS1 selects connection to RN2 positioned upstream among RN1 and RN2. The same applies to MS2 illustrated in FIG. 15.

Then, each terminal according to the present embodiment transmits a signal to the base station to the relay apparatus selected as a serving cell, in period A' in an UL subframe.

Meanwhile, each relay apparatus (for example, a receiving section) according to the present embodiment receives the signals transmitted from the respective terminals, in period A'. However, the signals include not only a signal from a terminal under the control of this node (desired signal) but also a signal from a terminal under the control of an upstream RN of this relay apparatus (interference signal). Also, in period B' or period C', each relay apparatus (for example, a receiving section) receives a relay signal transmitted from the upstream RN to the relay apparatus (signal to the base station transmitted from a terminal other than the terminal under the control of the relay apparatus). In other words, in period B' or period C' (communication between relay apparatuses), each relay apparatus receives a relay signal containing a signal that becomes an interference signal for the relevant node in period A'.

Then, each relay apparatus (for example, an interference removal section) removes the signal transmitted from the terminal under the control of the upstream RN in period A' (interference signal) from the signal received in period A' using the relay signal (signal to the base station transmitted from the terminal under the control of the upstream RN) (that is, the interference signal in period A') received in period B' or period C', and control information for the terminal under the control of the relay apparatus, thereby obtaining a signal transmitted from the terminal under the control of the relay apparatus (desired signal). It should be noted that each relay apparatus provides notification of control information for a terminal under the control of the relay apparatus to the terminal under the control of this relay apparatus (that is, the control information for the terminal under the control of the relay apparatus is known). Also, each relay apparatus provides notification of control information for a terminal under the control of an upstream RN to the upstream RN.

Next, details of the processing in relay apparatuses and terminals according to the present embodiment will be described.

As described above, in FIG. 15, MS1 is connected to RN2 and MS2 is connected to RN3.

Here, the explanation will be provided focusing on interference removal processing in RN2 illustrated in FIG. 15.

As illustrated in FIG. 15, in period A' of a UL subframe, MS1 transmits signal 11 to a base station to RN2, which is a serving cell, and MS2 transmits signal 12 to the base station to RN3, which is a serving cell. Accordingly, in period A', RN2 receives a signal containing signal 11 from MS1 (desired signal) and signal 12 from MS2 (interference signal).

Next, as illustrated in FIG. 15, in period B' in the DL subframe, RN1 and RN3 (odd-numbered RNs) transmit a relay signal to respective downstream apparatuses (macrocell base station for RN1, and RN2 for RN3). As illustrated in FIG. 15, the relay signal transmitted from RN3 contains signal 12 transmitted in period A' from MS2 connected to RN3 and signal 13 to the base station, which has been transmitted from a terminal connected to an RN (not illustrated) positioned upstream of RN3.

Here, in period B', RN2 illustrated in FIG. 15 receives the relay signal containing signal 12 that becomes an interference signal in period A' (signal 12 and signal 13). Therefore, as in a terminal according to embodiment 1, RN2 demodulates and decodes a data signal contained in signal 12, using control information (for example, the control information illustrated in FIG. 6) contained in the relay signal (signal 12 and signal 13), thereby obtaining the decoded signal (interference signal in period A'). Next, RN2 performs encoding and modulation of the decoded interference signal to generate the modulated interference signal (that is, a replica of the interference signal in period A'). Then, RN2 removes signal 12, which is the interference signal, from the signal received in period A' (signal containing signal 11 and signal 12), using the replica of the interference signal generated in period B' and control information for MS1 (known information), thereby obtaining signal 11 transmitted from MS1 under the control of RN2.

Then, in period C' of the UL subframe illustrated in FIG. 15, RN2 (even-numbered RN) transmits a relay signal to RN1, which is a downstream RN. As illustrated in FIG. 15, the relay signal transmitted from RN2 contains signal 12 and signal 13 received in period B' from RN3, which is an upstream RN, and signal 11 obtained in period B' (signal 11 after interference removal).

As described above, if a terminal according to the present embodiment is connectable to both of adjacent RNs, the terminal selects as a serving cell the upstream RN (RN positioned upstream in the signal transfer direction between the base station and terminals, i.e., the RN farthest from the base station in uplink) among the plurality of adjacent RNs (two RNs in FIG. 15). Consequently, a signal received by each RN (signal communicated between RNs) in period B' and period C' illustrated in FIG. 15 is a signal to the base station from terminals under the control of RNs positioned upstream of each RN, that is, a signal to terminals other than the terminal under the control of each RN. In other words, a signal received by each RN in period B' and period C' illustrated in FIG. 15 contains a signal that may become an interference signal for each RN in period A'. For example, RN2 illustrated in FIG. 15 obtains signal 12 that becomes an interference signal in period A', in period B' of the UL subframe.

Here, as in embodiment 1 (DL subframe), in a UL subframe, as illustrated in FIG. 15, in periods for communication between RNs (period B' and period C'), adjacent RNs perform relay signal transmission processing in mutually-different periods and with the same frequency, respectively. For example, as illustrated in FIG. 15, odd-numbered RNs (RN1 and RN3) transmit a relay signal using frequency f1 in period B', while even-numbered RNs (RN2) transmit a relay signal using frequency f1 in period C', which is different from period B'. In other words, two adjacent RNs time-divide their relay signals into period B' and period C and thereby orthogonalize the relay signals. Accordingly, each RN can transmit a relay signal to a downstream RN in either one of period B' and period C' without interference from an adjacent RN.

Consequently, each RN receives a signal for a base station transmitted from a terminal under the control of an upstream RN (signal 12 for RN2 in FIG. 15), which becomes an interference signal in period A', without interference in period B' or period C'. In other words, a terminal selects connection to an upstream RN from among an upstream RN and a downstream RN to which the terminal is connectable, and the downstream RN can receive a signal that is an interference signal for the downstream RN (signal to a base station from a terminal under the control of the upstream RN) as a relay signal from the upstream RN without interference.

Accordingly, a relay apparatus according to the present embodiment can recognize an interference signal for the relay apparatus at a time (period B' or period C') other than a period for communication between a plurality of RNs and terminals (period A' illustrated in FIG. 15). Consequently, the relay apparatus can remove the interference signal from a signal received in period A', using the recognized interference signal.

Consequently, according to the present embodiment, also in uplink, as in embodiment 1, even if multihop communication is performed between the plurality of relay apparatuses using the same frequency, interference to a signal from a terminal connected to a relay apparatus, by a signal from a terminal connected to another relay apparatus can be reduced.

Embodiment 5

The present embodiment will be described for a case where a certain terminal is connectable to two relay apparatuses in uplink, and the downstream RN among the two relay apparatuses generates control information (performs scheduling) for a terminal connected to the upstream RN using control information for a terminal connected to the downstream relay apparatus, as in embodiment 2.

A specific explanation of the present embodiment will be provided below.

In downlink, a relay apparatus (for example, a scheduling section) according to the present embodiment performs scheduling processing for a terminal under the control of a downstream RN (that is, an RN farther from a base station relative to this relay apparatus) in downlink based on scheduling for a terminal under the control of this relay apparatus as in embodiment 2. Meanwhile, in uplink, a relay apparatus (for example, a scheduling section) performs scheduling processing for a terminal under the control of an upstream RN (that is, an RN farther from the base station relative to this relay apparatus) in uplink based on scheduling for the terminal under the control of this relay apparatus. In other words, in either downlink or uplink, a relay apparatus (for example, a scheduling section) generates control information for a terminal under the control of a relay apparatus farther from a base station relative to the relay apparatus (a relay apparatus to be a downstream RN in downlink and an upstream RN in uplink), using control information for the terminal under the control of this relay apparatus.

Then, during communication between RNs in downlink (for example, period A or period B illustrated in FIG. 9), the relay apparatus transmits a relay signal containing control information for a terminal under the control of the relevant node in downlink and uplink and control information for a terminal under the control of another relay apparatus in downlink and uplink (a downstream RN in downlink and an upstream RN in uplink).

As in embodiment 1 and embodiment 4, in downlink and uplink, if there are a plurality of RNs to which a terminal (for example, a selection section) according to the present embodiment is connectable, the terminal selects connection to an upstream RN (relay apparatus positioned upstream in a signal transfer direction). For example, in downlink, the terminal selects connection to a relay apparatus closer to a base station (relay apparatus positioned upstream in the downlink signal transfer direction) from among the plurality of relay apparatuses to which the terminal is connectable. Meanwhile, in uplink, the terminal selects connection to a relay apparatus farther from the base station (relay apparatus positioned upstream in the uplink signal transfer direction) from among the plurality of relay apparatuses to which the terminal is connectable.

Also, as in embodiment 2, during communication between RNs in downlink (for example, period A or period B illustrated in FIG. 9), a terminal (for example, timing control section) according to the present embodiment controls input/output timings so as to receive a relay signal containing control information for the relevant terminal for downlink and uplink and control information for another terminal for downlink and uplink.

Next, details of the scheduling processing in a relay apparatus according to the present embodiment will be described.

Figure 16:
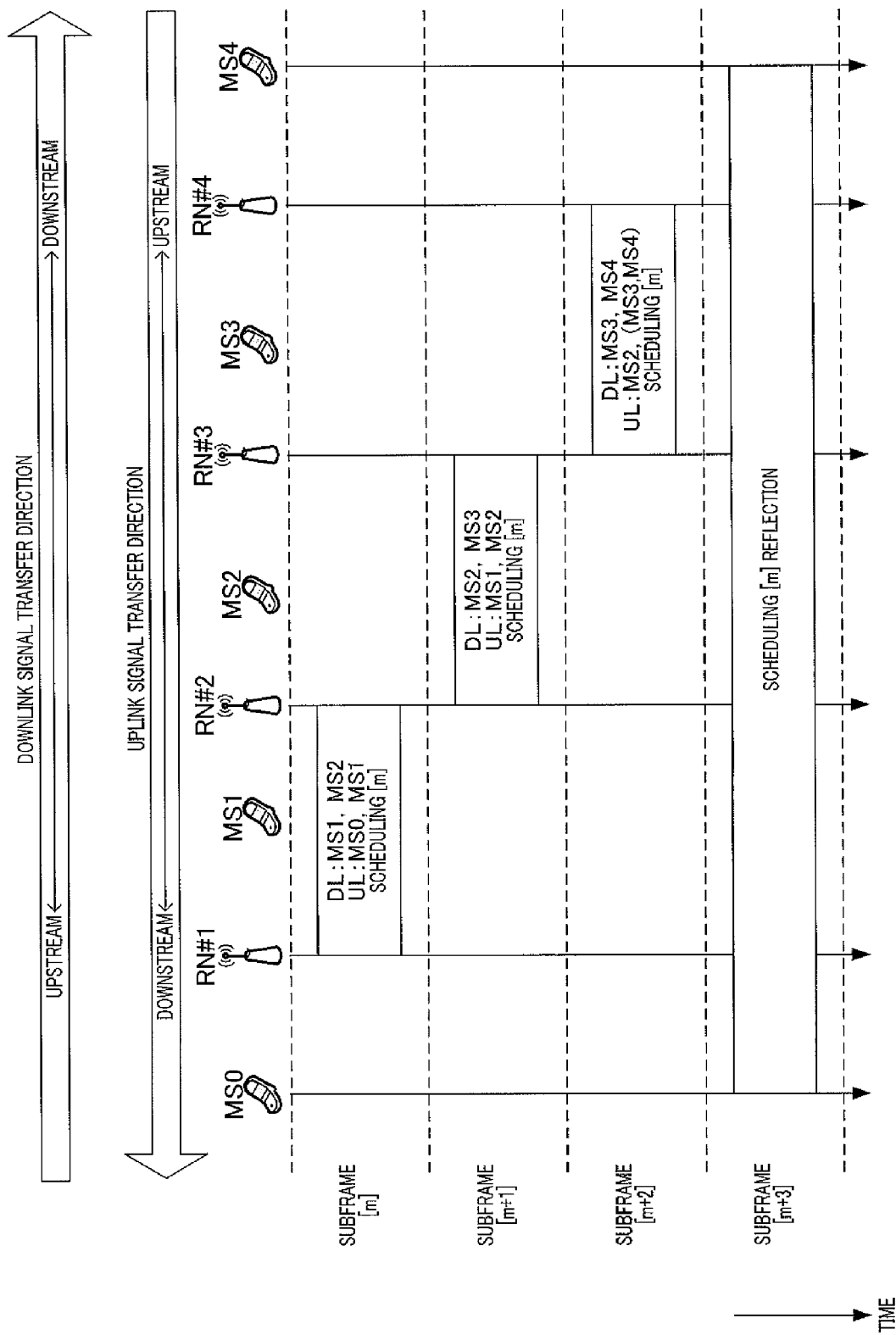
FIG. 16 is a diagram illustrating scheduling processing in relay apparatuses according to embodiment 5 of the present invention.

The below explanation will be provided for a case where multihop communication is performed by four relay apparatuses RN#1 to RN#4 as illustrated in FIG. 16. Also, in FIG. 16, RN#1 is the closest to a macrocell base station and the RN#4 is the farthest from the macrocell base station. Accordingly, as illustrated in FIG. 16, a downlink signal transfer direction is a direction from RN#1 to RN#4, and an uplink signal transfer direction is a direction from RN#4 to RN#1. In other words, in downlink, RN#1 is the most upstream RN, and RN#4 is the most downstream RN. Also, in uplink, RN#4 is the most upstream RN and RN#1 is the most downstream RN.

Accordingly, in FIG. 16, in downlink, MS1 is connected to RN#1, which is the upstream RN in downlink among RN#1 and RN#2 to which MS1 is connectable. Likewise, in downlink, MS2 is connected to RN#2, which is the upstream RN in downlink among RN#2 and RN#3 to which MS2 is connectable. The same applies to MS0, MS3 and MS4.

Meanwhile, in FIG. 16, in uplink, MS1 is connected to RN#2, which is the upstream RN in uplink among RN#1 and RN#2 to which MS1 is connectable. Likewise, in uplink, MS2 is connected to RN#3, which is the upstream RN in uplink among RN#2 and RN#3 to which MS2 is connectable. The same applies to MS0 and MS3. In uplink, there is no RN positioned upstream of RN#4 illustrated in FIG. 16 (no RN farther from the base station as compared with RN4), and thus, MS4 is connected to RN#4.

Here, in FIG. 16, the explanation will be provided focusing on processing from reception by RN#1 (odd-numbered RN) in DL subframe [m] of control information for MS1 under the control of RN#1 in downlink (DL) (DL control information) and control information for MS0 under the control of RN#1 in uplink (UL) (UL control information) to reflection of the control information in a terminal.

In FIG. 16, scheduling processing in a relay apparatus in downlink is similar to that in embodiment 2. In other words, in subframe [m] illustrated in FIG. 16, RN#1 generates DL control information for MS2 under the control of RN#2 using DL control information for MS1 under the control of RN#1. Likewise, in subframe [m+1] illustrated in FIG. 16, RN#2 generates DL control information for MS3 under the control of RN#3 using DL control information for MS2 under the control of RN#2. The same applies to RN#4 in subframe [m+2] illustrated in FIG. 16.

Meanwhile, scheduling processing in a relay apparatus in uplink is described below. More specifically, in subframe [m] illustrated in FIG. 16, RN#1 receives UL control information for MS0 under the control of RN#1 from a macrocell base station. Therefore, RN#1 performs scheduling processing for MS1 under the control of RN#2, which is an upstream RN for RN#1 in uplink, using the UL control information for MS0 under the control of RN#1. Consequently, RN#1 obtains UL control information for MS1 under the control of RN#2. Likewise, in subframe [m+1] illustrated in FIG. 16, RN#2 generates UL control information for MS2 under the control of RN#3, which is an upstream RN for RN#2 in uplink, using the UL control information for MS1 under the control of RN#2, which is transmitted from RN#1. The same applies to RN#3 in subframe [m+2] illustrated in FIG. 16.

Then, in subframe [m+3] illustrated in FIG. 16, all of the RNs, i.e., RN#1 to RN#4, perform communication with terminals under the control of the respective RNs (MS0 to MS4 in FIG. 16) based on the scheduling results determined in subframes [m] to [m+2], respectively, thereby reflecting the scheduling results on the terminals.

As described above, in the present embodiment, a relay apparatus performs scheduling processing for a terminal under the control of an adjacent relay apparatus farther from a base station as compared with the relay apparatus (a downstream RN in downlink and an upstream RN in uplink) based on scheduling for a terminal under the control of the relay apparatus.

Consequently, in downlink, as in embodiment 2, a terminal can receive not only a mapping position and an MCS of a relay signal for this terminal (desired signal) but also a mapping position and an MCS of a relay signal for another terminal (interference signal) without interference before a time when the terminal actually receives a relay signal that becomes an interference signal (for example, period C illustrated in FIG. 9). Accordingly, the terminal can start preparation for interference removal processing at a point of time when the terminal obtains in advance the signal that becomes an interference signal (for example, processing for generating a replica of the interference signal or processing for selecting an interference removal method), enabling reduction in reception processing time required for obtaining a desired signal.

Also, in uplink, a relay apparatus generates control information for a terminal under the control of an upstream RN in uplink. Consequently, the relay apparatus can recognize control information for a terminal that transmits a signal that becomes an interference signal for the relay apparatus. For example, RN#2 illustrated in FIG. 16 generates control information for MS2 connected to RN#3, which is an upstream RN in uplink. Consequently, RN#2 illustrated in FIG. 16 can reliably obtain an interference signal when receiving a signal from MS1 under the control of RN#2, that is, control information on a signal from MS2.

As described above, according to the present embodiment, in downlink, as in embodiment 2, a terminal can reliably obtain control information on an interference signal to remove the interference signal, and thus, interference to a signal from a relay apparatus to which the terminal is connected, by a signal from another relay apparatus can reliably be reduced. Furthermore, according to the present embodiment, in uplink, a relay apparatus generates control information for a terminal that transmits a signal that becomes an interference signal for this relay apparatus. Thus, according to the present embodiment, a relay apparatus can reliably reduce interference to a signal transmitted from a terminal under the control of the relay apparatus by a signal transmitted from a terminal under the control of another relay apparatus.

The present embodiment has been described taking a case where scheduling in downlink and scheduling in uplink are performed in downlink and uplink, respectively, as an example. However, the present invention is not limited to this case, and for example, both scheduling for a following uplink and scheduling for a following downlink may simultaneously be performed in a downlink, and both scheduling for a following downlink and scheduling for a following uplink may simultaneously be performed in an uplink.

Embodiment 6

The present embodiment will be described for a case where, in multihop communication in uplink as in embodiment 4, a terminal provides notification of control information for the terminal (control information on an interference signal for a notification destination relay apparatus) to a relay apparatus other than a serving cell as in embodiment 3.

In the below explanation, as in embodiment 4, in period A' to period C' in an UL subframe, odd-numbered RNs transmit a relay signal to respective downstream RNs (or a macrocell base station) in period B' and even-numbered RNs transmit a relay signal to respective downstream RNs in period C'.

Also, as in a DL subframe, a plurality of relay apparatuses (RNs) included in multihop communication are provided with a guard time for switching between transmission processing and reception processing in a UL subframe.

For example, here, the odd-numbered RNs transmit a relay signal to respective downstream apparatuses in period B' and receive a relay signal from respective upstream RNs in period C'. Meanwhile, the even-numbered RNs receive a relay signal from respective upstream RNs in period B', and transmit a relay signal to respective downstream apparatuses in period C'. In other words, between period B' and period C', transmission processing and reception processing are switched in the odd-numbered RNs and the even-numbered RNs (that is, all of the RNs). Accordingly, each of the RNs needs to be provided with a guard time between period B' and period C.

Also, the odd-numbered RNs and the even-numbered RNs receive a signal (relay signal) to a base station, which is transmitted in period A' from terminals under the control of the respective RNs. Accordingly, between period A' and period B', reception processing and transmission processing are switched in the odd-numbered RNs while the even-numbered RNs continue reception processing. Accordingly, the odd-numbered RNs need to provide a guard time between period A' and period B'. Meanwhile, the even-numbered RNs do not need to provide a guard time between period A' and period B'. In other words, in a period corresponding to a guard time between period A' and period B', the odd-numbered RNs can receive no signal because of switching between transmission/reception processing, while the even-numbered RNs continue reception processing and thus can receive a signal.

In other words, in a guard time provided for the switching between transmission/reception processing in one RN (odd-numbered RN in the above example) among a plurality of adjacent RNs (a plurality of RNs to which a certain terminal is connectable), another RN can receive not only a signal from a terminal under the control of the relay apparatus, but also a signal from a terminal under the control of an RN other than this relay apparatus.

Also, as described in embodiment 3, in a radio communication system according to the present embodiment, downlink and uplink are alternately switched on a per subframe basis. Thus, a plurality of relay apparatuses (RNs) included in multihop communication are provided with a guard time also when downlink and uplink are switched. In other words, there is a DL subframe immediately after (or immediately before) the above-described UL subframe, and for example, before period A' in period A' to period C in the UL subframe, a guard time for switching to the DL subframe is provided.

Accordingly, as in embodiment 3, it is possible that in the guard time provided between downlink and uplink, some RNs among a plurality of adjacent RNs (a plurality of RNs to which a certain terminal is connectable) receive a signal from respective terminals.

Therefore, in the present embodiment, in a plurality of relay apparatuses (RNs) included in multihop communication, a terminal under the control of one relay apparatus among terminals under the control of two adjacent relay apparatuses transmits control information for the terminal in a guard time provided for switching between transmission/reception processing in the relay apparatus to which the terminal is connected, and a terminal under the control of the other relay apparatus transmits control information for this terminal at a guard time provided between downlink and uplink.

Also, in a plurality of relay apparatuses (RNs) included in multihop communication, one relay apparatus among two adjacent relay apparatuses receives control information from a terminal under the control of the other relay apparatus at a guard time provided for switching between transmission/reception processing in the other relay apparatus, and the other relay apparatus receives control information from a terminal under the control of the one relay apparatus at a guard time provided between downlink and uplink.

A more specific explanation of the present embodiment will be provided below. The present embodiment will be described for a radio communication system in which downlink and uplink are switched on a per subframe basis, a guard time is provided between a DL subframe and a UL subframe and a guard time is provided between period A' and period B' in a UL subframe.

In the radio communication system, a relay apparatus according to the present embodiment provides a guard time between period A' and period B' (period post-A') and between period B' and period C' in each UL subframe, provides a guard time between a DL subframe and a UL subframe (period pre-A') in addition to the processing in a relay apparatus in embodiment 4. However, the relay apparatus receives control information from a terminal under the control of an upstream RN (that is, control information on an interference signal) in either one of the guard time between period A' and period B' (period post-A') and the guard time between downlink and uplink (period pre-A'). The relay apparatus notifies a terminal under the control of this relay apparatus of control information for the terminal (UL control information) (in other words, the control information for the terminal under the control of the relay apparatus is known). Also, the relay apparatus notifies an upstream RN of control information for a terminal under the control of the upstream RN.

Then, the relay apparatus demodulates and decodes the control information from the terminal under the control of the upstream RN, which is received in period pre-A' or period post-A' (control information on an interference signal). Consequently, the relay apparatus obtains, e.g., a mapping position and an MCS of an interference signal (relay signal from the terminal under the control of the upstream RN). In the relay apparatus, the control information for the terminal under the control of the relay apparatus (control information on a desired signal) is known, and thus, the relay apparatus recognizes, e.g., a mapping position and an MCS of a desired signal (relay signal transmitted from the terminal under the control of the relevant node). Accordingly, as in embodiment 4, the relay apparatus encodes and modulates an interference signal contained in a relay signal received in period B' or period C', using the control information from the terminal under the control of the upstream RN, which is received in period pre-A' or period post-A'. Then, the relay apparatus removes the interference signal from the signal received in period A', using the modulated interference signal (replica of the interference signal) and the control information for the terminal under the control of the relay apparatus (control information on a desired signal), thereby obtaining a relay signal transmitted from the terminal under the control of this relay apparatus (desired signal).

A terminal according to the present embodiment transmits control information for the relevant terminal in either one of two periods, i.e., a period corresponding to the guard time between period A' and period B' (hereinafter referred to as period post-A') and a period immediately before period A', that is, a period corresponding to the guard time between downlink and uplink (hereinafter referred to as period pre-A'), in addition to the processing in a terminal in embodiment 4. For example, if a serving cell provides a guard time in period post-A', the terminal transmits the control information for the terminal in period post-A'. Also, if the serving cell provides no guard time in period post-A', the terminal transmits the control information for the terminal in period pre-A'. Each terminal is notified by the corresponding serving cell of control information for the terminal (UL control information).

Next, details of the processing in relay apparatuses and terminals according to the present embodiment will be described.

The below explanation will be provided for a case where multihop communication in uplink is performed by three or more RNs. However, in FIG. 17, only two RN1 and RN2 from the three or more RNs are illustrated. Also, RN1 is a downstream RN and RN2 is an upstream RN between RN1 and RN2 illustrated in FIG. 17. Also, in FIG. 17, MS0 (not illustrated) is connected to RN1, and MS1 is connected to RN2. Also, MS2 illustrated in FIG. 17 is connected to RN3 (not illustrated).

Figure 17:
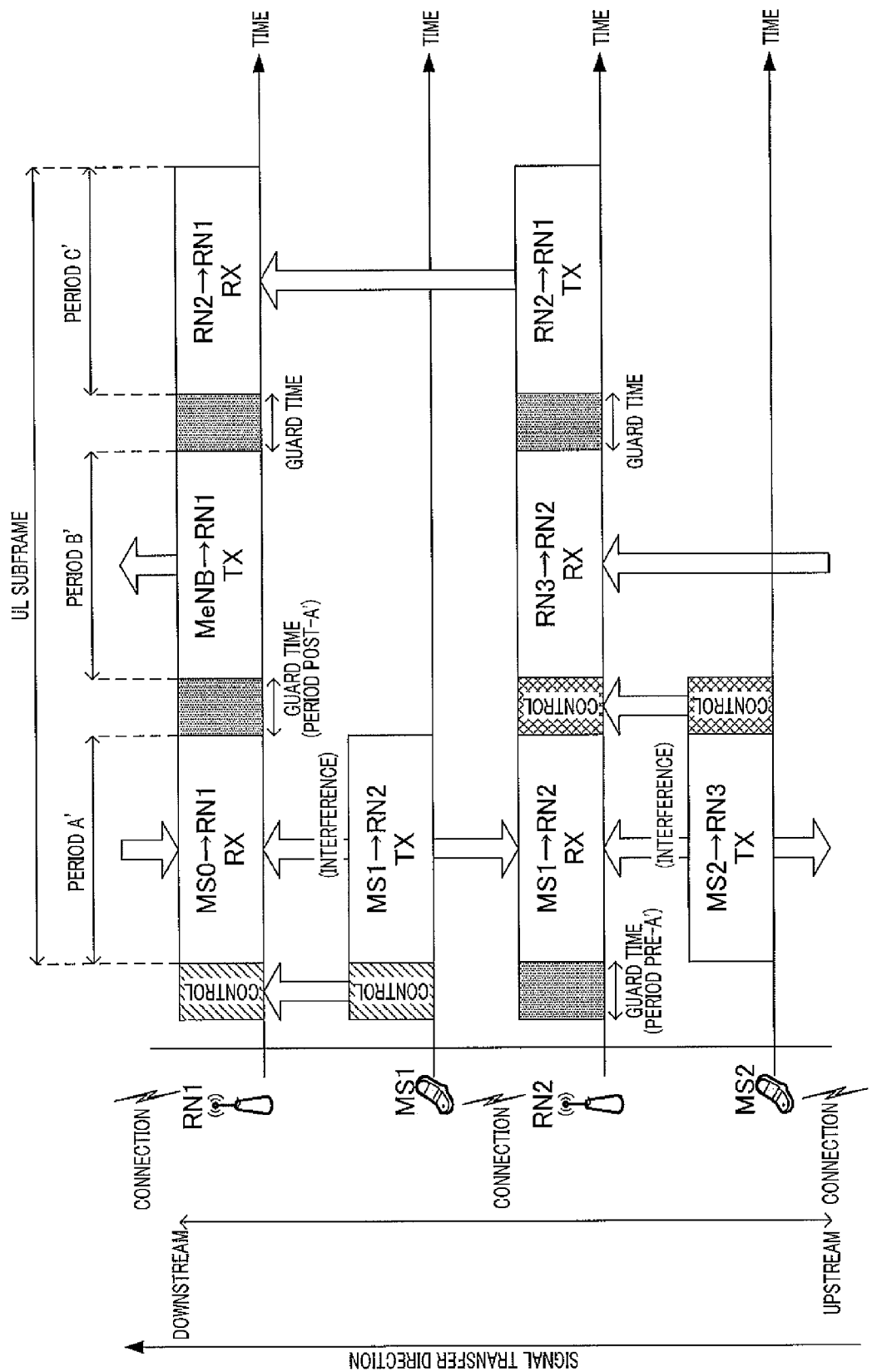
FIG. 17 is a diagram illustrating processing in relay apparatuses and terminals according to embodiment 6 of the present invention.

Furthermore, in FIG. 17, transmission processing is represented by "TX," and reception processing is represented by "RX."

In period pre-A' illustrated in FIG. 17, MS1 under the control of RN2 transmits control information for MS1. MS1 is notified of the control information for MS1 by RN2, which is a serving cell. Also, RN2 is notified of the control information for MS1 by a downstream RN (that is, an RN closer to a base station). Then, in period pre-A', RN1 receives the control information for MS1. In other words, in period pre-A', RN1 receives the control information for MS1, which is a transmission source of an interference signal in period A' (control information on an interference signal). Then, RN1 obtains a channel estimation value between RN1 and MS1 (channel estimation value for an interference signal) using the control information for MS1 received in period pre-A'. Also, in period pre-A', RN2 provides a guard time, and thus, does not receive the control information for MS1.

Next, in period A' illustrated in FIG. 17, RN1 receives a relay signal from MS0 under the control of RN1, and RN2 receives a relay signal from MS1 under the control of RN2. However, the signal received by RN1 in period A' contains the relay signal from MS1 under the control of RN2 (interference signal) in addition to the relay signal from MS0 (desired signal). Likewise, the signal received by RN2 in period A' contains a relay signal from MS2 under the control of RN3 (interference signal) in addition to the relay signal from MS1 (desired signal).

Next, in period post-A' illustrated in FIG. 17, MS2 under the control of RN3 (not illustrated) transmits control information for MS2. MS2 is notified of the control information for MS2 by RN3 (not illustrated), which is a serving cell. Also, RN3 (not illustrated) is notified of the control information for MS2 by a downstream RN (that is, a RN closer to the base station). Then, in period post-A', RN2 receives the control information for MS2. In other words, in period post-A', RN2 can receive the control information for MS2 (control information on an interference signal), which is a transmission source of an interference signal. Then, RN2 obtains a channel estimation value between RN2 and MS2 (channel estimation value for an interference signal) using the control information for MS2 received in period post-A'. Also, in period post-A', RN1 provides a guard time.

In period B' illustrated in FIG. 14, RN1, which is an odd-numbered RN, transmits a relay signal to the macrocell base station, which is a downstream apparatus. Also, RN3 (not illustrated), which is an odd-numbered RN, transmits a relay signal to RN2, which is a downstream RN. Also, in period C' illustrated in FIG. 14, RN2, which is an even-numbered RN, transmits a relay signal to RN1, which is a downstream RN. Consequently, as in embodiment 4, RN1 extracts the interference signal in period A' (signal transmitted from MS1 under the control of RN2) from the relay signal received in period C'. Likewise, RN2 extracts the interference signal in period A' (signal transmitted from MS2 under the control of RN3) from the relay signal received in period B'. Consequently, RN1 and RN2 each obtain a replica of the interference signal in period A' using the control information on the interference signal obtained in period pre-A' or period post-A'.

Then, as in embodiment 4, RN1 and RN2 illustrated in FIG. 17 each remove the interference signal from the signal received in period A' using the replica of the interference signal obtained in period B' or period C', the channel estimation value for the interference signal obtained in period pre-A' or period post-A' and the known control information for the terminal under the control of the relay apparatus (control information on a desired signal), thereby obtaining a desired signal.

As described above, in the present embodiment, the terminals each transmit control information for the respective terminals in either one of the guard time provided between period A' and period B' (guard time provided for switching between transmission/reception processing (period post-A')) or the guard time between downlink and uplink (guard time provided for switching between downlink and uplink (period pre-A')). Then, the relay apparatuses each receive control information transmitted from the terminal under the control of respective upstream RNs, that is, receive control information on an interference signal in the guard time between period A' and period B' or the guard time between the downlink and the uplink.

Consequently, in the guard time between period A' and period B', the relay apparatuses not requiring switching between transmission/reception processing (here, even-numbered RNs) can receive the control information from the terminals under the control of the respective upstream RNs (here, the odd-numbered RNs) without interference. Likewise, in the guard time between downlink and uplink, the relay apparatuses requiring provision of the guard time between period A' and period B' (here, the odd-numbered RNs) can receive the control information from the respective upstream RNs (here, the even-numbered RNs) without interference.

As described above, according to the present embodiment, even in a case where multihop communication is performed between a plurality of relay apparatuses in uplink using the same frequency, as in embodiment 4, interference to a signal from a terminal connected to a relay apparatus, by a signal from a terminal connected to another relay apparatus can be reduced. Furthermore, according the present embodiment, a relay apparatus utilizes a guard time for switching between transmission/reception processing in the relay apparatus or a guard time for switching between downlink and uplink, for communication of control information, enabling reliable obtainment of control information on an interference signal. Thus, in the present embodiment, in a relay apparatus, interference to a signal from a terminal connected to the relay apparatus by a signal from a terminal connected to another relay apparatus can reliably be reduced.

Embodiment 7

The present embodiment is similar to embodiments 1 to 3 in that a terminal performs interference removal processing using control information for this terminal and control information for another terminal (control information on an interference signal). Meanwhile, the present embodiment is different from embodiment 2 and embodiment 3 in a method for providing notification of control information that a terminal uses for interference removal processing.

A specific explanation of the present embodiment will be provided below. First, a relay apparatus according to the present embodiment will be described below. Relay apparatus 100 according to the present embodiment (FIG. 2) has a configuration similar to that of embodiment 1, but different from that of embodiment 1 in operations of reception processing section 104, transmission processing section 106 and timing control section 109.

In the present embodiment, a relay signal transmitted from a base station or an upstream RN to relay apparatus 100 contains, e.g., a known signal (also referred to as a reference signal or a pilot signal), a relay signal for a terminal connected to relay apparatus 100 (terminal under the control of relay apparatus 100) transmitted in period C (data signal and control information on the data signal), a relay signal for a terminal connected to a relay apparatus downstream of relay apparatus 100 (downstream RN) (data signal and control information on the data signal), and control information used when relaying relay data to a terminal connected to relay apparatus 100, which is transmitted in period C.

In relay apparatus 100 illustrated in FIG. 2, first, reception processing section 104 performs demodulation and decoding of control information for a relay signal between relay apparatuses contained in a relay signal input from first memory 103. Here, it is assumed that a mapping position and an MCS (modulation and coding scheme) of the control information is information previously obtained by relay apparatus 100, such as information set in advance. Furthermore, the control information contains a mapping position and an MCS of a relay signal between relay apparatuses (data directed to a terminal connected to relay apparatus 100 and/or data directed to a terminal connected to a downstream RN). Then, reception processing section 104 performs demodulation and decoding of the data signal contained in the relay signal input from first memory 103, based on the mapping position and the MCS included in the control information. Then, reception processing section 104 outputs the decoded signal to second memory 105.

Transmission processing section 106 performs coding and modulation of the signal input from second memory 105 (relay signal to a terminal connected to relay apparatus 100 (relay data to a terminal connected to relay apparatus 100), the control information for the relay signal for the terminal connected to relay apparatus 100 (control information for the terminal, that is, control information for transmission of the relay data to the terminal), the relay signal for the terminal connected to the downstream RN (relay data to the terminal connected to the downstream RN), or the control information for the relay signal for the terminal connected to the downstream RN (control information for the RN, that is, control information for transmission of the relay data between relay apparatuses)). Then, transmission processing section 106 outputs the modulated signal to first memory 103.

Timing control section 109 instructs first memory 103 and second memory 105 about timings for inputting/outputting a relay signal, based on setting information input from odd/even number switching section 108.

For example, if the setting information input from odd/even number switching section 108 indicates "odd number" (if relay apparatus 100 is an odd-numbered RN), in period A, timing control section 109 instructs (gives a read instruction to) first memory 103 to output control information on relay data to the terminal under the control of relay apparatus 100 transmitted in period C, control information on relay data to the downstream RN and the relay data to the downstream RN (data signal) to RF transmitting section 107.

Also, in period B, timing control section 109 instructs (gives a write instruction to) first memory 103 to store a relay signal input from RF receiving section 102 (relay signal for the terminal connected to relay apparatus 100, a relay signal for the terminal connected to the downstream RN and control information on these relay signals). Also, in period B, when the relay signal is stored in first memory 103, timing control section 109 instructs (gives a read instruction to) first memory 103 to output the stored relay signal to reception processing section 104, and instructs (gives a write instruction to) second memory 105 to store the signal input from reception processing section 104 (decoded signal). Also, in period B, when the decoded signal is stored in second memory 105, timing control section 109 instructs (gives a read instruction to) second memory 105 to output the relay signal (relay signal for the terminal connected to relay apparatus 100 and/or the relay signal for the terminal connected to the downstream RN, and the control information on these relay signals) to transmission processing section 106, and instructs (gives a write instruction to) first memory 103 to store the relay signal input from transmission processing section 106 (relay signal for the terminal connected to relay apparatus 100 and/or the relay signal for the terminal connected to the downstream RN, and the control information on these relay signals).

Meanwhile, if the setting information input from odd/even number switching section 108 indicates "even number" (if relay apparatus 100 is an even-numbered RN), timing control section 109 performs, in period B, processing similar to the processing performed in period A when the setting information indicates "odd number" and performs, in period A, processing similar to the processing performed in period B when the setting information indicates "odd number." In other words, the processing in period A and the processing in period B in timing control section 109 are interchanged between an odd-numbered RN and an even-numbered RN.

Also, regardless of the setting information input from odd/even number switching section 108, in period C, timing control section 109 instructs (gives a read instruction to) first memory 103 to output the relay signal for the terminal connected to relay apparatus 100 to RF transmitting section 107.

Next, a terminal according to the present embodiment will be described. Terminal 200 (FIG. 3) according to the present embodiment has a configuration similar to that of embodiment 1, but is different in operations of reception processing section 207 (receiving section 208 and interference removal section 209) and timing control section 214.

In the present embodiment, a relay signal transmitted from relay apparatus 100 connected to terminal 200 contains a relay signal (data signal) for terminal 200 and a known signal.

In terminal 200 illustrated in FIG. 3, receiving section 208 of reception processing section 207 performs demodulation and decoding of a relay signal input from first memory 203. More specifically, when terminal 200 is connectable to two adjacent relay apparatuses (RNs), receiving section 208 performs the following processing. In period A or period B (period for communication between relay apparatuses), receiving section 208 receives a relay signal transmitted from the upstream RN to the downstream RN in the two relay apparatuses to which terminal 200 is connectable (known signal, control information for relay data to terminal 200 to be transmitted in period C (control information for terminal 200), relay data to another terminal under the control of the downstream RN (relay data to the downstream RN), and control information for relay data to the other terminal under the control of the downstream RN (control information for the downstream RN)). Furthermore, in period A or period B (period for communication between relay apparatuses), receiving section 208 receives a relay signal transmitted by the downstream RN in the two relay apparatuses to which terminal 200 is connectable (control information for relay data to the other terminal (interference station for terminal 200) to be transmitted in period C). Then, receiving section 208 demodulates and decodes the received relay signal.

In other words, in period A or period B, receiving section 208 receives the relay data to the other terminal and the control information for the other terminal (that is, a signal that may provide interference to terminal 200 in period C (interference signal) and control information), and control information for the relay data to terminal 200 (that is, control information for the signal to be transmitted to terminal 200 in period C). Then, receiving section 208 outputs the relay data to the other terminal (interference signal) and control information for the other terminal, and the control information for terminal 200, which were received in period A or period B, to second memory 210.

Also, receiving section 208 calculates a channel estimation value between the relay apparatus to which terminal 200 is connected (upstream RN) and terminal 200 using the known signal contained in the relay signal from the upstream RN to the downstream RN in period A or period B (period for communication between relay apparatuses), and outputs the channel estimation value to second memory 210. Likewise, receiving section 208 calculates a channel estimation value between the downstream RN and terminal 200 using the known signal contained in the relay signal from the downstream RN in period A or period B (period for communication between relay apparatuses), and outputs the channel estimation value to second memory 210 as a channel estimation value of an interference signal.

Interference removal section 209 of reception processing section 207 removes the relay data to the other terminal transmitted from the downstream RN in period C from the relay signal received in period C, using the relay data to the other terminal (interference signal), the control information for the other terminal, the channel estimation value of the interference signal and the control information for terminal 200, which were received in period A or period B and stored in second memory 210. Then, receiving section 208 performs demodulation and decoding of the signal from which the interference signal has been removed in interference removal section 209 in the relay signal received in period C of a DL subframe (period for communication between relay apparatuses and terminals), thereby obtaining relay data to terminal 200 (desired signal) transmitted from the upstream RN (serving cell for terminal 200).

As in timing control section 109 (FIG. 2), timing control section 214 instructs first memory 203 and second memory 210 about timings for inputting/outputting relay signals, based on setting information input from odd/even number switching section 213.

For example, if the setting information input from odd/even number switching section 213 indicates "odd number" (if the serving cell is an odd-numbered RN), in period A, timing control section 214 instructs (gives a write instruction to) first memory 203 to store the known signal, the relay signal for the downstream RN, the control information for the downstream RN and the control information for terminal 200, which are input from RF receiving section 202. Also, in period A, when the relay signal for the downstream RN and the control information for terminal 200 are stored in first memory 203, timing control section 214 instructs (gives a read instruction to) first memory 203 to output the known signal, the relay signal for the downstream RN, the control information for the downstream RN and the control information for terminal 200 to reception processing section 207, and instructs (gives a write instruction to) second memory 210 to store the interference signal (relay signal for the other terminal) and control information for terminal 200, and the channel estimation value between the serving cell and the terminal 200, which are input from reception processing section 207.

Also, in period B, timing control section 214 instructs (gives a write instruction to) first memory 203 to store the relay signal (known signal and the control information for the other terminal) transmitted from the downstream RN among the two relay apparatuses to which terminal 200 is connectable, the signal being input from RF receiving section 202. Also, in period B, when the relay signal from the downstream RN is stored in first memory 203, timing control section 214 instructs (gives a read instruction to) first memory 203 to output the stored relay signal from the downstream RN to reception processing section 207, and instructs (gives a write instruction to) second memory 210 to store the channel estimation value between the downstream RN and terminal 200 input from reception processing section 207.

Meanwhile, if the setting information input from odd/even number switching section 213 indicates "even number" (if the serving cell is an even-numbered RN), timing control section 214 performs, in period B, processing similar to the processing performed in period A when the setting information indicates "odd number" and performs, in period A, processing similar to the processing in period B when the setting information indicates "odd number." In other words, the processing in period A and the processing in period B in timing control section 214 are interchanged between terminal 200 connected to an odd-numbered RN and terminal 200 connected to an even-numbered RN.

Also, regardless of the setting information input from odd/even number switching section 213, in period C, timing control section 214 instructs (gives a write instruction to) first memory 203 to store a signal from each RN, which is input from RF receiving section 202. Also, in period C, when the signal from each RN is stored in first memory 203, timing control section 214 instructs (gives a read instruction to) first memory 203 to output the stored signal from each RN to reception processing section 207, and instructs (gives a read instruction to) second memory 210 to output the interference signal, the control information on the interference signal, the control information for terminal 200, the channel estimation value between the serving cell and terminal 200 and the channel estimation value between the downstream RN and terminal 200, which were received in period A and period B, to reception processing section 207. Also, timing control section 214 instructs (gives a write instruction to) second memory 210 to store the signal input from reception processing section 207 (signal after interference removal).

Next, details of the processing in relay apparatus 100 and terminal 200 according to the present embodiment will be described.

The below explanation will be provided for a case where multihop communication is performed using three or more RNs. However, in FIG. 18, among the three or more RNs, only three RN1, RN2 and RN3 are illustrated. Also, RN1 is an upstream RN and RN2 is a downstream RN between RN1 and RN2 illustrated in FIG. 18. Also, RN2 is an upstream RN and RN3 is a downstream RN between RN2 and RN3 illustrated in FIG. 18. Also, in FIG. 18, MS1 is connected to RN1 and MS2 is connected to RN2. Also, RN1, RN2 and RN3 illustrated in FIG. 18 each include the configuration of relay apparatus 100 illustrated in FIG. 2, and MS1 and MS2 each include the configuration of terminal 200 illustrated in FIG. 3.

Figure 18:
FIG. 18 is a diagram illustrating a control information notification method according to embodiment 7 of the present invention.

Also, in FIG. 18, transmission processing is represented by "TX," and reception processing is represented by "RX."

Also, in FIG. 18, control information for relay data transmission between relay apparatuses (control information for a downstream RN) is represented by "CONTROL INFORMATION for RN" and relay data between relay apparatuses (relay data to a downstream RN) is represented by "DATA to RN." Likewise, in FIG. 18, control information for relay data transmission for a terminal (control information for a tell final) is represented by "CONTROL INFORMATION for MS" and relay data to a terminal is represented by "DATA to MS." In other words, as indicated by the dotted arrows in FIG. 18, "CONTROL INFORMATION for MS" is control information (e.g., a mapping position and an MCS) used for relaying "DATA to MS," and "CONTROL INFORMATION for RN" is control information (e.g., a mapping position and an MCS) used for relaying "DATA to RN."

Here, an explanation will be provided focusing on control information notification processing in RN2 (even-numbered RN) and MS2 connected to RN2 (MS2 under the control of RN2), which are illustrated in FIG. 18.

In period A in the DL subframe illustrated in FIG. 18, RN2 receives a known signal, control information for relay data transmission between relay apparatuses (CONTROL INFORMATION for RN) and relay data between relay apparatuses (DATA to RN) from RN1, which is an upstream RN of RN2. Meanwhile, in period A, MS2 receives a known signal and control information for relay data transmission for a terminal under the control of RN3 (CONTROL INFORMATION for MS), which are transmitted to a downstream RN for RN3, from RN3. Then, MS2 obtains a channel estimation value between RN3 and MS2 (channel estimation value of an interference signal in period C), using the known signal from RN3. Also, in period A, MS2 obtains control information for a terminal (not illustrated) under the control of RN3 (control information on an interference signal), which is transmitted from RN3.

Next, in period B of the DL subframe illustrated in FIG. 18, RN2 transmits a known signal, control information for a terminal under the control of RN2 (MS2) (CONTROL INFORMATION for MS), control information for relay data transmission between relay apparatuses (control information for RN), and relay data between relay apparatuses (DATA to RN). Meanwhile, in period B, MS2 receives the control information for relay data transmission for the terminal under the control of RN2 (CONTROL INFORMATION for MS), which is transmitted from RN2 to MS2. Also, MS2 receives the known signal, the control information for relay data transmission between relay apparatuses (CONTROL INFORMATION for RN) and the relay data between relay apparatuses (DATA to RN), which are transmitted from RN2 to RN3. Then, in period B, MS2 obtains an interference signal for MS2 in period C using the relay data to the terminal under the control of RN3 and the control information, which are transmitted from RN2. Also, in period B, MS2 obtains a channel estimation value between RN2 and MS2 (channel estimation value for a desired signal) using the known signal transmitted from RN2. Also, in period B, MS2 obtains the control information for MS2 (control information on a desired signal) transmitted from RN2.

Next, in period C in the DL subframe illustrated in FIG. 18, RN2 transmits the relay data to the terminal under the control of RN2 (MS2) (DATA to MS) to MS2. Meanwhile, in period C, MS2 receives the relay data to the terminal under the control of RN2 (MS2) from RN2 (DATA to MS). Then, MS2 removes the interference signal from the signal received in period C (relay data from RN2 (desired signal) and the relay data from RN3 (interference signal)) using the interference signal, the control information on the interference signal, the control information for MS2, the channel estimation value between RN2 and MS2 and the channel estimation value between RN3 and MS2, which are obtained in period A and period B, thereby obtaining the desired signal.

As described above, in period C, relay apparatus 100 transmits control information for relay data transmitted to terminal 200 (e.g., a mapping position and an MCS of relay data to terminal 200) during the time of communication between relay apparatuses (period A or period B). For example, in FIG. 18, in period A, odd-numbered RNs (RN1 and RN3) transmit control information for relay data to be transmitted to terminals under the control of the relay apparatuses in period C (DATA to MS) (CONTROL INFORMATION for MS). Also, in FIG. 18, in period B, an even-numbered RN (RN2) transmit control information for relay data to be transmitted to the terminal under the control of the relay apparatus in period C (DATA to MS) (CONTROL INFORMATION for MS).

Then, terminal 200 receives the control information for terminal 200 transmitted in period A or period B by relay apparatus 100 to which terminal 200 is connected, and control information for a terminal under the control of a downstream RN (control information on an interference signal), which is transmitted in period B or period A (in other words, a period different from that of relay apparatus 100) by the downstream RN for relay apparatus 100 to which terminal 200 is connected. Consequently, in period A or period B, terminal 200 can receive the control information for terminal 200 (control information on a desired signal) and the control information for a terminal under the control of the downstream RN (control information on the interference signal) from two adjacent relay apparatuses to which terminal 200 is connectable (RN2 and RN3 for MS2 illustrated in FIG. 18) without interference, enabling interference removal (interference cancelling) with good precision.

As described above, according to the present embodiment, as in embodiment 1, even in a case where multihop communication is performed between a plurality of relay apparatuses using the same frequency, interference to a signal from a relay apparatus to which a terminal is connected, by a signal from another relay apparatus can be reduced. Furthermore, according to the present embodiment, a terminal uses periods for communication between relay apparatuses (period A and period B) for communication of control information for terminals, making it possible to reliably obtain control information on a desired signal (relay data to the terminal) and control information on an interference signal (relay data to another terminal). Thus, in the present embodiment, as in embodiment 2 and embodiment 3, interference to a signal from a relay apparatus to which a terminal is connected, by a signal from another relay apparatus can reliably be reduced.

Embodiment 8

In the present embodiment, as in embodiment 7, a terminal receives control information for terminals in periods for communication between relay apparatuses. Furthermore, the present embodiment will be described for a case where a control header provided in control information for a terminal contains notification information indicating existence or non-existence of relay data (relay signal) to each terminal.

A specific explanation of the present embodiment will be provided below.

Relay apparatus 100 (FIG. 2) according to the present embodiment has a configuration similar to that of embodiment 7 and performs an operation similar to that of embodiment 7. In other words, as in embodiment 7, in period A or period B, relay apparatus 100 transmits a known signal, control information for a terminal under the control of relay apparatus 100, relay data to a terminal connected to a relay apparatus positioned downstream of relay apparatus 100 (downstream RN) (relay data to a downstream RN) and control information for the terminal connected to the downstream RN. Also, as in embodiment 7, in period C, relay apparatus 100 transmits relay data (data signal) to the terminal under the control of relay apparatus 100.

Here, each piece of control information is provided with a control header. The control header contains a length (data amount) of the control information, information for a terminal to recognize a time resource or a frequency resource assigned to the control information (that is, information for recognizing a start position of data following the control information) or information for a terminal to recognize a modulation method for control information such as MCS, and a channel coding rate.

However, in relay apparatus 100 according to the present embodiment, a control header provided in control information for a terminal under the control of relay apparatus 100 further contains notification information indicating existence or non-existence of a relay signal (relay data and control information) to the terminal.

Also, as in embodiment 3, relay apparatus 100 transmits a known signal in a guard time (between period B and period C) provided for switching between transmission/reception processing in an adjacent RN.

Figure 19:
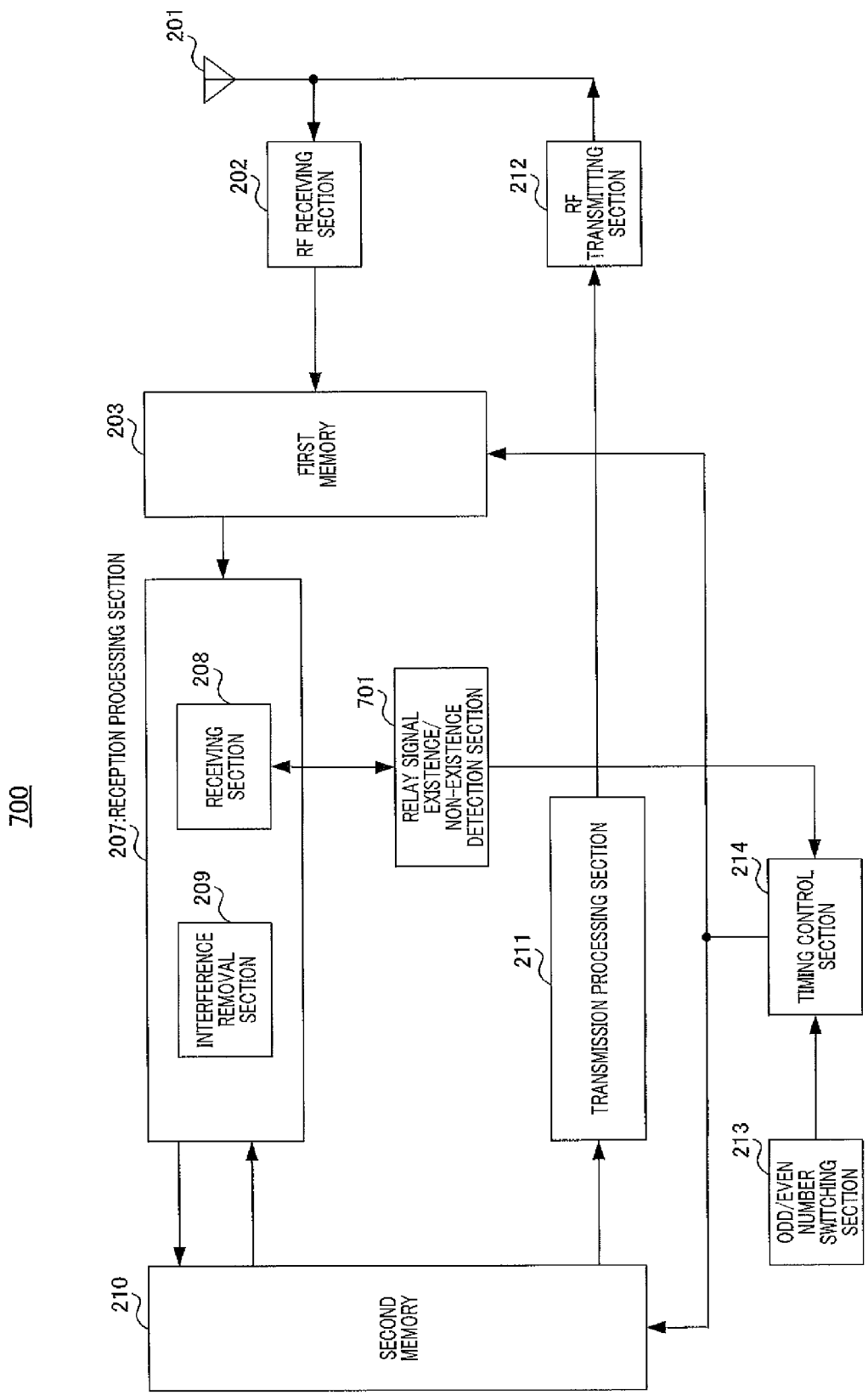
FIG. 19 is a block diagram illustrating a configuration of a terminal according to embodiment 8 of the present invention.

FIG. 19 is a block diagram illustrating a configuration of a terminal according to the present embodiment. In terminal 700 illustrated in FIG. 19, components that are the same as those of embodiment 7 (FIG. 3) are provided with reference numerals that are the same as those of embodiment 7 and explanation of the components will be omitted.

In terminal 700 illustrated in FIG. 19, receiving section 208 of reception processing section 207 performs demodulation and decoding of a relay signal input from first memory 203. More specifically, if terminal 200 is connectable to two adjacent relay apparatuses (RNs), receiving section 208 performs the following processing. In period A or period B (period for communication between relay apparatuses), receiving section 208 receives a relay signal (a known signal, control information for relay data to terminal 200, which is to be transmitted in period C, and a control header for the control information (hereinafter represented by CH), control information for a downstream RN and a control header for the control information (hereinafter indicated by CH) and relay data to another terminal under the control of the downstream RN), which is transmitted from the upstream RN to the downstream RN among the two relay apparatuses to which terminal 200 is connectable.

However, receiving section 208 performs demodulation and decoding of control header CH' for control information for the relay data to terminal 200 to be transmitted in period C, and outputs the decoded control header CH' to relay signal existence/non-existence detection section 701.

Next, if information indicating that there is a relay signal (relay data and control information) for terminal 700 is input from relay signal existence/non-existence detection section 701 (which will described later), receiving section 208 performs demodulation and decoding of the control information for the relay data to terminal 700 to be transmitted in period C, the control information for the downstream RN and control header CH for the control information, and the relay data to the downstream RN. Furthermore, in period A or period B (period for communication between relay apparatuses), receiving section 208 receives a relay signal transmitted by the downstream RN in the two relay apparatuses to which terminal 700 is connectable (a known signal, control information for the relay data to another terminal (interference station for terminal 700) to be transmitted in period C and control header CH' for the control information). Then, receiving section 208 performs demodulation and decoding of the received relay signal.

Also, if information indicating that there is a relay signal (relay data and control information) for terminal 700 is input from relay signal existence/non-existence detection section 701, in a guard time provided for switching between transmission/reception processing in one RN among two adjacent RNs (between period B and period C), receiving section 208 receives a known signal transmitted from the other RN. Then, receiving section 208 calculates a channel estimation value between the RN that has transmitted the known signal and terminal 700, and outputs the channel estimation value to second memory 210. Likewise, receiving section 208 calculates a channel estimation value between each RN and terminal 700 using the known signal from each RN, which is transmitted in periods A to C, and outputs the channel estimation value to second memory 210.

Meanwhile, if information indicating that there is no relay signal (relay data and control information) for terminal 700 is input from relay signal existence/non-existence detection section 701, receiving section 208 stops reception processing in a DL subframe in which no relay signal for terminal 700 exists.

Relay signal existence/non-existence detection section 701 determines whether or not a relay signal (relay data and control information) for terminal 700 exists (detects existence or non-existence of a relay signal) using notification information included in control header CH' input from receiving section 208. In other words, relay signal existence/non-existence detection section 701 detects notification information indicating existence or non-existence of a relay signal for terminal 700, which is contained in control header CH' provided in the control information for terminal 700, to determine whether or not a relay signal for terminal 700 is transmitted from relay apparatus 100 (the upstream RN to which terminal 700 is connected). Then, relay signal existence/non-existence detection section 701 outputs information indicating existence or non-existence of a relay signal ("relay signal exists" or "no relay signal exists") to receiving section 208 and timing control section 214.

If information indicating that a relay signal for terminal 700 exists is input from relay signal existence/non-existence detection section 701, as in embodiment 7, timing control section 214 instructs first memory 203 and second memory 210 about timings for inputting/outputting a relay signal, based on the setting information input from odd/even number switching section 213. Meanwhile, if information indicating that no relay signal for terminal 700 exists is input from relay signal existence/non-existence detection section 701, timing control section 214 instructs first memory 203 and second memory 210 to stop reception processing in a DL subframe in which no relay signal for terminal 700 exists.

Next, details of the processing in relay apparatus 100 and terminal 700 according to the present embodiment will be described.

The below explanation will be provided for a case where multihop communication is performed by three or more RNs as in embodiment 7 (FIG. 18). However, in FIG. 20 and FIG. 21, only three relay apparatuses RN1, RN2 and RN3 among the three or more RNs are illustrated. Also, RN 1 is an upstream RN and RN2 is a downstream RN between RN1 and RN2 illustrated in FIG. 20 and FIG. 21. Also, between RN2 and RN3 illustrated in FIG. 20 and FIG. 21, RN2 is an upstream RN and RN3 is a downstream RN. Also, in FIG. 20 and FIG. 21, MS1 is connected to RN1, and MS2 is connected to RN2. Also, RN1, RN2 and RN3 illustrated in FIG. 20 and FIG. 21 each include the configuration of relay apparatus 100 illustrated in FIG. 2, and MS1 and MS2 each include the configuration of terminal 700 illustrated in FIG. 19.

Figure 20:
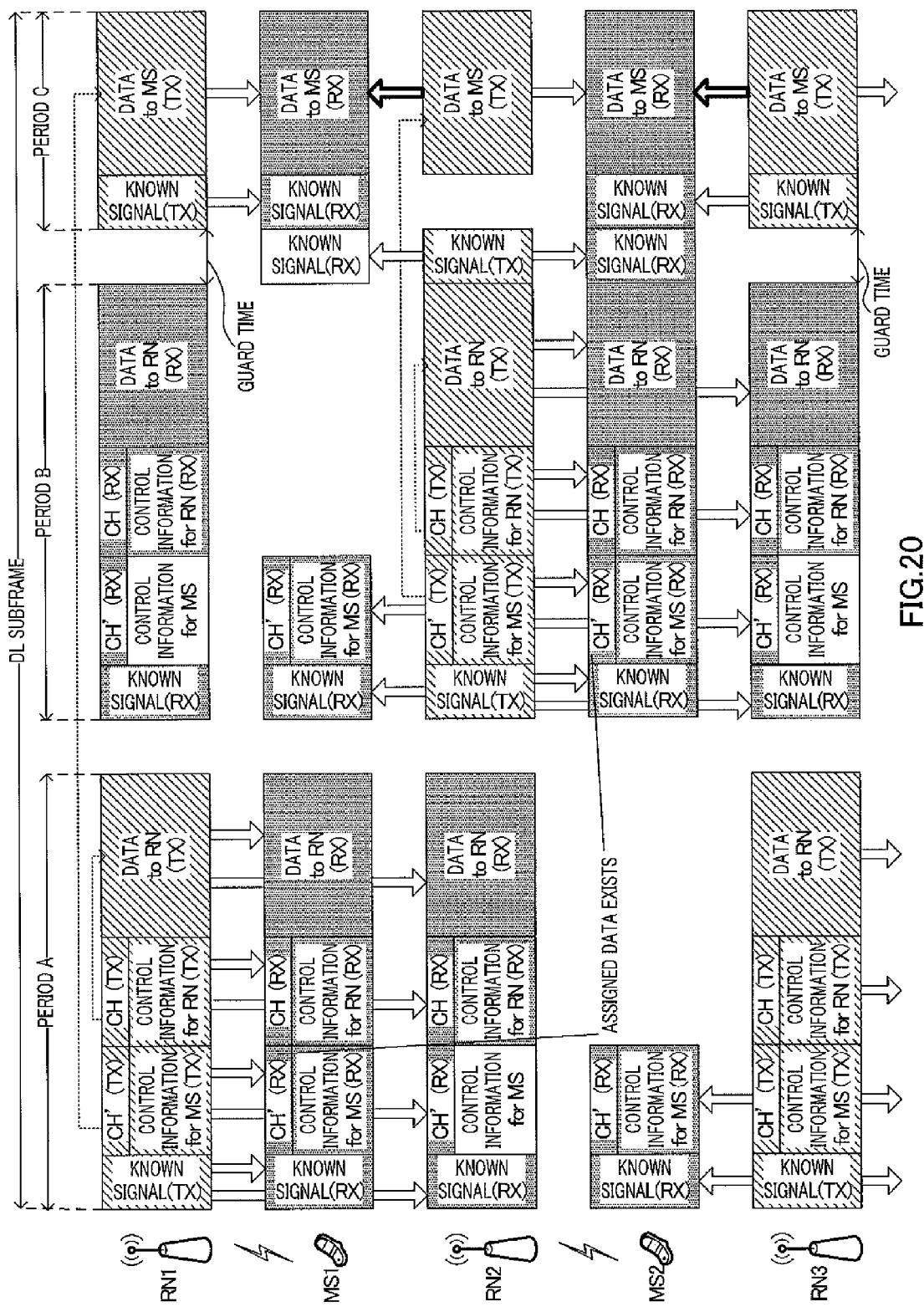
FIG. 20 is a diagram illustrating a control information notification method according to embodiment 8 of the present invention (when there are relay signals for terminals)
Figure 21:
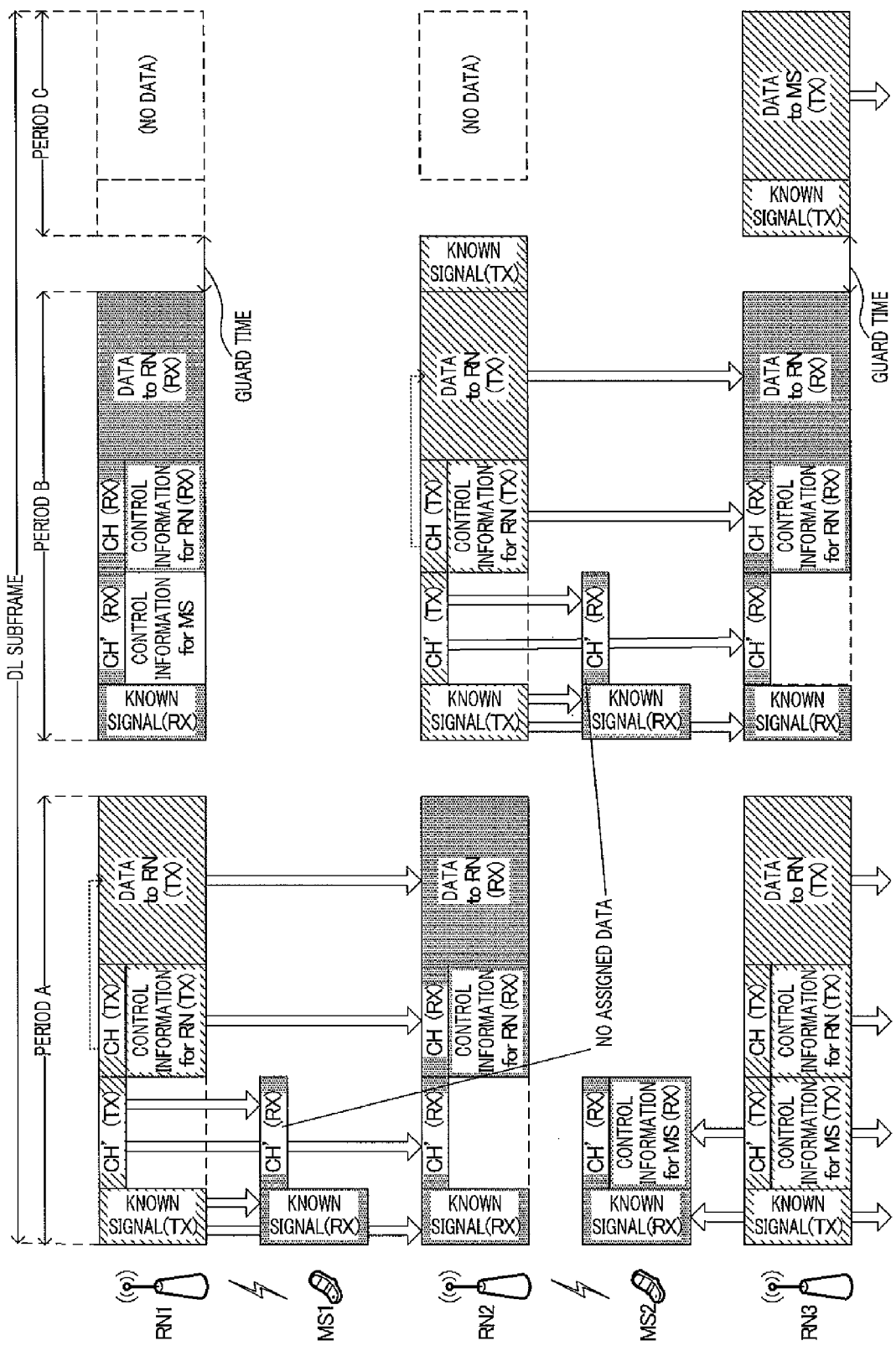
FIG. 21 is a diagram illustrating the control information notification method according to embodiment 8 of the present invention (when there are no relay signals for terminals)

Also, in FIG. 20 and FIG. 21, transmission processing is represented by "TX," and reception processing is represented by "RX."

Also, in FIG. 20 and FIG. 21, control information for relay data transmission between relay apparatuses (control information for a downstream RN) is represented by "CONTROL INFORMATION for RN," and a control header for control information for relay data transmission between relay apparatuses is represented by "CH," and relay data between relay apparatuses (relay data to a downstream RN) is represented by "DATA to RN." Also, in FIG. 20 and FIG. 21, control information for transmission of relay data to a terminal (control information for a terminal) is represented by "CONTROL INFORMATION for MS" and a control header for control information for transmission of relay data to a terminal is represented by "CH'," and relay data to a terminal is represented by "DATA to MS."

Here, the explanation will be provided focusing on control information notification processing in RN1 (odd-numbered RN) and MS1 connected to RN1 (MS1 under the control of RN1), which are illustrated in FIG. 20 and FIG. 21.

First, an explanation will be provided for a case where relay data to MS1 (DATA to MS) is transmitted from RN1 to MS1 in a DL subframe as illustrated in FIG. 20.

In other words, in period A of the DL subframe illustrated in FIG. 20, RN1 transmits a known signal, control information for transmission of relay data to a terminal under the control of RN1 (MS1) (CONTROL INFORMATION for MS) and control header CH' for the control information, control information for transmission of relay data between relay apparatuses (CONTROL INFORMATION for RN) and control header CH for the control information, and relay data between relay apparatuses (DATA to RN). At this time, control header CH' contains notification information indicating that a relay signal for the terminal under the control of RN1 (MS1) (DATA to MS) is contained (assigned data exists).

Also, in period B, RN1 receives, from an upstream apparatus, a known signal, control header CH' for control information for transmission of relay data to a terminal under the control of the upstream apparatus, control information for transmission of relay data between relay apparatuses (CONTROL INFORMATION for RN) and control header CH for the control information, and relay data between relay apparatuses (DATA to RN). Also, in period C, RN1 transmits the relay data to the terminal under the control of RN1 (MS1) (DATA to MS) to MS1.

Meanwhile, in period A of the DL subframe illustrated in FIG. 20, first, MS1 (receiving section 208) receives control header CH' for control information for transmission of relay data to the terminal under the control of RN1 (MS1), and performs demodulation and decoding of control header CH'. Then, MS1 (relay signal existence/non-existence detection section 701) determines that relay data to MS1 (DATA to MS) is transmitted from RN1, using notification information contained in control header CH'.

Therefore, as in embodiment 7, in period A, MS1 further receives control information for transmission of relay data to a terminal under the control of RN2 (MS2) (CONTROL INFORMATION for MS), a known signal, control information for transmission of relay data between relay apparatuses (CONTROL INFORMATION for RN) and control header CH for the control information, and relay data between relay apparatuses (DATA to RN), which are transmitted from RN1 to RN2. Also, in period B, MS1 receives a known signal, and control information for transmission of relay data to the terminal under the control of RN2 (MS2) (CONTROL INFORMATION for MS) and control header CH' for the control information, which are transmitted from RN2 to RN3. Also, in period C, MS1 receives relay data to the terminal under the control of RN1 (MS1) (DATA to MS) from RN1. Then, as in embodiment 7, MS1 removes an interference signal from the signal received in period C (relay data from RN1 (desired signal) and relay data from RN2 (interference signal)), using the interference signal, the control information on the interference signal, the control information for MS1, a channel estimation value between RN1 and MS1 and a channel estimation value between RN2 and MS1, which are obtained in period A and period B, thereby obtaining a desired signal.

Next, the explanation will be provided for a case where no relay data to MS1 (DATA to MS) is transmitted from RN1 to MS1 in a DL subframe as illustrated in FIG. 21.

In other words, in period A in the DL subframe illustrated in FIG. 21, RN1 transmits a known signal, control header CH' for control information for transmission of relay data to the terminal under the control of RN1 (MS1) (CONTROL INFORMATION for MS), control information for transmission of relay data between relay apparatuses (CONTROL INFORMATION for RN) and control header CH for the control information, and relay data between relay apparatuses (DATA to RN). In other words, in the DL subframe illustrated in FIG. 21, RN1 does not transmit control information for transmission of relay data to MS1 (CONTROL INFORMATION for MS) and relay data to MS1 (DATA to MS). Control header CH' transmitted in period A contains notification information indicating that no relay data to the terminal under the control of RN1 (MS1) (DATA to MS) is contained (NO ASSIGNED DATA EXISTS).

Meanwhile, in period A in the DL subframe illustrated in FIG. 21, as in FIG. 20, MS1 (receiving section 208) first receives control header CH' for control information for transmission of relay data to the terminal under the control of RN1 (MS1), and performs demodulation and decoding of control header CH'. Then, MS1 (relay signal existence/non-existence detection section 701) determines that no relay data to MS1 (DATA to MS) is transmitted from RN1, using the notification information contained in control header CH'. Therefore, MS1 stops reception processing (demodulation and decoding) of a part following control header CH' in the DL subframe illustrated in FIG. 21.

As described above, if terminal 700 determines that a relay signal for terminal 700 (relay data and control information) is transmitted from relay apparatus 100 (upstream RN) to which terminal 700 is connected (FIG. 20), using notification information contained in control header CH', terminal 700 performs reception processing of control information for terminal 700 transmitted from an upstream RN and control information for another terminal apparatus transmitted from a downstream RN in period A or period B as in embodiment 7. Then, terminal 700 performs interference removal processing in period C as in embodiment 7.

In other words, if a relay signal for terminal 700 exists in period C, terminal 700 receives control information for terminal 700 and control information for a terminal under the control of a downstream RN from two adjacent relay apparatuses to which terminal 700 is connectable (RN1 and RN2 for MS1 illustrated in FIG. 20) in period A or period B without interference as in embodiment 7, and thus, can perform interference removal (interference cancellation) with good precision.

Meanwhile, if terminal 700 determines that no relay signal for terminal 700 is transmitted from relay apparatus 100 (upstream RN) to which terminal 700 is connected (FIG. 21), using notification information contained in control header CH', terminal 700 stops reception processing for the control information for terminal 700 transmitted from the upstream RN and the control information for the other terminal apparatus transmitted from the downstream RN in period A or period B.

In other words, terminal 700 activates relay signal reception processing in period A and period B only if a relay signal for terminal 700 is received in period C (that is, if interference removal processing is needed). In other words, if no relay data to terminal 700 exists in period C, terminal 700 stops the relay signal reception processing in period A or period B, enabling suppression of wasteful processing such as reception processing for an interference signal and control information on the interference signal and estimation processing for a channel to an interference station.

As described above, according to the present embodiment, even in a case where multihop communication is performed between a plurality of relay apparatuses using the same frequency, interference to a signal from a relay apparatus to which a terminal is connected, by a signal from another relay apparatus can be reduced as in embodiment 1. Furthermore, according to the present embodiment, a terminal uses periods for communication between relay apparatuses (period A and period B) for transmission of control information for terminals, making it possible to reliably obtain control information on a desired signal (relay data to this terminal) and control information on an interference signal (relay data to another terminal). Thus, in the present embodiment, as in embodiment 7, interference to a signal from a relay apparatus to which a terminal is connected, by a signal from another relay apparatus can be reliably reduced. Furthermore, according to the present embodiment, in a certain subframe, if no relay data to a terminal exists (if interference removal processing is not needed), the terminal stops processing for reception of relay signals from each relay apparatus, enabling suppression of wasteful processing for interference removal processing.

Embodiment 9

Embodiment 8 has been described for a case where notification information indicating existence or non-existence of a relay signal for a terminal is contained in a control header provided in control information for the terminal. Meanwhile, the present embodiment will be described for a case where a relay apparatus transmits information indicating existence or non-existence of a relay signal (relay data and control information) for a terminal in a certain subframe, in a subframe immediately before the subframe (previous subframe).

The present embodiment will be specifically described below.

Figure 22:
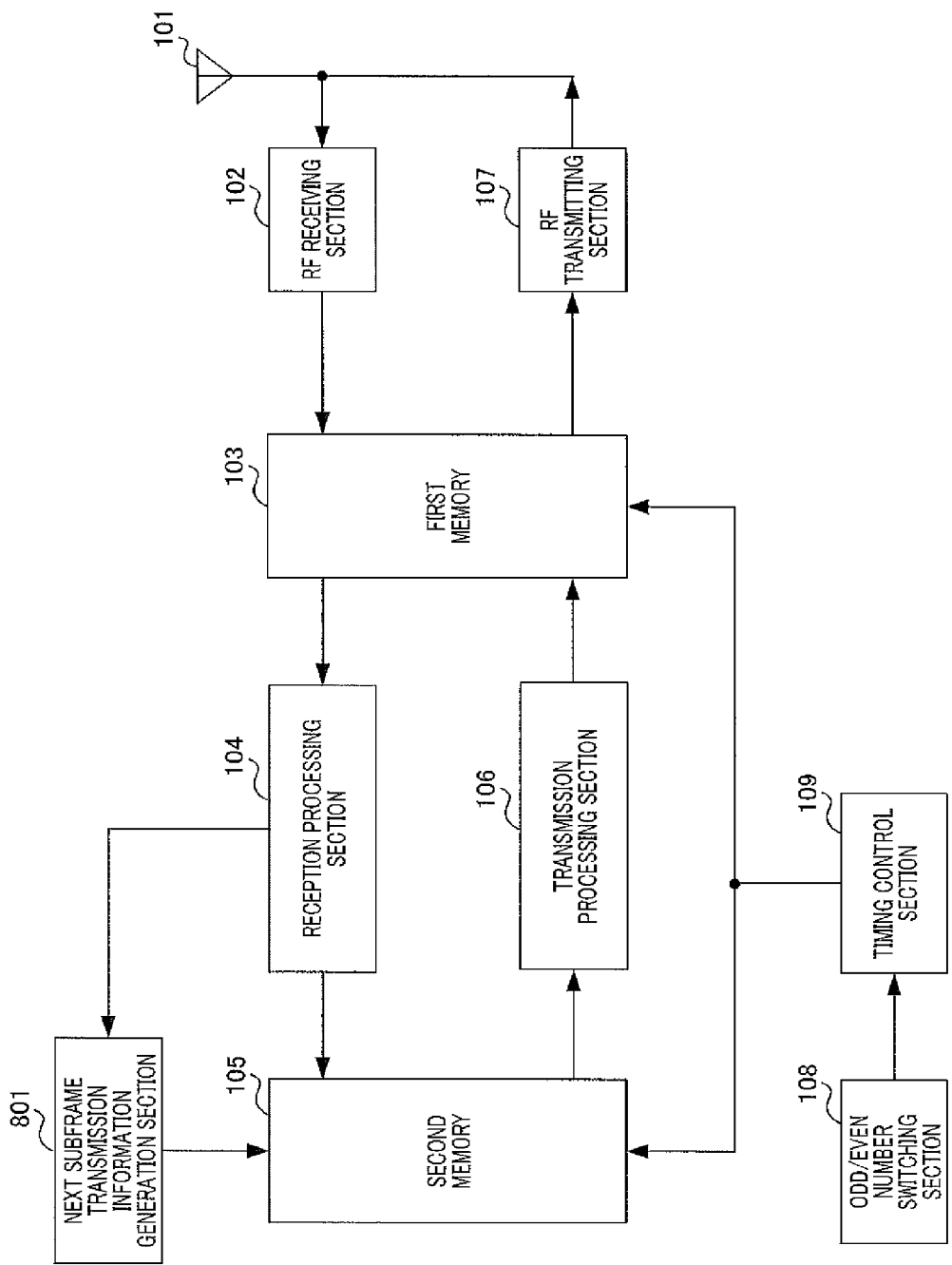
FIG. 22 is a block diagram illustrating a configuration of a relay apparatus according to embodiment 9 of the present invention.

FIG. 22 illustrates relay apparatus 800 according to the present embodiment. In relay apparatus 800 illustrated in FIG. 22, components that are the same as those of relay apparatus 100 (FIG. 2) in embodiment 8 are provided with reference numerals that are the same as those of relay apparatus 100, and explanation of the components will be omitted. Relay apparatus 800 illustrated in FIG. 22 is different from relay apparatus 100 in addition of next subframe transmission information generation section 801, and operations of reception processing section 104 and timing control section 109.

In relay apparatus 800 illustrated in FIG. 22, reception processing section 104 first performs demodulation and decoding of control information for a relay signal between relay apparatuses contained in a relay signal input from first memory 103. Here, notification of a mapping position and an MCS (modulation and coding scheme), or the like of the control information are provided in a control header provided in the control information. Also, the control information contains a mapping position and an MCS of the relay signal between relay apparatuses (data directed to a terminal connected to relay apparatus 100 and/or data directed to a terminal connected to a downstream RN). Then, reception processing section 104 performs demodulation and decoding of a data signal contained in the relay signal input from first memory 103, based on the mapping position and the MCS contained in the control information. Then, reception processing section 104 outputs the decoded signal to second memory 105.

Furthermore, reception processing section 104 detects whether or not a relay signal for a terminal under the control of relay apparatus 800, which is to be transmitted in a subframe following the current subframe, is contained in the received relay signal. Then, if a relay signal to be transmitted in the following subframe is contained in the received relay signal, reception processing section 104 outputs information indicating which terminal under the control of relay apparatus 800 the relay signal is directed, to next subframe transmission information generation section 801.

Next subframe transmission information generation section 801 generates information, as next subframe transmission information, in which whether or not a relay signal to be transmitted in the following subframe exists is mapped for every terminal under the control of relay apparatus 800, based on the information input from reception processing section 104. Then, next subframe transmission information generation section 801 outputs the generated next subframe transmission information to second memory 105. Consequently, the next subframe transmission information is stored (written) in second memory 105.

Timing control section 109 instructs first memory 103 and second memory 105 about timings for inputting/outputting relay signals, based on setting information input from odd/even number switching section 108.

For example, if the setting information input from odd/even number switching section 108 indicates "odd number" (if relay apparatus 800 is an odd-numbered RN), in period A, timing control section 109 instructs (gives a read instruction to) first memory 103 to output control information for relay data to a terminal under the control of relay apparatus 100, which is to be transmitted in period C, and a control header for the control information, and control information for relay data to a downstream RN and a control header for the control information, and a relay signal for the downstream RN to RF transmitting section 107.

Also, in period B, timing control section 109 instructs (gives a write instruction to) first memory 103 to store a relay signal input from RF receiving section 102 (relay signal for a terminal connected to relay apparatus 100 and/or a relay signal for a terminal connected to the downstream RN, and control information for each relay signal). Also, in period B, when the relay signal is stored in first memory 103, timing control section 109 instructs (gives a read instruction to) first memory 103 to output the stored relay signal to reception processing section 104, and instructs (gives a write instruction to) second memory 105 to store the signal input from reception processing section 104 (decoded signal) and the next subframe transmission information input from next subframe transmission information generation section 801. Also, in period B, when the decoded signal is stored in second memory 105, timing control section 109 instructs (gives a read instruction to) second memory 105 to output the relay signal (the relay signal for the terminal connected to relay apparatus 100 and/or the relay signal for the terminal connected to the downstream RN, the control information for each relay signal, and the next subframe transmission information) to transmission processing section 106. Also, in period B, timing control section 109 instructs (gives a write instruction to) first memory 103 to store the relay signal input from transmission processing section 106 (the relay signal for the terminal connected to relay apparatus 100 and/or the relay signal for the terminal connected to the downstream RN, the control information for each relay signal, and the next subframe transmission information).

Meanwhile, if the setting information input from odd/even number switching section 108 indicates "even number" (if relay apparatus 100 is an even-numbered RN), timing control section 109 performs, in period B, processing similar to the processing performed in period A when the setting information indicates "odd number," and performs, in period A, processing similar to the processing performed in period B when the setting information indicates "odd number." In other words, the processing in period A and the processing in period B in timing control section 109 are interchanged between an odd-numbered RN and an even-numbered RN.

Also, regardless of the setting information input from odd/even number switching section 108, in period C, timing control section 109 instructs (gives a read instruction to) first memory 103 to output the relay signal for the terminal connected to relay apparatus 100 to RF transmitting section 107. Also, regardless of the setting information input from odd/even number switching section 108, at a timing subsequent to period C (for example, an tail end of a subframe), timing control section 109 instructs (gives a read instruction to) first memory 103 to output the next subframe transmission information to RF transmitting section 107.

Also, as in embodiment 8, relay apparatus 100 transmits a known signal in a guard time provided for switching between transmission/reception processing in an adjacent RN (between period B and period C).

Next, a terminal according to the present embodiment will be described. Terminal 700 (FIG. 19) according to the present embodiment has a configuration similar to that of embodiment 8 and is different from that of embodiment 8 only in operations of receiving section 208, timing control section 214 and relay signal existence/non-existence detection section 701.

In terminal 700 according to the present embodiment, receiving section 208 of reception processing section 207 performs demodulation and decoding of a relay signal input from first memory 203. More specifically, if terminal 700 is connectable to two adjacent relay apparatuses (RNs), receiving section 208 performs the following processing. Receiving section 208 first performs demodulation and decoding of next subframe transmission information received at a timing following period C of a previous subframe, and outputs the decoded next subframe transmission information to relay signal existence/non-existence detection section 701. The next subframe transmission information received in the previous subframe indicates existence or non-existence of a relay signal for terminal 700 in the current subframe.

Next, if information indicating that a relay signal for terminal 700 exists in the current sub frame is input from relay signal existence/non-existence detection section 701 (which will be described later), in period A or period B (period for communication between relay apparatuses), receiving section 208 receives a relay signal transmitted by an upstream RN among two relay apparatuses to which terminal 700 is connectable (a known signal, control information for relay data to terminal 200 to be transmitted in period C and a control header for the control information (hereinafter represented by CH'), control information for a downstream RN and a control header for the control information (hereinafter represented by CH), and relay data to the downstream RN), and performs demodulation and decoding of the received relay signal. Furthermore, in period A or period B (period for communication between relay apparatuses), receiving section 208 receives a relay signal transmitted by the downstream RN among the two relay apparatuses to which terminal 700 is connectable (a known signal, control information for relay data to another terminal (an interference station for terminal 700) to be transmitted in period C and control header CH' for the control information), and performs demodulation and decoding of the received relay signal.

Also, if information indicating that a relay signal for terminal 700 exists is input from relay signal existence/non-existence detection section 701, in a guard time provided for switching between transmission/reception processing in one RN among the two adjacent RNs (between period B and period C), receiving section 208 receives a known signal transmitted from the other RN. Then, receiving section 208 calculates a channel estimation value between the RN that transmitted the known signal and terminal 700, and outputs the channel estimation value to second memory 210. Likewise, receiving section 208 calculates a channel estimation value between each RN and terminal 700 using the known signal from each RN transmitted in periods A to C, and outputs the channel estimation value to second memory 210.

Meanwhile, if information indicating that no relay signal for terminal 700 exists in the current subframe is input from relay signal existence/non-existence detection section 701, receiving section 208 receives a relay signal (a known signal only) transmitted in period A from the upstream RN to the downstream RN among the two relay apparatuses to which terminal 700 is connectable, and maintains synchronization with upstream RN. Also, receiving section 208 receives next subframe transmission information at a timing subsequent to period C in the current subframe. In other words, if information indicating that no relay signal for terminal 700 exists in the current subframe is input from relay signal existence/non-existence detection section 701 (that is, a DL subframe in which no relay signal for terminal 700 exists), receiving section 208 stops processing for reception of all of relay signals except the known signal and the next subframe transmission information in period A.

Relay signal existence/non-existence detection section 701 detects the next subframe transmission information (notification information) transmitted from the upstream RN in the previous subframe, which is input from receiving section 208, to determine whether or not a relay signal for terminal 700 is transmitted from relay apparatus 800 (the upstream RN to which terminal 700 is connected) in the current subframe (detects existence or non-existence of a relay signal). Then, relay signal existence/non-existence detection section 701 outputs information indicating existence or non-existence of a relay signal ("signal exists" or "no signal exists") to receiving section 208 and timing control section 214.

If information indicating that a relay signal for terminal 700 exists in the current subframe is input from relay signal existence/non-existence detection section 701, in the current subframe, timing control section 214 instructs first memory 203 and second memory 210 about timings for inputting/outputting relay signals, based on setting information input from odd/even number switching section 213, as in embodiment 7.

Meanwhile, if information indicating that no relay signal for terminal 700 exists in the current subframe is input from relay signal existence/non-existence detection section 701, in the current subframe, timing control section 214 instructs first memory 203 and second memory 210 to receive the known signal in period A and the next subframe transmission information at the timing subsequent to period C only and stop reception processing at other timings. For example, timing control section 214 masks clocks for the respective component units so that the component units operate at a timing corresponding to the known signal in period A and the timing subsequent to period C only.

Next, details of the processing in relay apparatus 800 (FIG. 22) and terminal 700 (FIG. 19) according to the present embodiment will be described.

The below explanation will be provided for a case where multihop communication is performed using three or more RNs as in embodiment 8 (FIG. 20 and FIG. 21). However, in FIG. 23 and FIG. 24, only three relay apparatuses RN1, RN2 and RN3 among the three or more RNs are illustrated. Also, RN1 is an upstream RN and RN2 is a downstream RN between RN1 and RN2 illustrated in FIG. 23 and FIG. 24. Also, RN2 is an upstream RN and RN3 is a downstream RN between RN2 and RN3 illustrated in FIG. 23 and FIG. 24. Also, in FIG. 23 and FIG. 24, MS1 is connected to RN1 and MS2 is connected to RN2. RN1, RN2 and RN3 illustrated in FIG. 23 and FIG. 24 each include the configuration of relay apparatus 800 illustrated in FIG. 22, and MS1 and MS2 each include the configuration of terminal 700 illustrated in FIG. 19.

Figure 23:
FIG. 23 is a diagram illustrating a control information notification method according to embodiment 9 of the present invention (when there are relay signals for terminals)
Figure 24:
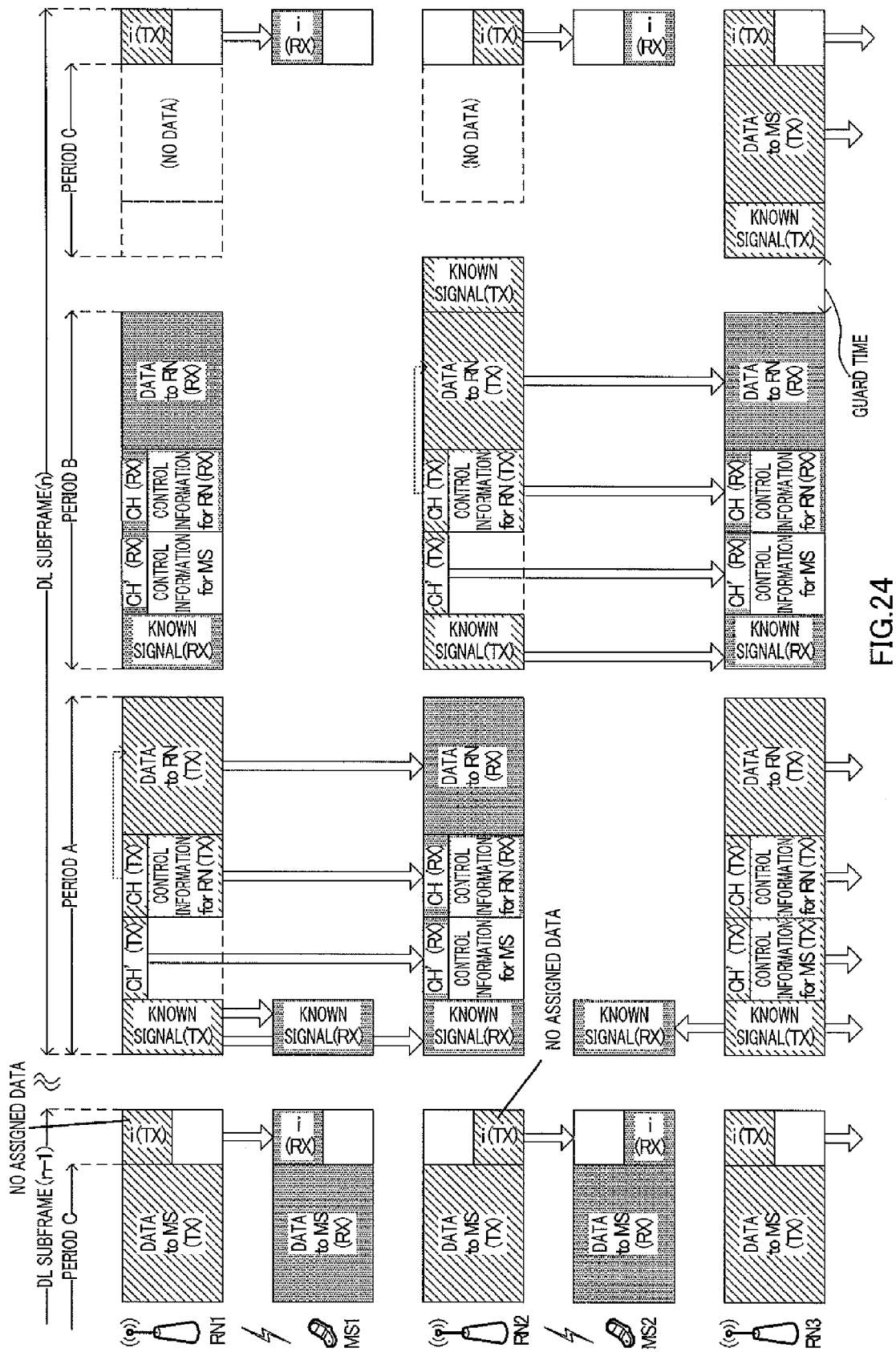
FIG. 24 is a diagram illustrating a control information notification method according to embodiment 9 of the present invention (when there are no relay signals for terminals)

Also, in FIG. 23 and FIG. 24, transmission processing is represented by "TX" and reception processing is represented by "RX."

Also, in FIG. 23 and FIG. 24, as in embodiment 8 (FIG. 20 and FIG. 21), control information for transmission of relay data between relay apparatuses (control information for a downstream RN) is represented by "CONTROL INFORMATION for RN," a control header for control information for transmission of relay data between relay apparatuses is represented by "CH," and relay data between relay apparatuses (relay data to the downstream RN) is represented by "DATA to RN." Also, in FIG. 23 and FIG. 24, control information for transmission of relay data to a terminal (control information for a terminal) is represented by "CONTROL INFORMATION for MS," a control header of control information for transmission of relay data to a terminal is represented by "CH," and relay data to a terminal is represented by "DATA to MS." Also, in FIG. 23 and FIG. 24, next subframe transmission information is represented by "i." However, in order to avoid interference between adjacent relay apparatuses, next subframe transmission information i is transmitted using, for example, resources (e.g., time, frequency or code) different from each other between relay transmissions.

Here, the explanation will be provided focusing on control information notification processing in RN1 (odd-numbered RN) and MS1 connected to RN1 (MS1 under the control of RN1) illustrated in FIG. 23 and FIG. 24.

First, as illustrated in FIG. 23, a case where relay data to MS1 (DATA to MS) is transmitted from RN1 to MS1 in DL subframe (n) will be described.

Here, at a timing subsequent to period C in DL subframe (n−1), which is a subframe before DL subframe (n) illustrated in FIG. 23, RN1 transmits next subframe transmission information i. Next subframe transmission information i in DL subframe (n−1) indicates that a relay signal for MS1 (DATA to MS) transmitted in DL subframe (n) exists (ASSIGNED DATA EXISTS).

Also, in period A in DL subframe (n) illustrated in FIG. 23, RN1 transmits a known signal, control information for transmission of relay data to a terminal (MS1) under the control of RN1 (CONTROL INFORMATION for MS) and control header CH' for the control information, control information for transmission of relay data between relay apparatuses (CONTROL INFORMATION for RN) and control header CH for the control information, and relay data between relay apparatuses (DATA to RN) as in embodiment 8. Also, in period B in DL subframe (n), RN1 receives, from an upstream apparatus, a known signal, control header CH' for control information for transmission of relay data to a terminal under the control of the upstream apparatus, control information for transmission of relay data between relay apparatuses (CONTROL INFORMATION for RN) and control header CH for the control information, and relay data between relay apparatuses (DATA to RN). Also, in period C in DL subframe (n), RN1 transmits relay data to the terminal under the control of RN1 (MS1) (DATA to MS) to MS1.

Also, at a timing subsequent to period C in DL subframe (n) illustrated in FIG. 23, RN1 transmits next subframe transmission information i indicating existence or non-existence of relay signal to the terminal under the control of RN1 in the next DL subframe (n+1) (not illustrated).

Meanwhile, at a timing subsequent to period C in DL subframe (n−1), MS1 (receiving section 208) receives next subframe transmission information i. Then, MS1 (relay signal existence/non-existence detection section 701) determines that relay data to MS1 (DATA to MS) is transmitted from RN1 in DL subframe (n), using next subframe transmission information i.

Therefore, in period A in DL subframe (n), MS1 receives the control information for transmission of relay data to the terminal under the control of RN1 (MS1) (CONTROL INFORMATION for MS) and control header CH' for the control information, and the known signal, the control information for transmission of relay data between relay apparatuses (CONTROL INFORMATION for RN) and control header CH for the control information, and the relay data between relay apparatuses (DATA to RN), which are transmitted from RN1 to RN2. Also, in period B in DL subframe (n), MS1 receives a known signal, and control information for transmission of relay data to a terminal under the control of RN2 (MS2) (CONTROL INFORMATION for MS) and control header CH' for the control information, which are transmitted from RN2 to RN3. Also, in period C in DL subframe (n), MS1 receives relay data to the terminal under the control of RN1 (MS1) (DATA to MS) from RN1. Then, as in embodiment 8, MS1 removes an interference signal from the signal received in period C (the relay data from RN1 (desired signal) and the relay data from RN2 (interference signal)), using the interference signal, the control information on the interference signal, the control information for MS1, a channel estimation value between RN1 and MS1 and a channel estimation value between RN2 and MS1, which are obtained in period A and period B, thereby obtaining the desired signal.

Next, the explanation will be provided for a case where no relay data to MS1 (DATA to MS) is transmitted from RN1 to MS1 in DL subframe (n) as illustrated in FIG. 24.

In this case, at a timing subsequent to period C in DL subframe (n−1), which is a subframe before DL subframe (n) illustrated in FIG. 24, RN1 transmits next subframe transmission information i. Next subframe transmission information i in DL subframe (n−1) indicates that no relay signal for MS1 (DATA to MS) transmitted in DL subframe (n) exists (NO ASSIGNED DATA EXISTS).

Also, in period A in DL subframe (n) illustrated in FIG. 24, RN1 transmits a known signal, control header CH' for control information for transmission of relay data to the terminal under the control of RN1 (MS1) (CONTROL INFORMATION for MS), control information for transmission of relay data between relay apparatuses (CONTROL INFORMATION for RN) and control header CH for the control information, and relay data between relay apparatuses (DATA to RN). In other words, in DL subframe (n) illustrated in FIG. 24, RN1 does not transmit control information for transmission of relay data to MS1 (CONTROL INFORMATION for MS) and relay data to MS1 (DATA to MS).

Also, at a timing subsequent to period C in DL subframe (n) illustrated in FIG. 24, RN1 transmits next subframe transmission information i indicating existence or non-existence of a relay signal for a terminal under the control of RN1 in the next DL subframe (n+1) (not illustrated).

Meanwhile, at a timing subsequent to period C in DL subframe (n−1), MS1 (receiving section 208) receives next subframe transmission information i. Then, MS1 (relay signal existence/non-existence detection section 701) determines that no relay data to MS1 (DATA to MS) is transmitted from RN1 in DL subframe (n), using next subframe transmission information i.

Therefore, in period A in DL subframe (n) illustrated in FIG. 24, MS1 receives a known signal from RN1 in order to maintain synchronization with RN1. Also, at a timing subsequent to period C in DL subframe (n) illustrated in FIG. 24, MS1 receives next subframe transmission information i in order to determine existence or non-existence of a relay signal for MS1 in next DL subframe (n+1). In other words, in DL subframe (n) illustrated in FIG. 24, MS1 stops reception processing for interference removal processing.

Here, embodiment 8 (FIG. 21) and the present embodiment (FIG. 24) will be compared with each other in terms of a DL subframe in which no relay signal for terminal 700 exists. In embodiment 8 (FIG. 21), each terminal receives notification information indicating existence or non-existence of a relay signal for the terminal in a certain DL subframe, in the DL subframe (control header CH'). Accordingly, for example, in embodiment 8 (FIG. 21), focusing on MS2, MS2 can determine existence or non-existence of a relay signal for MS2 only in period B. In other words, in embodiment 8 (FIG. 21), MS2 (terminal under the control of an even-numbered RN) needs to receive control information for possible interference in period A regardless of existence or non-existence of a relay signal for MS2. Meanwhile, in the present embodiment (FIG. 24), terminal 700 receives notification information indicating existence or non-existence of a relay signal for terminal 700 (next subframe transmission information) in a certain DL subframe, in a DL subframe before the DL subframe (previous DL subframe). In other words, in the present embodiment (FIG. 24), every terminal 700 (MS1 and MS2 in FIG. 24) can determine existence or non-existence of a relay signal for terminal 700 at a start point of a DL subframe regardless of which RN the terminal is connected to.

Consequently, terminal 700 need not receive information for interference removal (relay data that may cause interference and control information) at all in a DL subframe in which no relay signal for terminal 700 exists, enabling further suppression of wasteful processing compared to embodiment 8.

Also, as in embodiment 7 and embodiment 8, in period A or period B, terminal 700 can receive control information for terminal 700 and control information for a terminal under the control of a downstream RN from two adjacent relay apparatuses to which terminal 700 is connectable (RN1 and RN2 for MS1 illustrated in FIG. 20) without interference, respectively, enabling interference removal (interference cancellation) to be performed with good precision.

As described above, according to the present embodiment, even in a case where multihop communication is performed between a plurality of relay apparatuses using the same frequency, as in embodiment 1, interference to a signal from a relay apparatus to which a terminal is connected, by a signal from another relay apparatus can be reduced. Furthermore, according to the present embodiment, a terminal uses periods for communication between relay apparatuses (period A and period B) for communication of control information for the terminal, making it possible to reliably obtain control information on a desired signal (relay data to this terminal) and control information on an interference signal (relay data to another terminal). Thus, in the present embodiment, as in embodiment 7 and embodiment 8, interference to a signal from a relay apparatus to which a terminal is connected, by a signal from another relay apparatus can be reliably reduced. Furthermore, according to the present embodiment, if no relay data to a terminal exists (if interference removal processing is not needed) in a certain subframe, the terminal stops reception processing for a relay signal from each relay apparatus from a start point of the subframe, enabling further suppression of wasteful processing for interference removal processing compared to embodiment 8.

Embodiments of the present invention have been described above.

Embodiments 1 to 3 have been described assuming a case where relay apparatuses and terminals complete reception processing and transmission processing for all signals by period C in each DL subframe. However, time required for transmission/reception processing differs depending on, e.g., the content of the processing or the processing capability in a relay apparatus and a terminal or the data amount in the relay signal. However, in the present invention, effects similar to those of the above-described embodiments can be provided even in a case where processing of data received by a relay apparatus in period A or period B in each DL subframe is not completed by period C subsequent to period A and period B and a signal received in a previous DL subframe is transmitted in period C.

Figure 25:
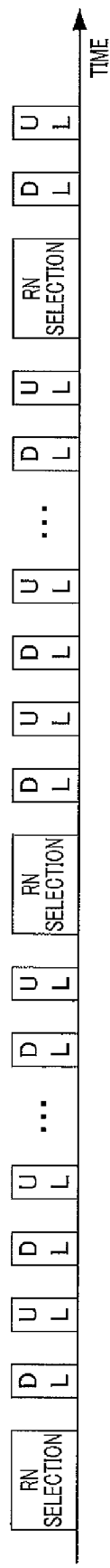
FIG. 25 is a diagram illustrating a sequence of connection-destination RN selection processing in the present invention.

Also, in the present invention, for example, as illustrated in FIG. 25, processing for selecting a connection-destination relay apparatus (RN) (serving cell) in a terminal (for example, the processing illustrated in FIG. 4) may be performed in a period for connection-destination RN selection processing ("RN selection" illustrated in FIG. 25), which is periodically provided between a DL subframe ("DL" illustrated in FIG. 25) and an UL subframe ("UL" illustrated in FIG. 25). Alternatively, processing for selecting a connection-destination RN in a terminal may be performed concurrently with communication between RNs and communication between RNs and terminals in downlink and uplink. In this case, in processing for selecting a connection-destination RN in a terminal, which is illustrated in FIG. 4 (step 1 to step 4), step 1 and step 2 are performed in period A and period B in the DL subframe illustrated in FIG. 5. In other words, a known signal contained in a relay signal communicated between RNs (an upstream RN and a downstream RN) is used in step 1 and step 2 illustrated in FIG. 4. Also, in the processing for selecting a connection-destination RN in a terminal, which is illustrated in FIG. 4, step 3 is performed in period A' in the UL subframe illustrated in FIG. 14. Also, in the processing for selecting a connection-destination RN in a terminal, which is illustrated in FIG. 4, step 4 is performed in period A or period B following the DL subframe in which step 1 and step 2 have been performed.

Furthermore, although the above embodiments have been described taking a case where the present invention includes hardware as an example, the present invention can be provided by software.

Also, the respective functional blocks used for the illustration of the above embodiments are typically provided as LSIs, which are integrated circuits. These may be formed into individual chips, or a part or all of these may be formed into one chip. Although LSIs are mentioned here, the LSIs may also be referred to as ICs, system LSIs, super LSIs or ultra LSIs according to the differences in integration density.

Also, a technique of providing an integrated circuit is not limited to LSI and may be provided by a dedicated circuit or a general-purpose processor. An FPGA (field programmable gate array) that enables programming after manufacture of an LSI, or a reconfigurable processor enabling reconfiguration of connection and/or setting of circuit cells inside an LST may be used.

Furthermore, it should be understood that if an integrated circuit technique replacing LSI emerges as a result of advancement in semiconductor technology or another technology derived from the semiconductor technology, integration of functional blocks may be performed using such technique. For example, biotechnology may be employed.

The entire disclosure of the specification, drawings and abstract included in each of Japanese Patent Application No. 2010-019058 filed on Jan. 29, 2010 and Japanese Patent Application No. 2010-100870 filed on Apr. 26, 2010 are incorporated in the present application by reference in its entirety.

INDUSTRIAL APPLICABILITY

The present invention is applicable to, e.g., mobile communication systems.

REFERENCE SIGNS LIST

100, 300, 500, 800 Relay apparatus
200, 400, 600, 700 Terminal
101, 201 Antenna
102, 202 RF receiving section
103, 203 First memory
104, 207 Reception processing section
105, 210 Second memory
106, 211, 302 Transmission processing section
107, 212 RF transmitting section
108, 213 Odd/even number switching section
109, 214, 303, 402, 501, 601 Timing control section
204 Known signal detection section
205 Signal strength measuring section
206 Selection section
208, 602 Receiving section
209, 603 Interference removal section
301 Scheduling section
401 Pointer generation section
701 Relay signal existence/non-existence detection section
801 Next subframe transmission information generation section

The invention claimed is:

1. A terminal apparatus in a radio communication system in which a plurality of relay apparatuses relay communication between a base station apparatus and terminal apparatuses using the same frequency, on a per-subframe basis where each subframe includes a first period and a second period for communication between the plurality of relay apparatuses and a third period for communication between the plurality of relay apparatuses and the terminal apparatuses, while two adjacent relay apparatuses among the plurality of relay apparatuses perform transmission processing in mutually-different periods, respectively, in the first period and the second period, and the plurality of relay apparatuses simultaneously perform transmission to terminal apparatuses connected to the relay apparatuses, in the third period, the terminal apparatus comprising:

a selection section that selects connection to an upstream relay apparatus positioned upstream in a signal transfer direction between the base station apparatus and the terminal apparatus from among the two relay apparatuses, when the terminal apparatus is connectable to the two relay apparatuses;

a receiving section that receives a signal for another terminal apparatus, the signal being transmitted from the upstream relay apparatus to a downstream relay apparatus positioned downstream in the transfer direction among the two relay apparatuses, in the first period or the second period; and a removing section that removes a signal for the other terminal apparatus transmitted from the downstream relay apparatus in the third period from a signal received in the third period, using the signal for the other terminal apparatus received in the first period or the second period, thereby obtaining a signal for the terminal apparatus transmitted from the upstream relay apparatus.

2. The terminal apparatus according to claim 1,
wherein, when both of received signal strength indicators of signals received respectively from the two relay apparatuses are not less than a pre-set threshold value, the selection section selects connection to the upstream relay apparatus, whereas the selection section selects connection to the downstream relay apparatus when the received signal strength indicator of the signal received from the upstream relay apparatus among the two relay apparatuses is less than the threshold value and the received signal strength indicator of the signal received from the downstream relay apparatus among the two relay apparatuses is not less than the threshold value.

3. The terminal apparatus according to claim 1,
wherein the upstream relay apparatus generates control information for the other terminal apparatus connected to the downstream relay apparatus, using control information for the terminal apparatus connected to the upstream relay apparatus, the receiving section further receives the control information for the terminal apparatus and the control information for the other terminal apparatus, which are transmitted from the upstream relay apparatus to the downstream relay apparatus, in the first period or the second period, and the removing section removes the signal for the other terminal apparatus from the signal received in the third period, using the signal for the other terminal apparatus, the control information for the terminal apparatus and the control information for the other terminal apparatus, which are received in the first period or the second period.

4. The terminal apparatus according to claim 1,
wherein, in the radio communication system, downlink and uplink are switched on a per subframe basis, and a first guard time is provided between a downlink subframe and an uplink subframe, while a second guard time is provided between the second period and the third period, and the receiving section further receives control information for the terminal apparatus transmitted from the upstream relay apparatus and control information for the other terminal apparatus transmitted from the downstream relay apparatus, respectively, in the first guard time or the second guard time, and the removing section removes the signal for the other terminal apparatus from the signal received in the third period, using the control information for the terminal apparatus and the control information for the other terminal apparatus.

5. The terminal apparatus according to claim 1,
wherein the receiving section receives control information for the terminal apparatus transmitted from the upstream relay apparatus and control information for the other terminal apparatus transmitted from the downstream relay apparatus in the first period or the second period; and the removing section removes the signal for the other terminal apparatus from the signal received in the third period, using the signal for the other terminal apparatus, the control information for the terminal apparatus and the control information for the other terminal apparatus, which are received in the first period or the second period.

6. The terminal apparatus according to claim 5, further comprising a detection section that detects notification information indicating existence or non-existence of the signal for the terminal apparatus and thereby determines whether or not the signal for the terminal apparatus is transmitted from the upstream relay apparatus, the notification information being included in a control header provided in the control information for the terminal apparatus, wherein, when the detection section determines that the signal for the terminal apparatus is transmitted from the upstream relay apparatus, the receiving section receives the control information for the terminal apparatus transmitted from the upstream relay apparatus and the control information for the other terminal apparatus transmitted from the downstream relay apparatus, in the first period or the second period, whereas the receiving section stops processing for receiving the control information for the terminal apparatus and the control information for the other terminal apparatus when the detection section determines that the signal for the terminal apparatus is not transmitted from the upstream relay apparatus.

7. The terminal apparatus according to claim 5,
further comprising a detection section that detects notification information transmitted from the upstream relay apparatus in a previous sub frame and indicating existence or non-existence of the signal for the terminal apparatus in a current subframe and thereby determines whether or not the signal for the terminal apparatus is transmitted from the upstream relay apparatus in the current subframe, wherein, when the detection section determines that the signal for the terminal apparatus is transmitted from the upstream relay apparatus, the receiving section receives the control information for the terminal apparatus transmitted from the upstream relay apparatus and the control information for the other terminal apparatus transmitted from the downstream relay apparatus, in the first period or the second period in the current subframe, whereas the receiving section stops processing for receiving the control information for the terminal apparatus and the control information for the other terminal apparatus in the current subframe when the detection section determines that the signal for the terminal apparatus is not transmitted from the upstream relay apparatus.

8. An interference removal method in a radio communication system in which a plurality of relay apparatuses relay communication between a base station apparatus and terminal apparatuses using the same frequency on a per subframe basis where each subframe includes a first period and a second period for communication between the plurality of relay apparatuses and a third period for communication between the plurality of relay apparatuses and the terminal apparatuses, while two adjacent relay apparatuses among the plurality of relay apparatuses perform transmission processing in mutually-different periods, respectively, in the first period and the second period, and the plurality of relay apparatuses simultaneously perform transmission to terminal apparatuses connected to the relay apparatuses, in the third period, the method comprising:

a selection step of selecting connection for the terminal apparatus to an upstream relay apparatus positioned upstream in a signal transfer direction between the base station apparatus and the terminal apparatus from among the two relay apparatuses, when the terminal apparatus is connectable to the two relay apparatuses;

a reception step of receiving a signal for another terminal apparatus, the signal being transmitted from the upstream relay apparatus to a downstream relay apparatus positioned downstream in the transfer direction among the two relay apparatuses, in the first period or the second period; and a removal step of removing a signal for the other terminal apparatus transmitted from the downstream relay apparatus in the third period from a signal received in the third period, using the signal for the other terminal apparatus received in the first period or the second period, thereby obtaining a signal for the terminal apparatus transmitted from the upstream relay apparatus.

* * * * *